United States Patent
Marandi et al.

(10) Patent No.: US 11,841,271 B2
(45) Date of Patent: Dec. 12, 2023

(54) CROSS-COMB SPECTROSCOPY

(71) Applicant: California Institute of Technology, Pasadena, CA (US)

(72) Inventors: Alireza Marandi, Pasadena, CA (US); Mingchen Liu, Pasadena, CA (US); Arkadev Roy, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 109 days.

(21) Appl. No.: 17/533,926

(22) Filed: Nov. 23, 2021

(65) Prior Publication Data
US 2022/0163389 A1 May 26, 2022

Related U.S. Application Data
(60) Provisional application No. 63/117,094, filed on Nov. 23, 2020.

(51) Int. Cl.
*G01J 3/02* (2006.01)
*G01J 3/433* (2006.01)

(52) U.S. Cl.
CPC .......... *G01J 3/4338* (2013.01); *G01J 3/027* (2013.01); *G01J 3/0275* (2013.01); *G01J 2003/4332* (2013.01)

(58) Field of Classification Search
CPC ..... G01J 3/45; G01J 3/4338; G01J 2003/4332
See application file for complete search history.

(56) References Cited

U.S. PATENT DOCUMENTS 8,625,101 B2 * 1/2014 Giaccari ............... G01J 9/04
356/451
2018/0073856 A1 * 3/2018 Cundiff ................ G01N 21/31

OTHER PUBLICATIONS

T.A. Johnson, "Mid-infrared upconversion spectroscopy based on a Yb:fiber femtosecond laser", 2011 (Year: 2011).*
Borja Jerez, "Flexible Electro-Optic, Single-Crystal Difference Frequency Generation Architecture for Ultrafast Mid-Infrared Dual-Comb Spectroscopy" 2018 (Year: 2018).*
Markku Vainio, "Fully Stabilized Mid-Infrared Frequency Comb for High-Precision Molecular Spectroscopy" 2016 (Year: 2016).*

(Continued)

*Primary Examiner* — Maurice C Smith
(74) *Attorney, Agent, or Firm* — GATES & COOPER LLP

(57) ABSTRACT

A system for performing spectroscopy, including a first frequency comb source outputting first electromagnetic radiation comprising a first frequency comb centered at a first wavelength and having a first repetition rate; a second frequency comb source outputting a second electromagnetic radiation comprising a second frequency comb centered at a second wavelength and having a second repetition rate; a nonlinear device positioned to receive the first frequency comb and the second frequency comb, wherein the nonlinear device interacts the first frequency comb and the second frequency comb through sum frequency generation or difference frequency generation so as to generate an output electromagnetic radiation; and a detection system outputting a signal in response to detecting an interference of the output electromagnetic radiation with a third electromagnetic radiation, the signal comprising information used for determining a spectrum of at least the first frequency comb or the second frequency comb.

20 Claims, 42 Drawing Sheets

(56) References Cited

OTHER PUBLICATIONS

Liu et al., "Mid-Infrared Cross-Comb Spectroscopy". Department of Electrical Engineering, California Institute of Technology, Jul. 17, 2021, 27 pages.
Burghoff et al., "Computational multi heterodyne spectroscopy". Science Advances 2, e1601227, pp. 1-7 (2016).
Chen et al., "Mid-infrared feed-forward dual-comb spectroscopy". PNAS 116, pp. 3454-3459 (2019).
Chen et al., "Upconversion mid-infrared dual-comb spectroscopy". arXiv:2003.06930 [physics], 10 pages (2020).
Liu et al., "Cross-Comb Spectroscopy using Sum-Frequency Sampling in the Mid-IR, 2 pages, 2021" https://www.osapublishing.org/abstract.cfm?uri=CLEO_SI-2021-SM3A.4.
Gordon et al., "The HITRAN2016 molecular spectroscopic database". Journal of Quantitative Spectroscopy and Radiative Transfer 203, 3-69 (2017).
Ideguchi et al., "Adaptive real-time dual-comb spectroscopy". Nature Communications 5, 3375, 8 pages (2014).
Kowligy et al., "Infrared electric field sampled frequency comb spectroscopy". Science Advances 5, eaaw8794, 7 pages (2019).
Marandi et al., "Coherence properties of a broadband femtosecond mid-IR optical parametric oscillator operating at degeneracy". Opt. Express 20, 7255-7262 (2012).
Muraviev et al., "Massively parallel sensing of trace molecules and their isotopologues with broadband subharmonic mid-infrared frequency combs". Nature Photonics 12, 209-214 (2018).
Picqué et al., "Frequency comb spectroscopy". Nature Photonics 13, 146-157 (2019).
Pupeza, I. et al., "Field-resolved infrared spectroscopy of biological systems". Nature 577, 52-59 (2020).
Riek et al., "Direct sampling of electric-field vacuum fluctuations". Science 350, 420-423 (2015).
Rogalski, A. Infrared detectors: status and trends. Progress in Quantum Electronics 27, 59-210 (2003).
Roy et al., "Continuous real-time correction and averaging for frequency comb interferometry". Opt. Express 20, 21932-21939 (2012).
Schliesser et al., "Mid-infrared frequency combs". Nature Photonics 6, 440-449 (2012).
Timmers et al., "Molecular fingerprinting with bright, broadband infrared frequency combs". Optica 5, 727-732 (2018).
Villares et al., "Dual-comb spectroscopy based on quantum-cascade-laser frequency combs". Nature Communications 5, 5192, 9 pages (2014).
Ycas et al., "High-coherence mid-infrared dual-comb spectroscopy spanning 2.6 to 5.2 μm". Nature Photonics 12, 202-208 (2018).
Yokoyama et al., "A distance meter using a terahertz intermode beat in an optical frequency comb". Opt. Express 17, 17324-17337 (2009).
Coddington et al., "Dual-comb spectroscopy". Optica vol. 3, No. 4 / Apr. 2016, pp. 414-426.
Coddington et al., "Coherent dual-comb spectroscopy at high signal-to-noise ratio". Phys. Rev. A 82, 043817 (2010).
Coddington et al., "Time-domain spectroscopy of molecular free-induction decay in the infrared". Opt. Lett. 35, 1395-1397 (2010).
Harde et al., "THz commensurate echoes: Periodic rephasing of molecular transitions in free-induction decay". Phys. Rev. Lett. 66, 1834-1837 (1991).
Mid-Infrared Cross-Comb Spectroscopy using Sum-Frequency Sampling by Mingchen Liu, Robert M. Gray, Arkadev Roy, and Alireza Marandi https://www.osapublishing.org/abstract.cfm?uri=CLEO_SI-2021-SM3A.4, 2 pages.
Sorokin et al. Efficient half-harmonic generation of three-optical-cycle mid-IR frequency comb around 4 μm using OP-GaP. Opt. Express 26, 9963-9971 (2018).
Stead et al., "Method for high resolution and wideband spectroscopy in the terahertz and far-infrared region". J. Opt. Soc. Am. B 29, 2861-2868 (2012).
Weichman et al. Broadband molecular spectroscopy with optical frequency combs. Journal of Molecular Spectroscopy 355, 66-78 (2019).
Ycas, G. et al. High-coherence mid-infrared dual-comb spectroscopy spanning 2.6 to 5.2 μm. Nature Photonics 12, pp. 202-208 (2018).

* cited by examiner

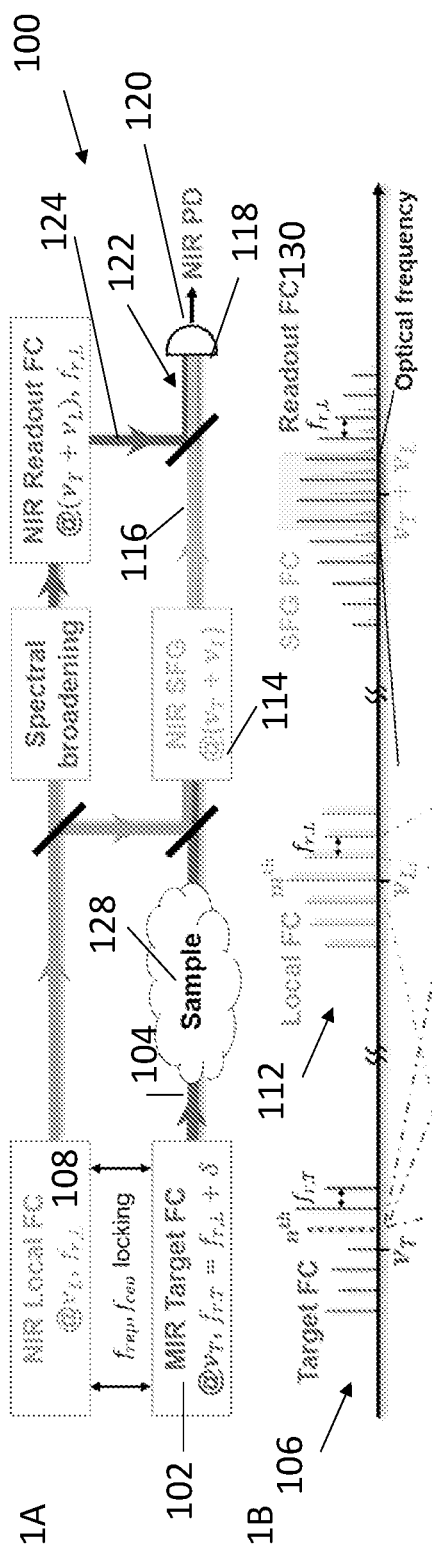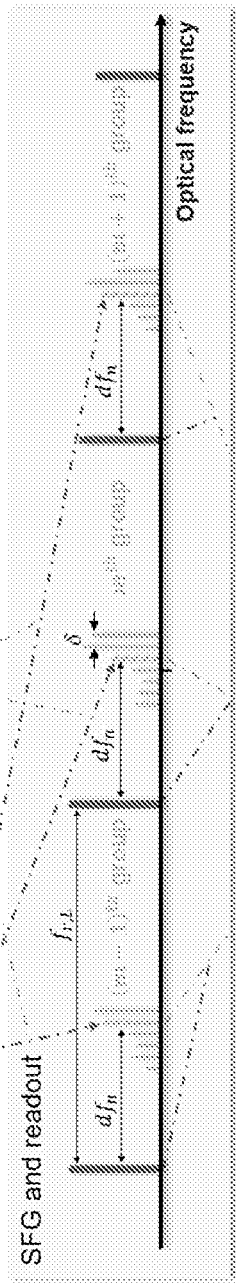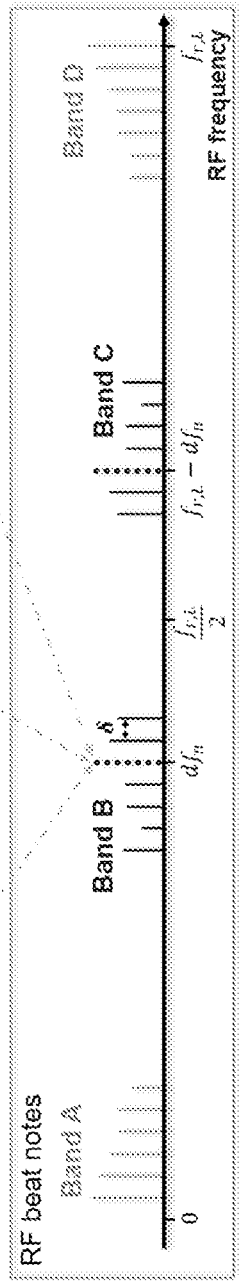

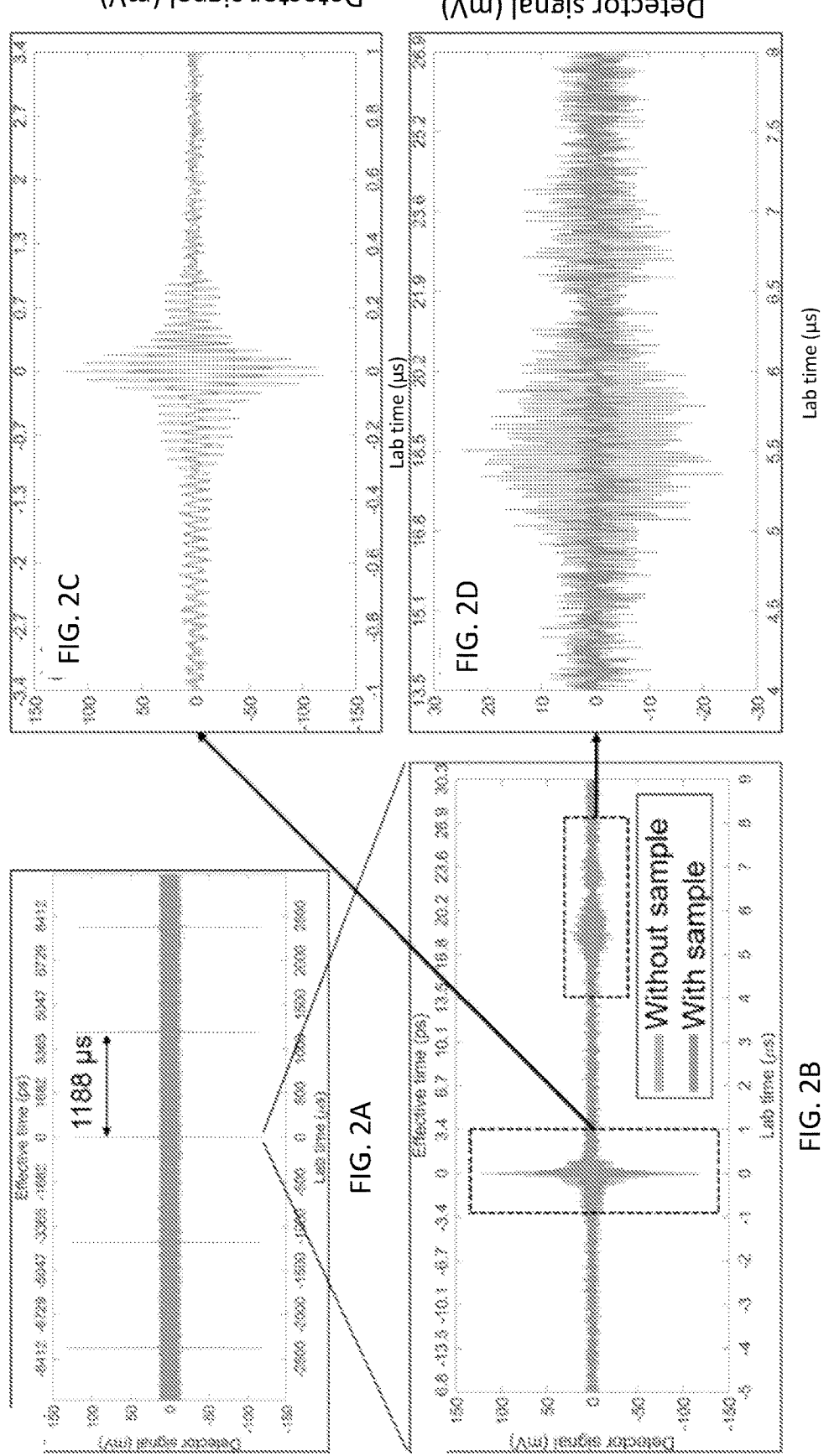

| Method Feature | MIR DCS | C.W. upconversion DCS | Dual-comb EOS | EOS |
|---|---|---|---|---|
| Comb teeth resolution and fast acquisition | 🙂 | 🙂 | 🙂 | 🙂 |
| Radiant FC (and local FC) | Another equivalent MIR comb | One C.W. NIR laser and one NIR comb | Ultrashort NIR pulses | NIR pulses[a] and their spectral extension |
| Photodetection color | MIR | NIR | NIR | NIR |
| Extra detection set-up | Not required | Not required | 🙂 | 🙂 |
| Upconversion efficiency | N.A. | 🙁 | Ellipsometry | Not required |
| Temporal gating | 🙂 | 🙁 | 🙂 | 🙂[b] |
| Efficient use of applied bandwidth | 🙂 | 🙁 | 🙂 | 🙂[b] |
| | 🙁 | 🙁 | 🙁 | 🙂 |
| Electric field | 🙂 | 🙂 | 🙂 | 🙂 |

FIG. 5 under 35 USC 119(e)

CROSS-COMB SPECTROSCOPY

CROSS REFERENCE TO RELATED APPLICATIONS

This application claims the benefit under 35 USC 119(e) of commonly assigned U.S. Provisional Patent Application Ser. No. 63/117,094, filed Nov. 23, 2020, by Alireza Marandi, Mingchen Liu, and Arkadev Roy, entitled "CROSS-COMB SPECTROSCOPY," (CIT-8397-P2), which application is incorporated by reference herein.

STATEMENT REGARDING FEDERALLY SPONSORED RESEARCH AND DEVELOPMENT

This invention was made with government support under Grant No. FA9550-20-1-0040 awarded by the Air Force Office of Scientific Research, Grant No. 1846273 awarded by the National Science Foundation, and a Grant No 80NMO0018D0004 awarded by NASA (JPL). The government has certain rights in the invention.

BACKGROUND OF THE INVENTION

1. Field of the Invention

The present invention relates to methods and systems for performing spectroscopy.

2. Description of the Related Art

Dual-comb spectroscopy (DCS), based on two mutually locked frequency comb (FC) sources in the same wavelength range, has become a compelling alternative to traditional Fourier-transform infrared spectroscopy (FTIR) with advantages in resolution, precision, sensitivity, speed, and bandwidth[1-3]. Over the past decade, significant efforts have focused on its extension to the mid-infrared (MIR) spectral region (3-25 μm)[4-9], where strong molecular signatures are located, making it promising for numerous applications in physical, chemical, biological, and medical sciences or industries. However, generating two mutually locked broadband frequency comb sources in the MIR has posed a significant challenge. In addition, photodetectors in the MIR usually suffer from lower sensitivity, higher noise, and slower response times, and generally require cooling, compared to their well-developed near-infrared (NIR) counterparts. Moreover, photodetection above 13 μm[10] remains a significant challenge.

To circumvent those obstacles, one efficacious path is to upconvert the MIR FC to the NIR region and capture the wealth of molecular information available in the MIR using NIR photodetectors. Electro-optic sampling (EOS) is one recent successful example of this approach[11,12], in which ultrashort NIR pulses are used to directly detect the electric field of MIR pulses in the time domain. However, this method necessitates extremely short NIR pulses with durations shorter than the optical cycle of the carrier frequency of the MIR pulses[13,14], whose generation and dispersion control require substantial efforts. Moreover, the detection is based on field-dependent polarization rotation of the NIR sampling pulses, which adds extra complexity to the system. In addition to EOS, one can also upconvert the MIR frequency comb using a high-power NIR continuous-wave laser and perform standard DCS in the NIR region[15]. Nonetheless, this method has not yet been demonstrated to exhibit a favorable signal-to-noise ratio (SNR) and bandwidth compared to direct MIR DCS, mainly owing to the low up-conversion efficiency.

SUMMARY OF THE INVENTION

Dual-comb spectroscopy has been proven a powerful tool in molecular characterization, which remains challenging to implement in the mid-infrared (MIR) region due to difficulties in the realization of two mutually locked comb sources and efficient photodetection. An effective way to overcome those limitations is optical upconversion; however, previously reported configurations are either demanding or inefficient. What is needed then, are improved methods for performing spectroscopy. The present disclosure satisfies this need.

Illustrative embodiments of the inventive subject matter disclosed herein include, but are not limited to, the following.

1. A system for performing spectroscopy, comprising:
a first frequency comb source outputting first electromagnetic radiation comprising a first frequency comb centered at a first wavelength and having a first repetition rate;
a second frequency comb source outputting a second electromagnetic radiation comprising a second frequency comb centered at a second wavelength and having a second repetition rate;
a nonlinear device positioned to receive the first frequency comb and the second frequency comb, wherein the nonlinear device interacts the first frequency comb and the second frequency comb through sum frequency generation or difference frequency generation so as to generate an output electromagnetic radiation; and
a detection system outputting a signal in response to detecting an interference of the output electromagnetic radiation with a third electromagnetic radiation, the signal comprising information used for determining a spectrum of at least the first frequency comb or the second frequency comb.

2. The system of example 1, further comprising a sample positioned so that the first frequency comb received in the nonlinear device has interacted with the sample prior to being received by the nonlinear device and the frequency spectrum is useful for determining a physical or chemical property of the sample.

3. The system of example 2, wherein the sample comprises a gas, liquid, or solid and the property of the sample comprises an absorption, refractive index, composition, or vibrational mode of the sample.

4. The system of example 1, further comprising:
a control circuit varying a property of at least one of the first frequency comb or the second frequency comb, between at least two values; and
a computer measuring the frequency spectrum by comparing the signal obtained for each of the two values, so as to obtain the frequency spectrum useful for determining or measuring the property with increased accuracy.

5. The system of example 4, wherein the property comprises a phase, repetition frequency, carrier-envelope-offset frequency, or amplitude of the first frequency comb or the second frequency comb.

6. The system of example 1, wherein the third electromagnetic radiation comprises a readout bandwidth overlapping in frequency with an output bandwidth of the output electromagnetic radiation so as to form the interference that can be detected by the detection system comprising a photodetector, and the third electromagnetic radiation comprises one or a combination of the following:
   (a) a portion of one of the first or the second electromagnetic radiation,
   (b) a portion of spectrally broadened electromagnetic radiation from one of the first electromagnetic radiation or the second electromagnetic radiation,
   (c) a third frequency comb having a repetition frequency the same as one of the first frequency comb or the second frequency comb; or
   (d) a continuous-wave electromagnetic radiation outputted from a continuous wave laser.

7. The system of example 1, wherein the nonlinear device comprises a nonlinear crystal or nonlinear medium comprising a second order nonlinear susceptibility for the sum frequency generation or the difference frequency generation.

8. The system of example 1, wherein the nonlinear device comprises a semiconductor chip or photonic integrated circuit comprising a sum frequency mixer or a difference frequency mixer.

9. The system of example 1, wherein the first frequency comb source and the second frequency comb source each comprise a mode-locked laser, an optical parametric oscillator or generator or amplifier, or a laser pumping one or more nonlinear crystals so as to generate the first frequency comb or the second frequency comb using an optical parametric process.

10. The system of example 1, wherein the first frequency comb comprises mid infrared wavelengths and the second frequency comb comprises near infrared wavelengths.

11. The system of example 1, wherein at least one of the first frequency comb or the second frequency comb comprise ultraviolet wavelengths.

12. The system of example 1, wherein the interference comprises a heterodyne signal and the detection system comprises a heterodyne detection system.

13. The system of example 12, wherein the heterodyne signal comprises radio frequency beat notes resulting from beating between the third electromagnetic radiation and the output electromagnetic radiation.

14. A method for performing spectroscopy, comprising:
   outputting first electromagnetic radiation comprising a first frequency comb centered at a first wavelength and having a first repetition rate;
   outputting second electromagnetic radiation comprising a second frequency comb centered at a second wavelength and having a second repetition rate;
   interacting the first frequency comb and the second frequency comb in a nonlinear device through sum frequency generation or difference frequency generation so as to generate an output electromagnetic radiation; and
   detecting an interference of the output electromagnetic radiation with a third electromagnetic radiation so as to generate a signal comprising information used for determining a spectrum of at least the first frequency comb or the second frequency comb.

15. The method of example 14, further comprising.
   comparing a sample signal with a reference signal so as to measure the spectrum useful for determining a property of the sample, wherein:
   the signal comprises the sample signal when the first frequency comb received in the nonlinear device has interacted with a sample prior to being received the nonlinear device; and
   the signal comprises a reference signal when the first frequency comb received in the nonlinear device has not interacted with the sample prior to being received in the nonlinear device.

16. The method of example 14, wherein the detecting comprises heterodyne detection and the signal comprises a heterodyne signal comprising radio frequency (RF) beat notes resulting from beating between the third electromagnetic radiation and the output electromagnetic radiation.

17. The method of example 16, further comprising determining the spectrum of one of the first frequency comb or the second frequency comb by mapping or associating each of one or more teeth in the first or the second frequency comb with one or more of the RF beat notes.

18. The method of example 17, wherein the mapping or associating comprises the computer identifying a relationship between the RF beat notes in the signal, a calculated output frequency spectrum of the output electromagnetic radiation, and the first teeth of the first frequency comb.

19. The method of example 18, wherein the relationship comprises each of the first teeth mapping onto a plurality of frequencies of the output electromagnetic radiation and the plurality of frequencies of the output electromagnetic radiation mapping onto a single one of the RF beat notes.

20. The method of example 18, wherein the mapping or associating comprises:
   calculating an output frequency spectrum of the output electromagnetic radiation, comprising a sum of, or difference between, each of one or more of the first teeth and each of one or more second teeth in the second frequency comb;
   calculating one or more calculated beat frequencies between the output frequency spectrum and the third electromagnetic radiation;
   associating each of one or more of the first teeth with one of the calculated beat frequencies; and
   finding each of the calculated beat notes corresponding to each of the one or more RF beat notes in the signal so as to map each of the RF beat notes with one of the first teeth.

In one example, a MIR comb is upconverted via sum-frequency generation (SFG) with a near-infrared (NIR) comb with a shifted repetition rate and then interfered with a spectral extension of the NLR comb. We experimentally demonstrate a proof-of-concept measurement of atmospheric $CO_2$ around 4.25 μm, with a 350-nm instantaneous bandwidth and 25000 resolved comb lines. Cross-comb spectroscopy can be realized using up- or down-conversion and offers an adaptable and efficient alternative to dual-comb spectroscopy outside the well-developed near-IR region, where having two mutually coherent sources and efficient photodetection is challenging. Moreover, the nonlinear gating in cross-comb spectroscopy promises a superior dynamic range compared to dual-comb spectroscopy.

BRIEF DESCRIPTION OF THE DRAWINGS

Referring now to the drawings in which like reference numbers represent corresponding parts throughout:

FIGS. 1A-1D illustrate Cross-comb spectroscopy. FIG. 1A, Schematic of the setup. $v_L$ and $v_T$, center optical frequency of the NIR local FC and MIR target FC. $f_{ceo}$ and $f_{rep}$, carrier-envelope offset frequency and repetition rate of a FC. $f_{r,L}$ and $f_{r,T}$, repetition rate of the local FC and the target FC. δ, difference between $f_{r,L}$ and $f_{r,T}$. PD, photodetector. FIGS. 1B-1D Principle of the tooth mapping. An example target tooth, together with its corresponding SFG teeth and RF teeth, is denoted by a dashed line to demonstrate the one-to-one mapping. n (m): index of the example tooth of the target FC (local FC). FIG. 1B, Optical spectrum. FIG. 1C, a zoomed-in view of the grey-shadowed area in panel (b). Mixed with different local teeth, one target tooth will generate multiple SFG teeth that are distributed in different SFG groups, separated by $f_{r,L}$. Each SFG tooth is the product of a target tooth and a local tooth. The mapping of the $n_{th}$ target tooth is denoted by arrows, as an example. For SFG teeth that are generated by the same target tooth, they share the same distance to their respective closest readout tooth. For example, $df_n$ denotes the distance for SFG teeth (dashed lines) generated by the $n_{th}$ target tooth. FIG. 1D, Heterodyne beat notes in the RF domain, obtained by square-law detection of the interference between the SFG FC and readout FC with a single NIR detector. Band B (C) is the result of the beating between SFG teeth with their nearest (second nearest) readout tooth, while band A (D) is the result of the beating between two SFG teeth from the same SFG group (two adjacent SFG groups). The dashed tooth in band B is the unique mapping of the $n_{th}$ target tooth, as is its mirror image in band C. The arrows denote the optical tooth pairs in panel c that contribute to the dashed RF tooth.

FIGS. 2A-2D—Interferograms of CCS of $CO_2$. The "without sample" result (blue) is measured when the optical path is purged with nitrogen ($N_2$), and the "with sample" measurement (red) is taken when the path is not purged, where atmospheric $CO_2$ is present. All measurements are carried out at room temperature and atmospheric pressure without extra control. FIG. 2A. Five consecutive interferograms with a temporal spacing of 1.188 ms, corresponding to $\delta$=842 HZ. FIG. 2B. The central 14 μs of one example interferogram, in which details at the center-burst and the tail are further zoomed in, shown in panel FIG. 2C and FIG. 2D, respectively. The lower temporal axes denote the lab time and the upper ones denote the effective time[18], which are related by the equation $t_{Lab}/t_{Effective} = f_{rL}/\delta$.

FIG. 3A, Spectra of band B of RF FC, obtained by Fourier transforms of 100 consecutive interferograms, for measurements both with and without $CO_2$, are shown in red ($I_s(f)$) and blue ($I_r(f)$), respectively. The inset is a zoomed-in view to show resolved comb lines, which are separated by $\delta$=842 HZ in the RF domain corresponding to $f_{r,L}$=250, 250, 820 Hz in the optical domain. FIG. 3B, Measured molecular absorbance spectrum (light blue curve), A(f), obtained from the results shown in a, with the equation $A(f) = -\ln[I_r(f)/I_s(f)]$. The black curve denotes the theoretical model, which is derived by fitting the absorption lines from the HITRAN database (red lines) with a Lorentzian lineshape to the experimental result. The upper axes in both FIGS. 3A and 3B that denotes the optical frequency in wavenumber, which are calibrated using the absorption lines.

FIG. 4A. General dual-comb spectroscopy with an asymmetric (dispersive) configuration[1]. The second MIR FC, which does not pass through the sample, is often referred to as the "local FC" or "slave FC" in other works. However, in the context of this work, it is named as "MIR readout FC" since it samples the MIR target FC linearly, by which a linear cross-correlation signal is generated to give the spectral information of the target FC. FIG. 4B. C.W. upconversion DCS. The MIR target FC is generated by the DFG between the NIR C.W. laser and the "master NIR comb"[15], which is not shown in this simplified schematic. Note that using an SFG or DFG process for the nonlinear upconversion of the MIR target FC does not make a fundamental difference. FIG. 4C. Dual-comb EOS. The lower-frequency part of the local FC can be regarded as an effective "local FC", while the higher-frequency part can be regarded as an effective "readout FC", in the context of CCS. FIG. 4D. General cross-comb spectroscopy.

FIG. 5. Table 1: Comparison between the features of different dual-comb-based techniques for MIR spectroscopy.

FIG. 7A. Target FC for both "without sample" (purged) and "with sample" (unpurged) cases, measured by a commercial Fourier-transform infrared spectrometer (FTIR) with a resolution of 4 $cm^{-1}$. The residual $CO_2$ which cannot be fully cleared by purging is the reason why the absorption dip can still be observed in the "without sample" curve. FIG. 7B. Local FC spectrum measured by a grating-based OSA with a resolution of 0.1 nm. FIG. 7C. Spectra of SFG FCs (with and without sample) and readout FC measured by a grating-based OSA with a resolution of 0.5 nm. FIG. 7D. Full measured absorbance spectrum of atmospheric $CO_2$ in our preliminary cross-comb measurement, including both P and R branches. The SNR of the R branch is much lower than that of the P branch.

FIG. 8A. Configuration of the fiber coupler and balanced detection. TIA: transimpedance amplifier. FIG. 8B. Interferograms measured when the detector is not well balanced. The main figure presents the central 14-μs part of one example interferogram in order to highlight the details of the center-burst (inset I) and the tail (inset II). Note that the measurement is done when the detector is tuned to be just slightly unbalanced. The background at the center-burst will be even higher if the detector is further unbalanced, until the detector is saturated.

FIG. 9A. Target FC and local FC. Effective tooth indices are used to label each comb tooth in the plot. FIG. 9B. SFG FC and readout FC. Each SFG tooth is labeled by the effective tooth index ("1", "2", or "3") of the corresponding target tooth. The phase for the readout FC is assumed to be constant for each tooth and is thus not shown in the plot. $df_{n'}$ denotes the primary readout frequency for the $n'^{th}$ (effective tooth index) target tooth. Each SFG group is labeled by its effective group index G'. FIG. 9C. RF FC. Every RF comb tooth in band B and band C is labeled with its corresponding target tooth.

FIG. 10A. M=N=3, Q must be >=1. The only complete SFG group, together with its primary readout tooth, is circled in red. FIG. 10B. N=2, M=3, Q must be >=2. Two incomplete SFG groups circled in red need to be read out by two readout teeth to map all three target teeth. FIG. 10C. N=3, M=4, Q must be >=1. Two complete SFG groups, together with their primary readout teeth, are circled in red.

FIG. 11B shows D: the spectral distance (RF frequency) from the first tooth of an SFG group to its primary readout tooth. W: the spectral width of one complete group.

FIG. 18B shows phase of local FC, and right lower subplot in FIG. 18C is the absorbance spectrum obtained in RF domain by comparing two Bands B of RF FC. Those two subplots agree with each other exactly. FIG. 18D and FIG. 18E show the experimental set-up design with reference and absorption cell measured at different times, T1 and T2.

DETAILED DESCRIPTION OF THE INVENTION

Figure 3A:
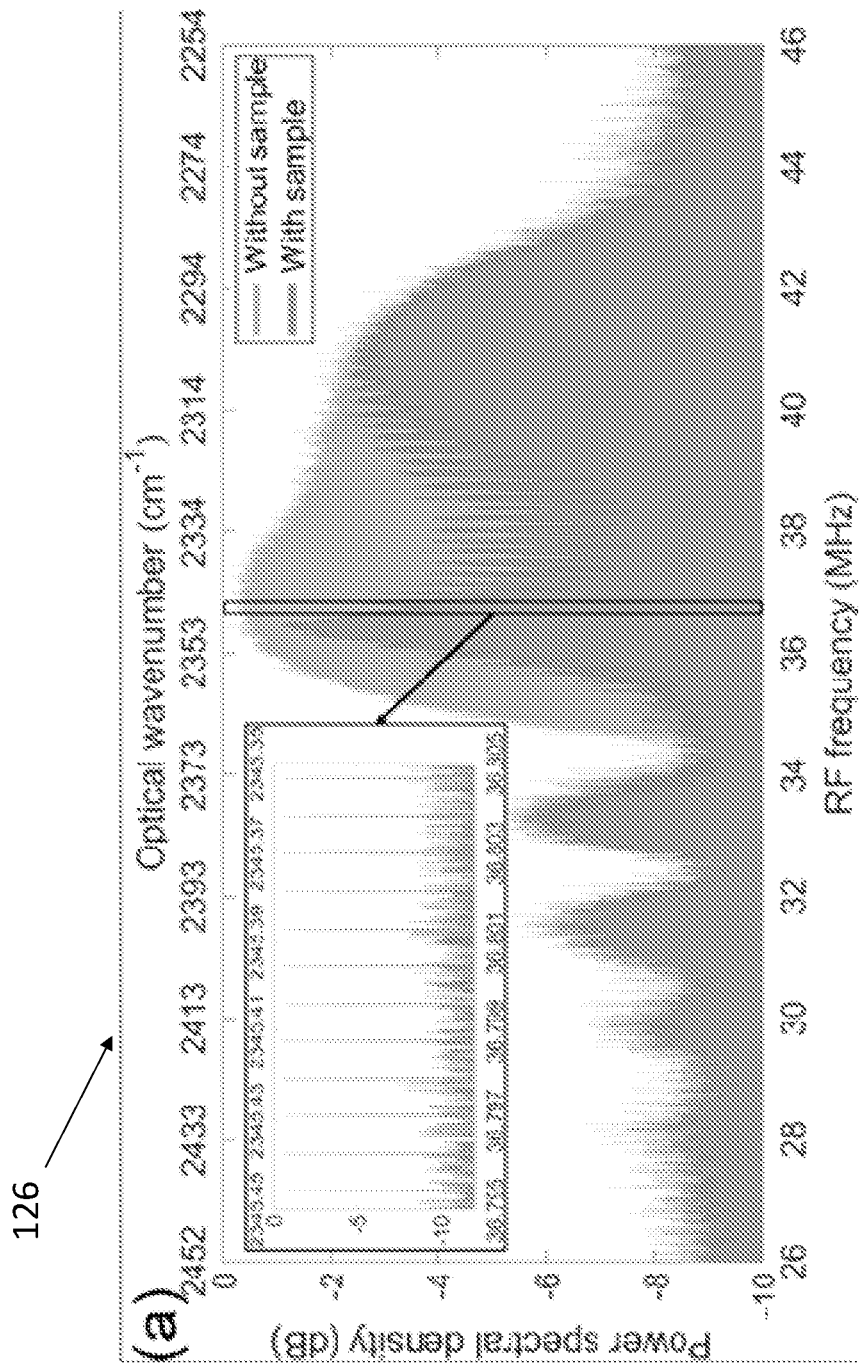
FIGS. 3A-3B Experimental results of CCS of $CO_2$ in the frequency domain.

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description

The present disclosure describes systems and methods for performing spectroscopy. FIGS. 1 and 17 illustrate a system 100, 1700 (e.g., spectrometer or spectrum analyzer) comprising a first frequency comb source 102 outputting first electromagnetic radiation 104 comprising a first frequency comb 106 centered at a first wavelength (corresponding to center frequency $v_T$) and having a first repetition rate $f_{r,T}$; a second frequency comb source 108 outputting a second electromagnetic radiation 110 comprising a second frequency comb 112 centered at a second wavelength (corresponding to center frequency $v_T$) and having a second repetition rate $f_{r,L}$; a nonlinear device 114 positioned to receive the first frequency comb and the second frequency comb, wherein the nonlinear device interacts the first frequency comb and the second frequency comb through sum frequency generation or difference frequency generation so as to generate an output electromagnetic radiation 116; and a detection system 118 (e.g., comprising photodetector PD) outputting a signal 120 in response to detecting an interference 122 of the output electromagnetic radiation with a third electromagnetic radiation 124, the signal comprising information used for determining a spectrum 126 of at least the first frequency comb or the second frequency comb. FIG. 1 and FIG. 17 further illustrate a sample 128 positioned so that the first frequency comb received in the nonlinear device has interacted with the sample prior to being received by the nonlinear device and the frequency spectrum is useful for determining a physical or chemical property of the sample.

In various examples, the third electromagnetic radiation comprises a readout bandwidth overlapping in frequency with an output bandwidth of the output electromagnetic radiation so as to form the interference that can be detected by the detection system comprising a photodetector. Although FIG. 1A shows the third electromagnetic radiation comprising a readout comb 130 formed by spectrally broadening the second electromagnetic radiation, the third electromagnetic radiation can be formed by many different methods, including but not limited to, a portion of one of the first or the second electromagnetic radiation, a portion of spectrally broadened electromagnetic radiation from one of the first electromagnetic radiation or the second electromagnetic radiation, a third frequency comb having a repetition frequency the same as one of the first frequency comb or the second frequency comb; or a continuous-wave electromagnetic radiation outputted from a continuous wave laser.

Embodiments are further described in the following examples.

First Example: Cross Comb Spectroscopy Using Sum-Frequency Generation

The first example reports on cross-comb spectroscopy (CCS), which can be considered a general form of frequency-converted DCS and can combine many of the merits of DCS and EOS while circumventing some of their practical challenges. As illustrated in FIG. 1A, the spectral information contained in the mid infrared (MIR) (target) FC of interest is upconverted to the near infrared (NIR) region via sum-frequency-generation (SFG) with a NIR (local) FC of a slightly shifted repetition rate (shifted by δ). The SFG output is then interfered with the spectral extension of the local FC (readout FC) to transfer the MIR information into the radio frequency (RF) domain. It is possible to map the MIR FC teeth to the RF comb teeth, which are accessed with a single NIR detector and RF measurement. In principle, to obtain a tooth-resolved absorption spectrum of the target FC, the minimum required aggregate bandwidth of the local and readout FC is about equal to the bandwidth of the target FC (see Supplementary Information Section 2), which eliminates the need found in EOS for super-short NIR pulse generation and measurement of polarization rotation.

FIGS. 1A-1D illustrate an operation principle of CCS using sum-frequency sampling and one-to-one comb tooth mapping. Each pair of comb teeth from the local FC (green) and target FC (red) will generate an SFG tooth at a unique frequency, the set of which is referred to as the SFG FC (blue). The teeth of the SFG FC cluster into different frequency groups that are evenly spaced by the repetition rate of the local FC ($f_{rL}$)[16] and follow some specific patterns (FIG. 1C, Supplementary Information Section 2.2). Within a frequency group, the SFG teeth are separated by δ, and each tooth represents a unique tooth of the target comb. Across all the SFG comb groups, teeth generated by the same tooth of the target comb are all at the same relative frequency position. These characteristics enable one-to-one mapping from the MIR domain to the RF domain. To realize this, a readout FC (purple), which in this example is effectively a spectral extension of the local FC, is employed to beat with the SFG FC on a NIR photodetector. The resultant RF FC contains four distinguishable bands (FIG. 1D)[13]. While band A and D correspond to the envelope of the SFG pulses (intensity cross-correlation between the target FC and local FC) and thus lack spectral information, band B (or its mirror image band C) is a one-to-one mapping from the target FC (multiplied by the local and readout FCs) to the RF FC. To interrogate the spectral response of the sample in the target FC path, one can compare the measured RF band B (or C) with the corresponding sample-free result. Balanced detection can eliminate band A and D since they are common-mode signals, which would double the bandwidth for band B and C. More detailed descriptions can be found in Supplementary Information Section 2.

Figure 6:
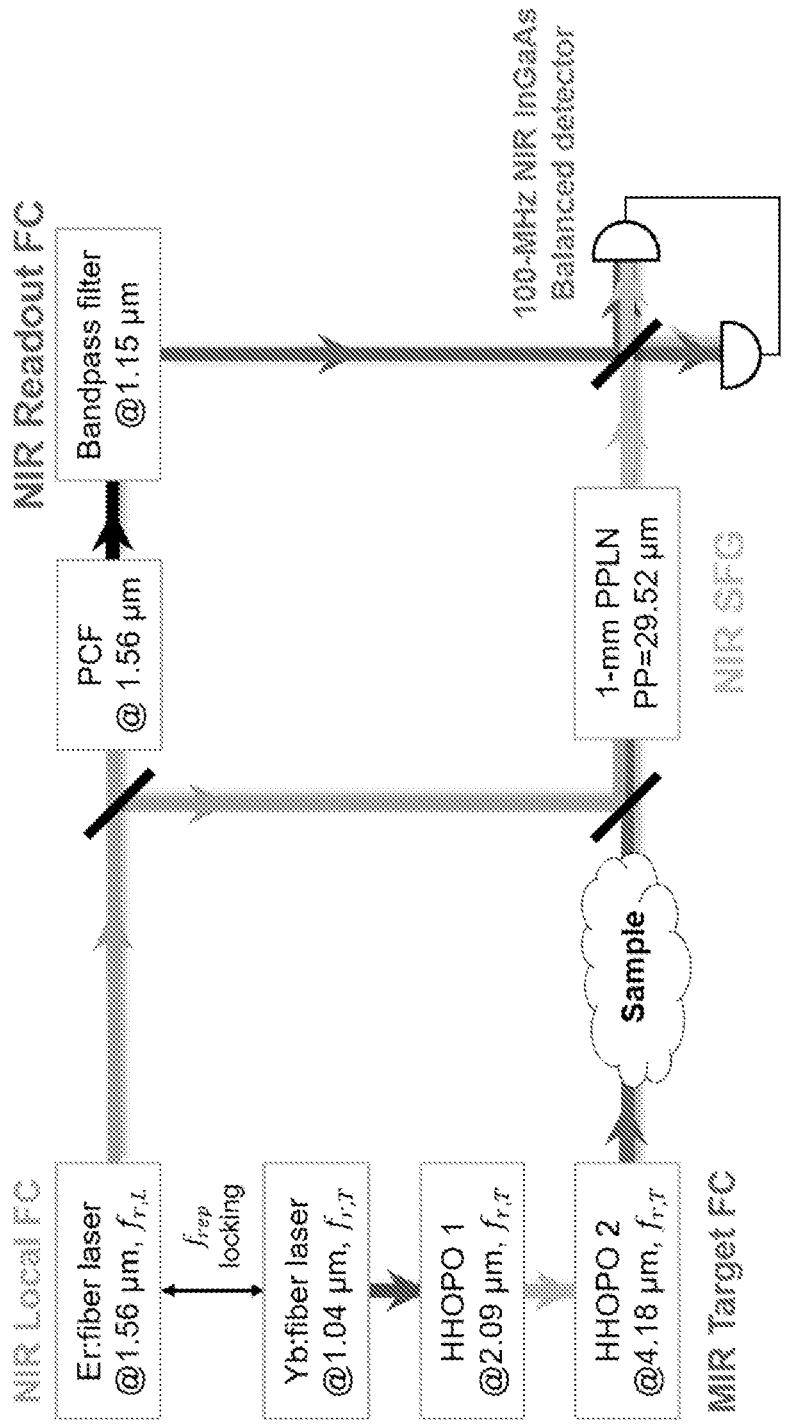
FIG. 6. More detailed Experimental setup. PCF: photonic crystal fiber. PP: poling period. Note that the mixing between the SFG FC and readout FC is realized in a 50:50 fiber coupler, before which the two beams are coupled from free space into fiber. The configuration of fiber coupler is further illustrated in FIG. 8A. The bandpass filter currently used is centered at 1150 nm with a full width half maximum (FWHM) of 10 nm (Thorlabs FB1150-10).

To experimentally demonstrate CCS in the MIR, we conducted a measurement of the sample comprising atmospheric carbon dioxide ($CO_2$) around 4.25 μm (2349 cm$^{-1}$, antisymmetric stretching mode $v_3$). The target FC consists of 50-fs pulses centered at 4.2 μm with 500 mW of average power provided by two-stage cascaded efficient half-harmonic optical parametric oscillators (OPOs), which are intrinsically phase locked to the pump frequency comb (a mode-locked Yb-fiber laser) at 1 μm[17]. The local FC is a NIR FC centered at 1560 nm (a mode-locked Er-fiber laser) with a 250,250,820-Hz repetition rate ($f_{rL}$), a 15-nm (60-cm$^{-1}$) FWHM bandwidth and an 80-mW average power. The $f_{rep}$ of the target FC is locked to that of the local FC with a shift of 842 HZ, which is locked against an RF rubidium (Rb) clock. The readout FC is a band-pass-filtered part of a supercontinuum from the local FC, which is centered around 1150 nm with an 8-nm (60-cm$^{-1}$) FWHM bandwidth and a 0.2-μW average power. CCS is achieved through SFG of the target FC and the local FC (i.e., the sum-frequency sampling of the MIR comb) in a 1-mm-long periodically poled lithium niobate (PPLN) crystal followed by its interference with the readout FC, which is measured by a 100-MHz InGaAs balanced detector. The PPLN crystal has a 29.52-μm poling period that can provide a ~200-cm$^{-1}$ (~350-nm) quasi-phase-matching bandwidth for the SFG. FIG. 6 presents detailed setup and optical spectra of those FCs.

Figure 8A:
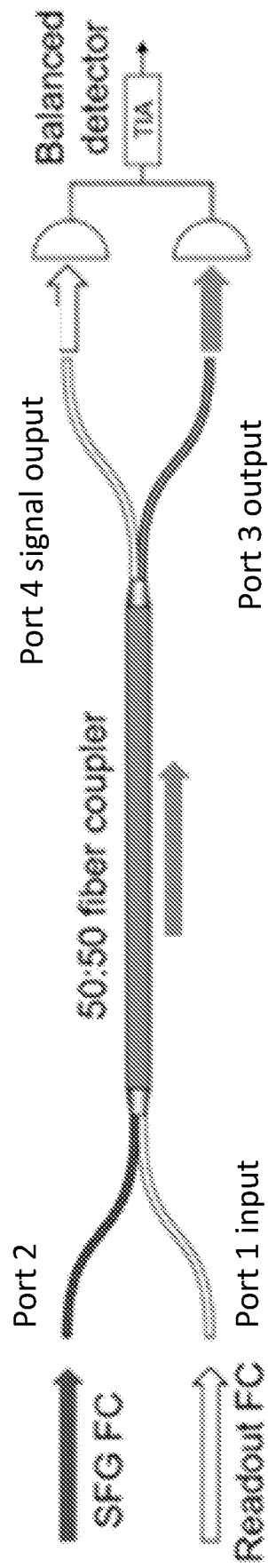
FIGS. 8A-8B. Interferograms of CCS of $CO_2$, measured by an unbalanced detector.
Figure 8B:
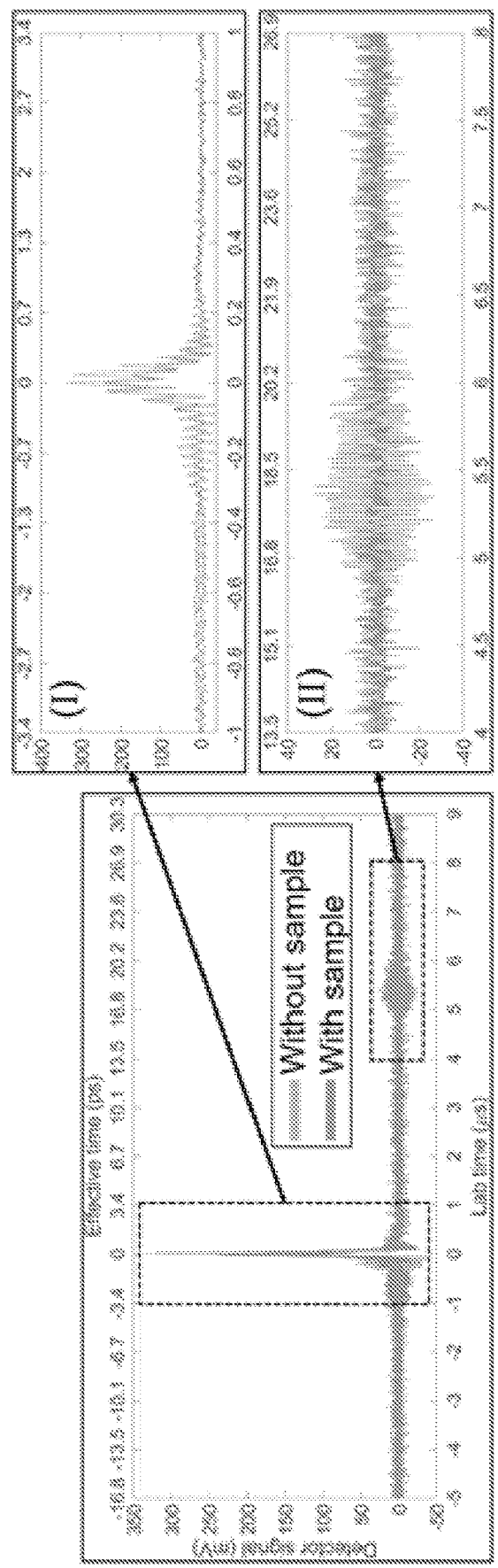

Measurements. FIG. 2A presents five consecutive interferograms with a period of 1.188 ms, out of which the central 14 μs of one interferogram is depicted in FIG. 2b. The prominent effects due to $CO_2$ can be observed in both the center-burst (FIG. 2C) and the tail (FIG. 2D), which is the result of the coherent addition of molecular free induction decay (FID)[19,20]. Note that, thanks to the "temporal gating"[12] (Supplementary Information Section 1.2), the background power at the tail is much weaker than that at the center-burst. However, this background (RF band A and D) is not visible in the measurement shown in FIG. 2 as it is concealed by the balanced detector, though it can be observed if the detector is not well balanced (FIG. 8). This "temporal gating" is the result of the target pulse being sampled by short local pulses through the nonlinear process (SFG), which makes it possible to temporally isolate the relatively weak molecular fingerprint responses (FID) from the strong excitation background, suggesting the potential of a boosted dynamic range for this method compared to dual-comb spectroscopy, similar to EOS[12].

Figure 3B:
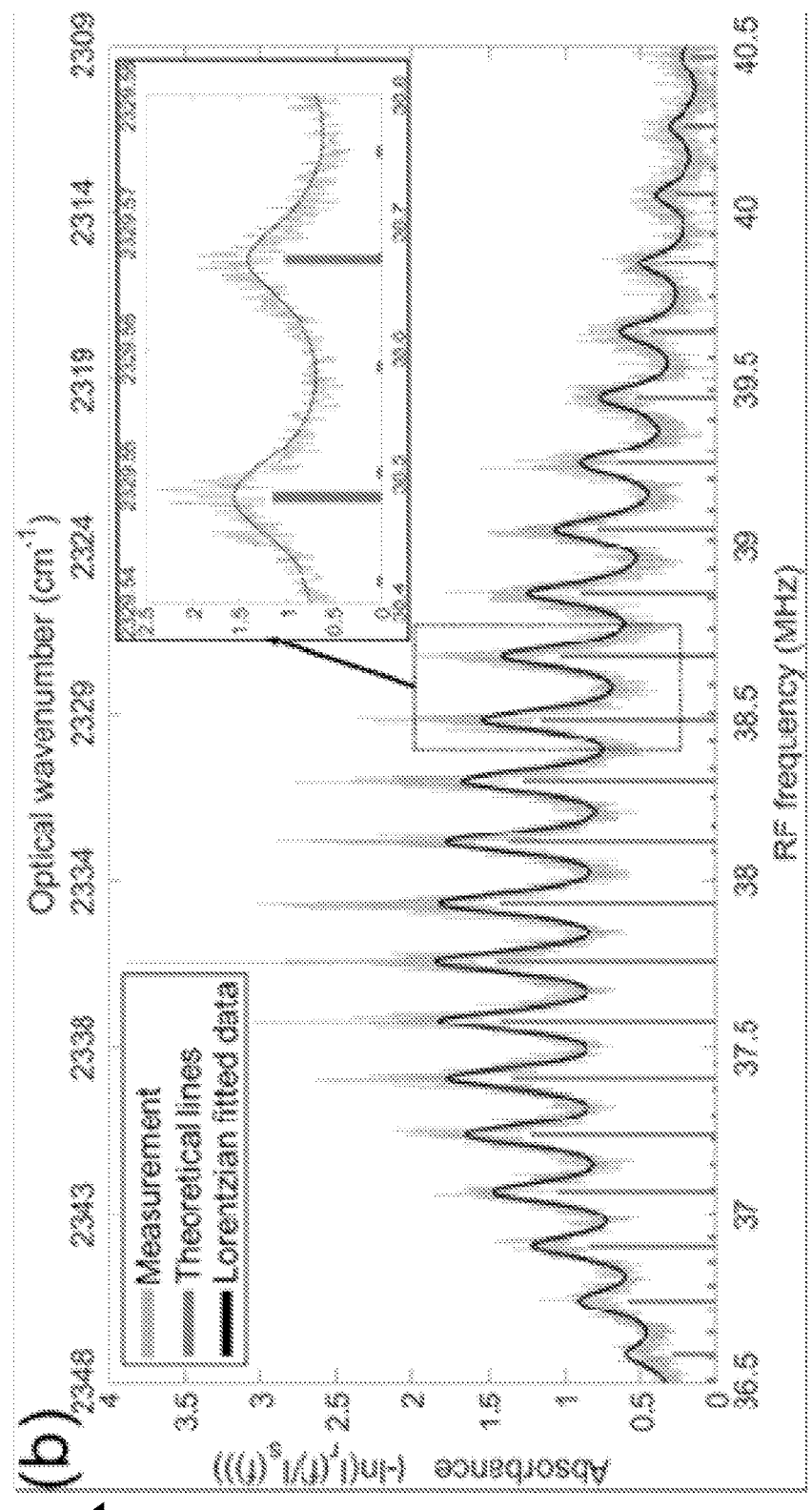
Figure 4A:
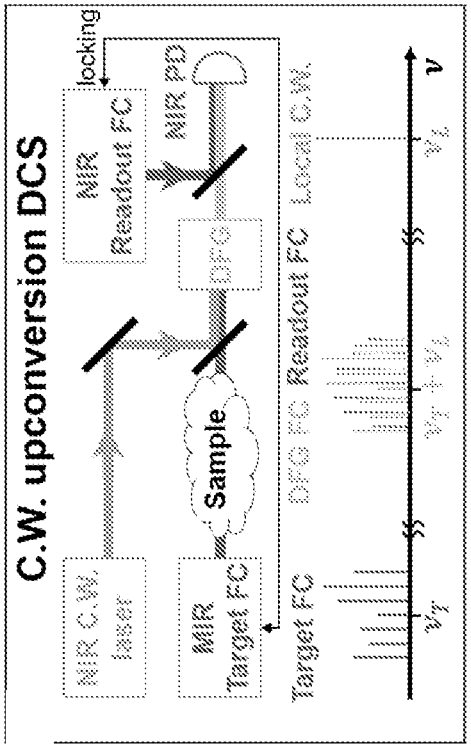
FIGS. 4A-4D. Simplified schematics of different dual-comb-based spectroscopy techniques used in the MIR including the presented CCS. Note that generally balanced detectors are used for all techniques in the first example, which are simplified to be single detectors in the schematics. Also, there may be additional equipment before the detector, which is also omitted here; for example, an ellipsometry setup for EOS.
Figure 4B:
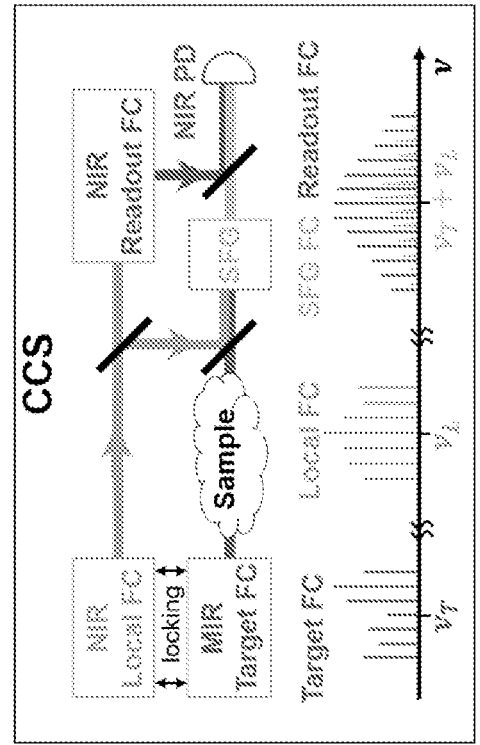
Figure 4C:
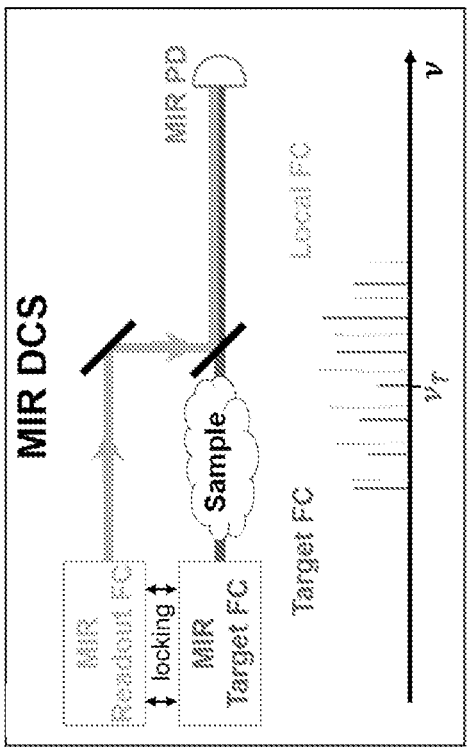
Figure 4D:
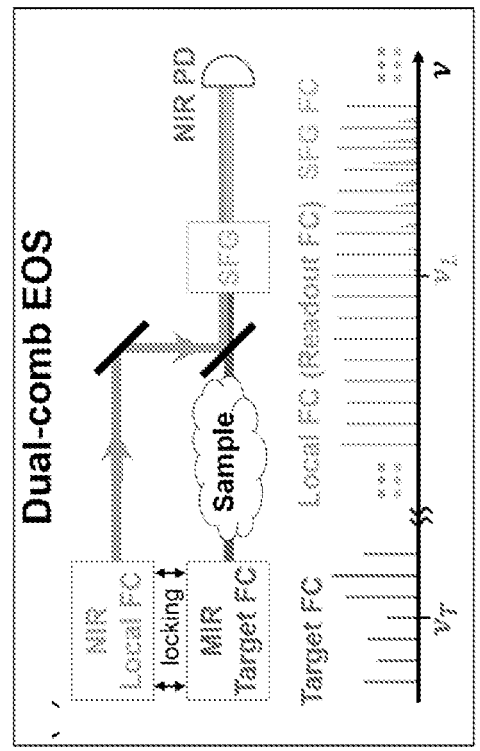

FIG. 3A represents the results in the frequency domain, obtained by the Fourier transform of 100 consecutive interferograms (118 ms) for both "without sample" and "with sample" cases, where ~2.5×10$^4$ comb teeth are resolved in the 200-cm$^{-1}$ band. The molecular absorbance spectrum is then obtained by comparing these measurements, which is shown in FIG. 3B (light blue curve). Only the P branch (rotational structure below the band origin) of the measured spectrum of $CO_2$ is shown here (see Supplementary Information Section 1.1). The theoretical absorbance spectrum (black curve) is calculated using spectral lines (red lines) from the HITRAN database[21] fitted with a Lorentzian line shape of 0.9 cm$^{-1}$ FWHM linewidth.

Note that these results are obtained by only locking the $f_{rep}$ of the target and local combs, while their relative carrier-envelope offset frequency ($f_{ceo}$) remains free-running, which is believed to be the main reason why the fitted absorption linewidth (0.9 cm$^{-1}$) is much larger than the theoretical pressure broadening (~0.2 cm$^{-1}$) at room temperature and atmospheric pressure. Locking the relative $f_{ceo}$ will also enable a more accurate calibration and a higher SNR. The SNR is expected to be further improved with more stable frequency locking, longer averaging, and use of a proper phase correction algorithm[5,22-24]. Moreover, the instantaneous spectral coverage can be extended by using a shorter PPLN crystal.

$^a$In principle, CCS does not require short pulses as the NIR local FC (Supplementary Information Section 2 and 3). However, the (short) local pulses enhance the upconversion efficiency and enable dynamic range improvement through temporal gating (Supplementary Information Section 1.2 and 3.5).

$^b$ To get a reasonable performance in CCS, the pulses are not required to be as short as the case of dual-comb EOS, where the pulses are shorter than the MIR optical cycle.

$^c$MIR DCS, C.W. upconversion DCS and CCS can all take full advantage of the optical bandwidth offered by the readout FC (and local FC if applicable), if its (their) optical band(s) is (are) tailored. In contrast, part of the band of the local (readout) FC in the dual-comb EOS is not effectively utilized. See discussion regarding their instrument response functions in Supplementary Information Section 3.

[d]If electric field of the readout FC (and local FC if applicable) is (are) known, all four techniques can reconstruct the electric field of the target pulse. However, this extra information may not be necessary for the purpose of general absorption spectroscopy (Supplementary Section 3).

Advantages and Improvements

CCS with our configuration has many advantages compared to other dual-comb-based techniques despite their similarities. FIG. 4 illustrates dual-comb-based spectroscopic techniques in the MIR, including DCS, Continuous Wave (CW) upconversion DCS, dual-comb EOS, and the presented CCS. In all four techniques, two combs of slightly detuned repetition rates are employed to replace the mechanical scanning stage used in traditional techniques. CCS can be considered the general form of frequency-converted DCS. It can be shown that CW upconversion DCS and dual-comb EOS are essentially two special cases of the CCS; the former uses a very narrow-band local "FC" with only one "comb tooth", and the latter uses a very broadband local FC (very short local pulses) which also functions as the readout FC (Supplementary Information Section 3). The features of these four techniques are summarized in Table 1 in FIG. 5, showing how CCS in the MIR with our configuration combines many of the merits of DCS and dual-comb EOS, including high resolution and fast acquisition time, while circumventing some of their practical challenges, such as poor performance of MIR detectors or complicated detection setup and the requirements of two MIR combs or ultrashort sampling pulses.

The first example demonstrates experimentally the concept of cross-comb spectroscopy in the MIR. The example shown samples the spectral information of a 4-μm comb with a 1.5-μm comb. Photodetection in this method is accomplished by only one NIR balanced detector. This work enables a flexible, and efficient avenue to high-precision spectroscopy in spectral regions with less developed sources and detectors utilizing dual-comb wavelength conversion.

REFERENCES FOR THE FIRST EXAMPLE

The following references are incorporated by reference herein
1. Coddington, I., Newbury, N. & Swann, W. Dual-comb spectroscopy. *Optica* 3, 414-426 (2016).
2. Picqué, N. & Hänsch, T. W. Frequency comb spectroscopy. *Nature Photonics* 13, 146-157(2019).
3. Weichman, M. L. et al. Broadband molecular spectroscopy with optical frequency combs. *Journal of Molecular Spectroscopy* 355, 66-78 (2019).
4. Timmers, H. et al. Molecular fingerprinting with bright, broadband infrared frequency combs. *Optica* 5, 727-732 (2018).
5. Ycas, G. et al. High-coherence mid-infrared dual-comb spectroscopy spanning 2.6 to 5.2 μm. *Nature Photonics* 12, 202-208 (2018).
6. Muraviev, A. V., Smolski, V. O., Loparo, Z. E. & Vodopyanov, K. L. Massively parallel sensing of trace molecules and their isotopologues with broadband subharmonic mid-infrared frequency combs. *Nature Photonics* 12, 209-214 (2018).
7. Chen, Z., Hänsch, T. W. & Picqué, N. Mid-infrared feed-forward dual-comb spectroscopy. *PNAS* 116, 3454-3459 (2019).
8. Villares, G., Hugi, A., Blaser, S. & Faist, J. Dual-comb spectroscopy based on quantum-cascade-laser frequency combs. *Nature Communications* 5, 5192 (2014).
9. Schliesser, A., Picqué, N. & Hänsch, T. W. Mid-infrared frequency combs. *Nature Photonics* 6, 440-449 (2012).
10. Rogalski, A. Infrared detectors: status and trends. *Progress in Quantum Electronics* 27, 59-210 (2003).
11. Kowligy, A. S. et al. Infrared electric field sampled frequency comb spectroscopy. *Science Advances* 5, eaaw8794 (2019).
12. Pupeza, I. et al. Field-resolved infrared spectroscopy of biological systems. *Nature* 577, 52-59 (2020).
13. Stead, R. A., Mills, A. K. & Jones, D. J. Method for high resolution and wideband spectroscopy in the terahertz and far-infrared region. *J. Opt. Soc. Am. B* 29, 2861-2868 (2012).
14. Riek, C. et al. Direct sampling of electric-field vacuum fluctuations. *Science* 350, 420-423 (2015).
15. Chen, Z., Hänsch, T. W. & Picqué, N. Upconversion mid-infrared dual-comb spectroscopy. arXiv:2003.06930 [physics] (2020).
16. Yokoyama, S., Yokoyama, T., Hagihara, Y., Araki, T. & Yasui, T. A distance meter using a terahertz intermode beat in an optical frequency comb. *Opt. Express* 17, 17324-17337 (2009).
17. Sorokin, E. et al. Efficient half-harmonic generation of three-optical-cycle mid-IR frequency comb around 4 μm using OP-GaP. *Opt. Express* 26, 9963-9971 (2018).
18. Coddington, I., Swann, W. C. & Newbury, N. R. Coherent dual-comb spectroscopy at high signal-to-noise ratio. *Phys. Rev. A* 82, 043817 (2010).
19. Harde, H., Keiding, S. & Grischkowsky, D. THz commensurate echoes: Periodic rephasing of molecular transitions in free-induction decay. *Phys. Rev. Lett.* 66, 1834-1837 (1991).
20. Coddington, I., Swann, W. C. & Newbury, N. R. Time-domain spectroscopy of molecular free-induction decay in the infrared. *Opt. Lett.* 35, 1395-1397 (2010).
21. Gordon, I. E. et al. The HITRAN2016 molecular spectroscopic database. *Journal of Quantitative Spectroscopy and Radiative Transfer* 203, 3-69 (2017).
22. Ideguchi, T., Poisson, A., Guelachvili, G., Picqué, N. & Hänsch, T. W. Adaptive real-time dual-comb spectroscopy. *Nature Communications* 5, 3375 (2014).
23. Roy, J., Deschênes, J.-D., Potvin, S. & Genest, J. Continuous real-time correction and averaging for frequency comb interferometry. *Opt. Express* 20, 21932-21939 (2012).
24. Burghoff, D., Yang, Y. & Hu, Q. Computational multiheterodyne spectroscopy. *Science Advances* 2, e1601227 (2016).

Supplementary Information for the First Example
1.1 Setup and Optical Spectra
The setup diagram for the data obtained in the First Example is depicted in FIG. 6, and the optical spectra are depicted in FIG. 7.

The target FC is provided by a chain of two cascaded half-harmonic OPOs[1]. Pumped by a commercial mode-locked Yb: fiber laser centered at 1.045 μm, the first half-harmonic OPO generates 2.09-μm pulses, which are then used to pump the second half-harmonic OPO at 4.18 μm. Half-harmonic OPOs feature intrinsic phase and frequency locking of their output to the pump[2], thus the phase and frequency of the 4.18-μm OPO are intrinsically locked to that of the 1.045 μm pump. Hence, by locking the $f_{rep}$ ($f_{ceo}$) of the 1.045-μm laser to that of the 1.55-μm Er: fiber laser (local FC), the target FC (4.18-μm OPO) is locked to the local FC. In this experiment, the $f_{rep}$ and $f_{ceo}$ of the local FC along with the $f_{rep}$ of the 1.045-μm laser and all measurement apparatus are locked to a 10-MHz RF rubidium (Rb) clock, ensuring a common frequency standard. The $f_{ceo}$ of the 1.045-μm laser is not locked, which will be the next step of our work.

Figure 7A:
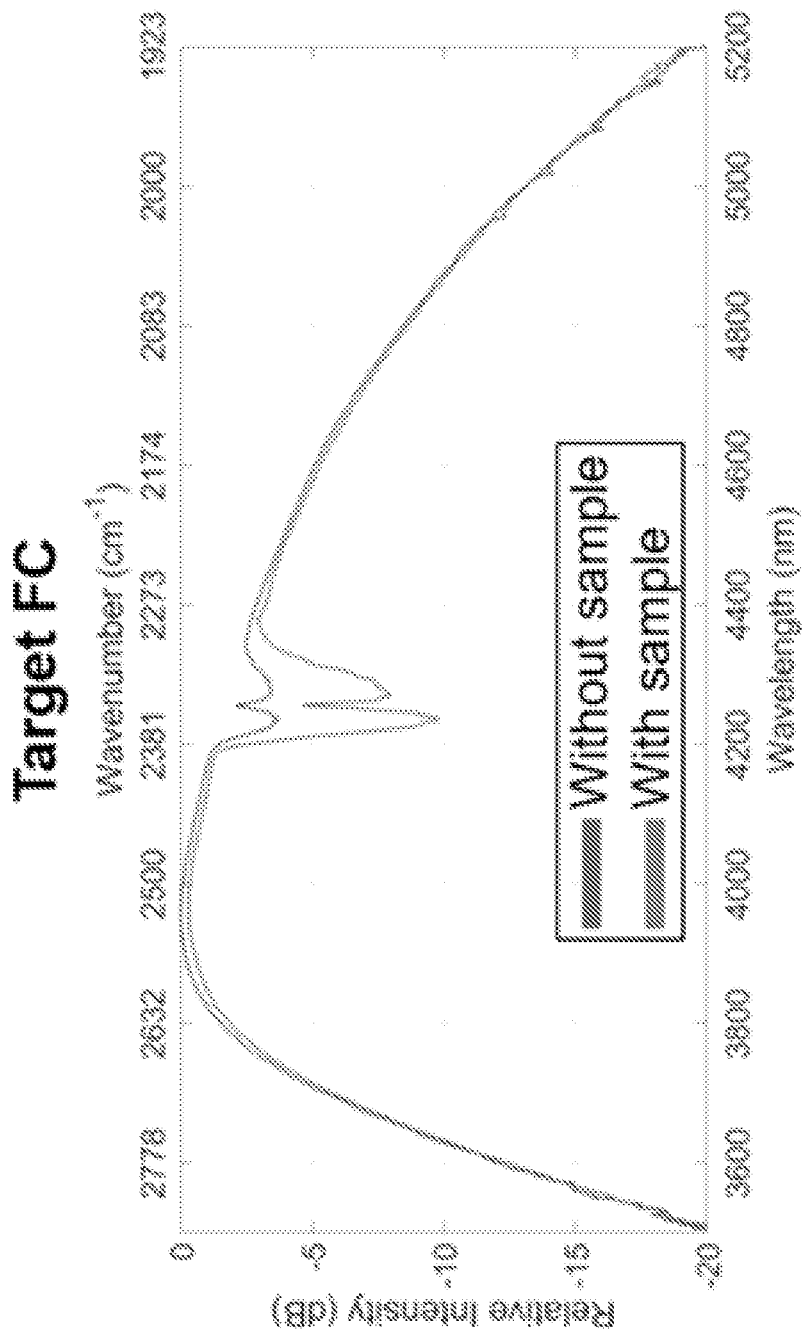
FIGS. 7A-7D. Optical spectra and full measured absorbance spectrum of atmospheric $CO_2$.
Figure 7B:
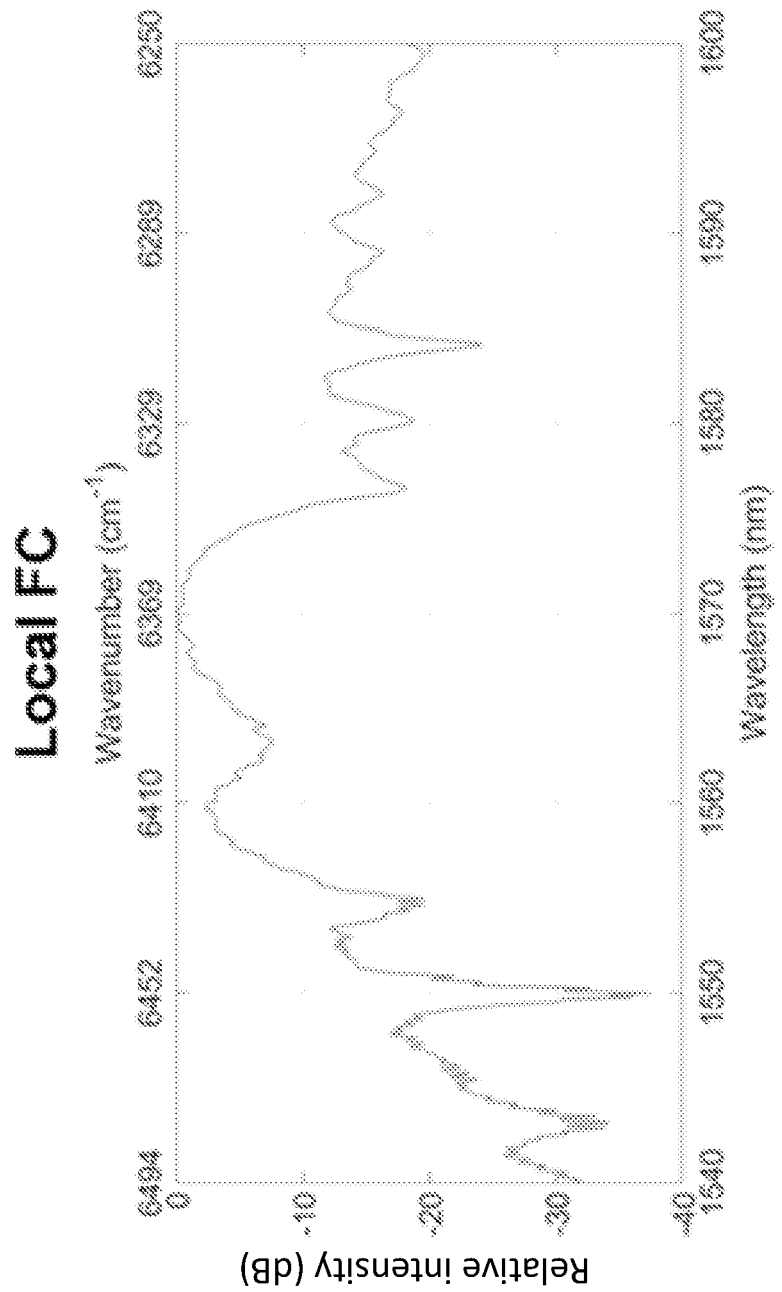
Figure 7C:
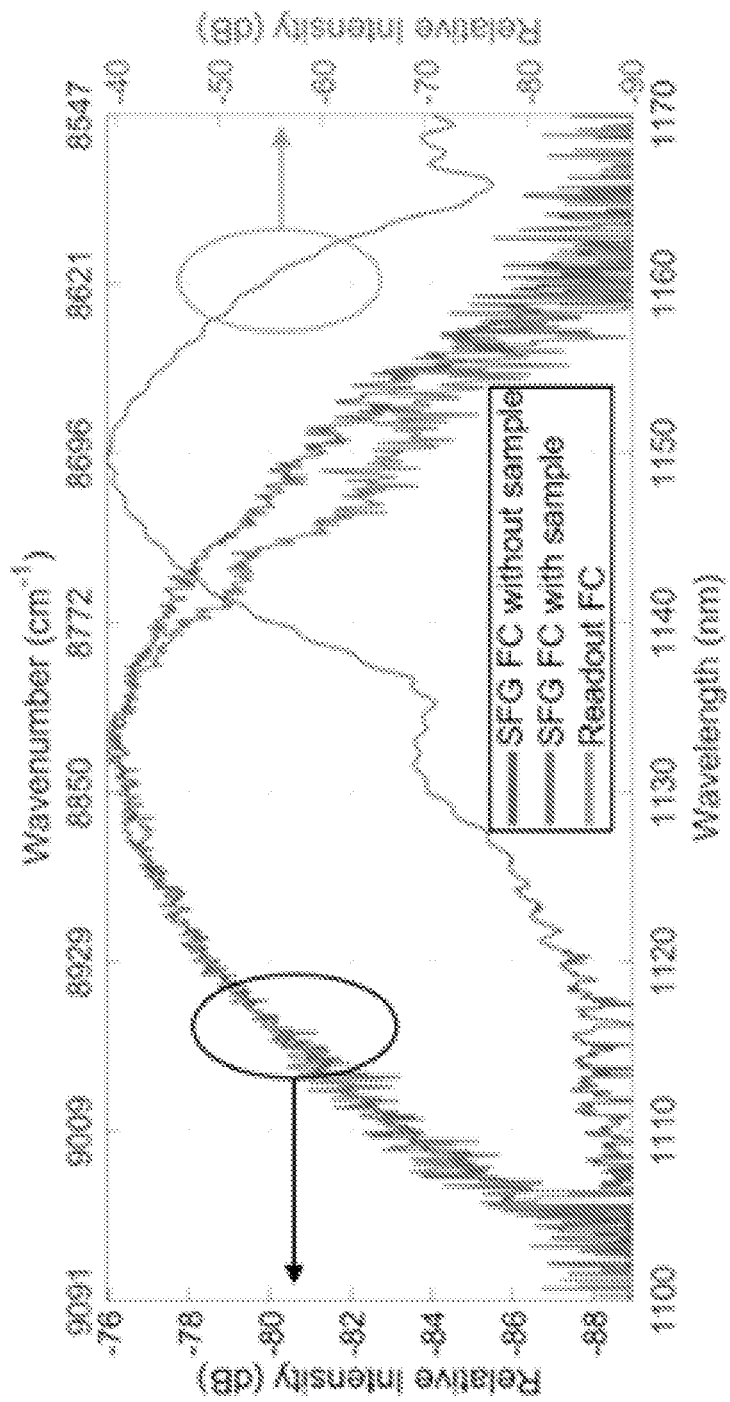
Figure 7D:
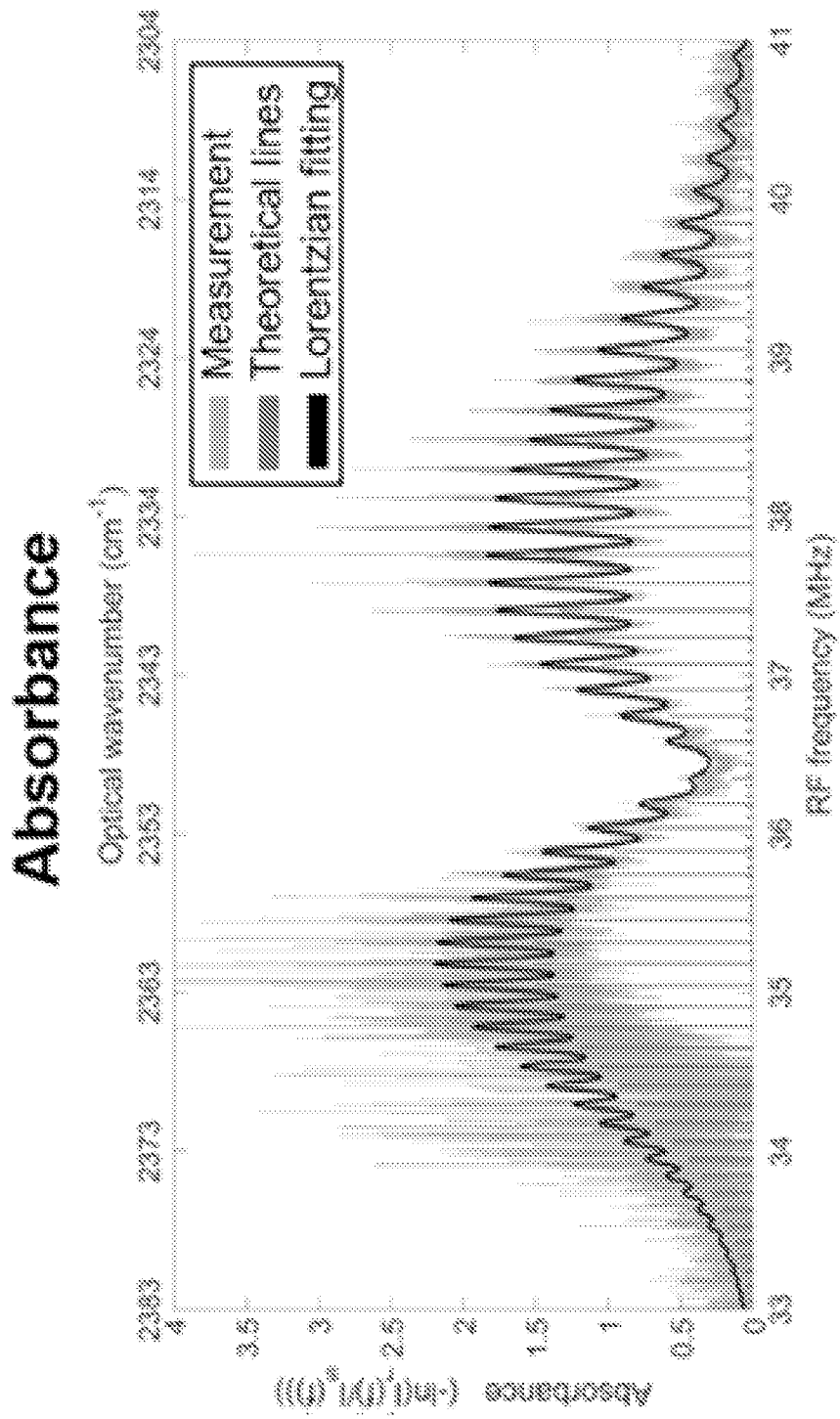

As shown in FIG. 7C, the SFG FC is centered around 1133 nm. To obtain the best signal-to-noise ratio and bandwidth coverage using cross-comb spectroscopy, the spectrum of the readout FC should overlap with that of the SFG FC. However, this is currently not achieved because of the temporary lack of a bandpass filter with a more suitable center wavelength. The best bandpass filter available to us at the moment is centered around 1150 nm, so its pass-band does not overlap with the SFG FC very well, as shown in the same plot. Thus, the left side of the spectrum (higher optical frequency, R branch) has a poor SNR compared to its right-side counterpart (lower optical frequency, P branch). This results from the fact that the intensity of the readout FC is very low on the left side (shorter wavelength, higher optical frequency) of the SFG spectrum, which can be easily enhanced by using a proper filter.

1.2 Temporal Gating Effect

In the interferogram of an asymmetric dual-comb measurement, there are weak tails following the strong centerbursts, called "optical free induction decay," that contain spectral information of the sample. However, as dual-comb is a linear cross-correlation process, the beat notes at the tail are on top of a strong background resulting from the power of the strong excitation pulse. This puts a hard limit on the signal-to-noise ratio (SNR) of the measurement with increasing excitation power, since the strong background will cause extra noise and will ultimately saturate the detector[3].

In contrast, in electro-optic sampling (EOS), the mid-IR target pulse is nonlinearly sampled by ultrashort near-IR local pulses via the sum-frequency-generation process in a nonlinear crystal. When the short near-IR pulse samples the weak tail of the target pulse, as a result of the optical nonlinearity, the generated signal will be only dependent on the intensity of the MIR pulse at that time delay, free from the strong background. This enables a boosted dynamic range for the signal at the tail, where the spectral information is located. Detailed discussion regarding this effect, coined as "temporal gating" or "nonlinear gating", can be found in reference [3].

For the same reason as in EOS, our cross-comb method can also benefit from the temporal gating, although our local pulse is not as short as that of EOS. However, this effect cannot be seen in the measurement shown in FIG. 2 because the balanced detection conceals the strong background. Corresponding to band A and band D of the RF FC (see Section 2.4), the background is a common-mode signal only from the port of the SFG FC and thus is cancelled by the balanced detection. As shown in FIG. 3, if we tweak the coupling of the splitter to the balanced detector (FIG. 3A) such that it is not well-balanced, the strong background will show up prominently at the center-burst (FIG. 3B). The strong gaussian-shaped background is detrimental for the beat signal there because it causes extra noise and can saturate the amplifier or even the detector. However, because of the temporal gating, the beating at the tail, which contains useful information, is free from this unfavorable background. A mathematical description of this effect can be found in Section 3.5.

Note that the balanced detection can only "conceal" the background in its RF output, but it cannot solve the problem caused by the strong background. Although a well-balanced detector can cancel the common-mode signal and noise in its RF output by comparing the outputs of two photodiode, there may still be strong common-mode optical power incident on each photodiode which is not visible in the balanced output. The strong incident optical power can bring in noise which is not common-mode and thus cannot be cancelled, and it will ultimately saturate the photodiodes if appropriate measures are not taken.

2. One-to-one tooth mapping from target FC to RF FC 2.1 Target FC and Local FC

The electric field of the local FC can be described by $$e_L(t) = \sum_m A_m^L \exp(i\phi_m^L)\exp(-i2\pi v_m t) = \sum_m L_m \exp(-i2\pi v_m t)$$

where $L_m$ denotes the complex amplitude that encodes both the intensity and phase of the $m^{th}$ local comb tooth with optical frequency $v_m$, and the spatial dependence is omitted here. The superscript "L" of $A_m^L$ and $\phi_m^L$ denotes local FC, and the subscript "m" corresponds to the mth comb tooth. In addition, for the optical frequency $v_m$, we have $$v_m = m f_{r,L} + f_{ceo,L}$$

where $f_{r,L}$ and $f_{ceo,L}$ are the repetition rate and carrier-envelope offset (CEO) frequency of the local FC, respectively.

Sometimes it is not convenient to directly use "m" to index comb teeth, since the first tooth usually occurs at very large m. To be specific, for the first tooth of a practical frequency comb, $m_{first} \sim 10^6$. For convenience, here we define the effective tooth index, m', which starts at 1. If we use $m_{first}$ to denote the tooth index of the first local tooth, we have:

$$v_{m'1} = v_{m_{first}} = (m_{first} - 1)f_{r,L} + 1 \times f_{r,L} + f_{ceo,L} = 1 \times f_{r,L} + f_{ceo,L} + v_{start,L}$$

Where $v_{start,L} = (m_{first} - 1)f_{r,L}$.

Then, for any $m'^{th}$ teeth (m' starts from 1), $$v_{m'} = m' f_{r,L} + f_{ceo,L} + v_{start,L}$$

Like the local FC, we use $X_n$ to denote the complex amplitude of the $n^{th}$ target comb tooth with the optical frequency $v_n$. We have $$e_T(t) = \sum_m X_n \exp(-i2\pi v_n t), v_n = n(f_{r,L} + \delta) + f_{ceo,T}$$

Where δ denotes the repetition rate detuning between the local and target FC, i.e., $f_{r,T} = f_{r,L} + \delta$.

Similarly, we can also define the effective tooth index for target comb teeth, $$v_{n'} = n' f_{r,T} + f_{ceo,T} + v_{start,T}, v_{start,T} = (n_{first} - 1)f_{r,T}$$

Figure 9A:
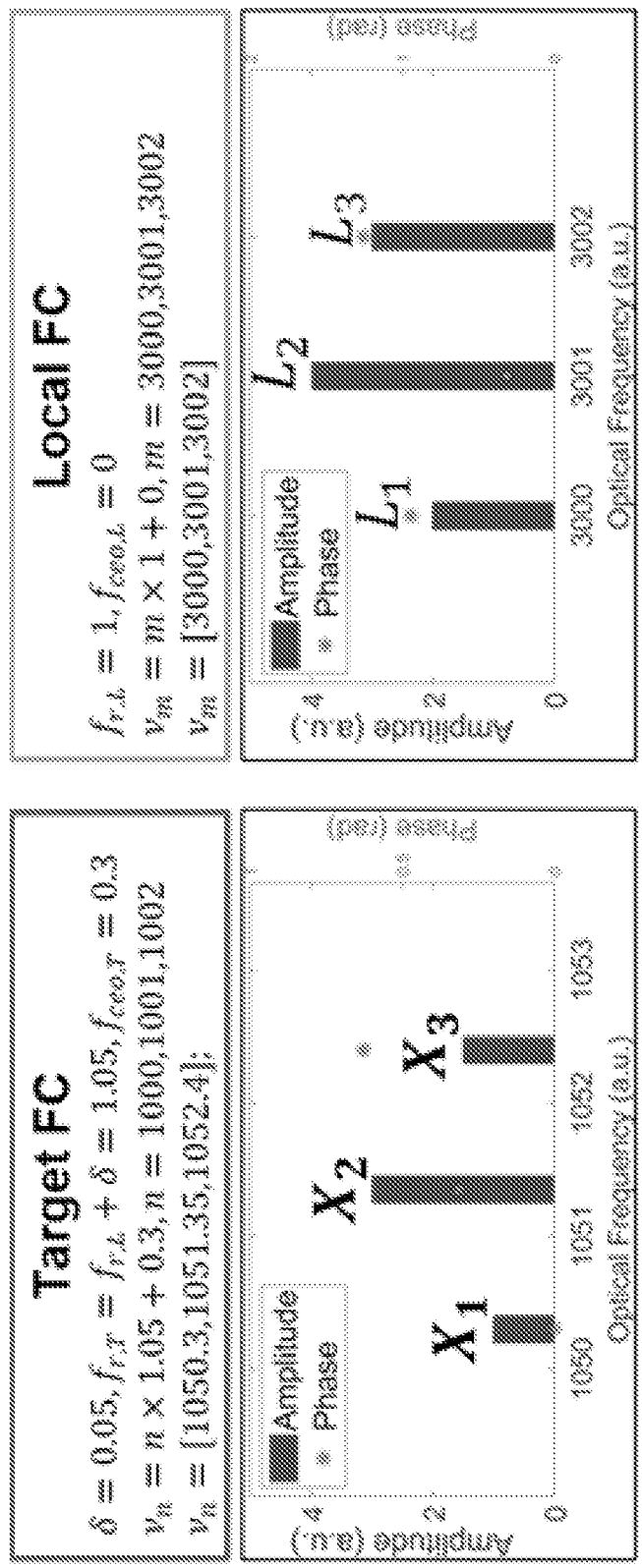
FIGS. 9A-9C. Quantitative illustration of one-to-one tooth mapping of cross-comb spectroscopy.

Using the notation introduced above, the frequency-domain picture of cross-comb spectroscopy is depicted in FIG. 9. To make a concise and clear illustration, only three teeth are included for both FC, and simple random numbers are assigned to their optical frequencies, which are of arbitrary unit (FIG. 9A). Note that generality is not lost by assigning $f_{ceo,L}=0$, since in practice it is just the relative $f_{ceo}$ between the two FCs that matters. Although only a small number of comb teeth and simple random numbers are used for the following illustrations and equations, the conclusions still hold when scaled to practical numbers.

2.2 SFG FC

Because of the slightly detuned repetition rates between the local and target FCs, each pair of teeth from them will generate an SFG tooth at a unique frequency, the set of which are referred to as the SFG FC. The electrical field of a certain SFG tooth can be described by (phase-matching effect is not included here)

$$E_{n,m}^{sfg} = L_m X_n \exp(-i2\pi v_{n,m}^{sfg} t), v_{n,m}^{sfg} = v_n + v_m$$

Figure 9B:
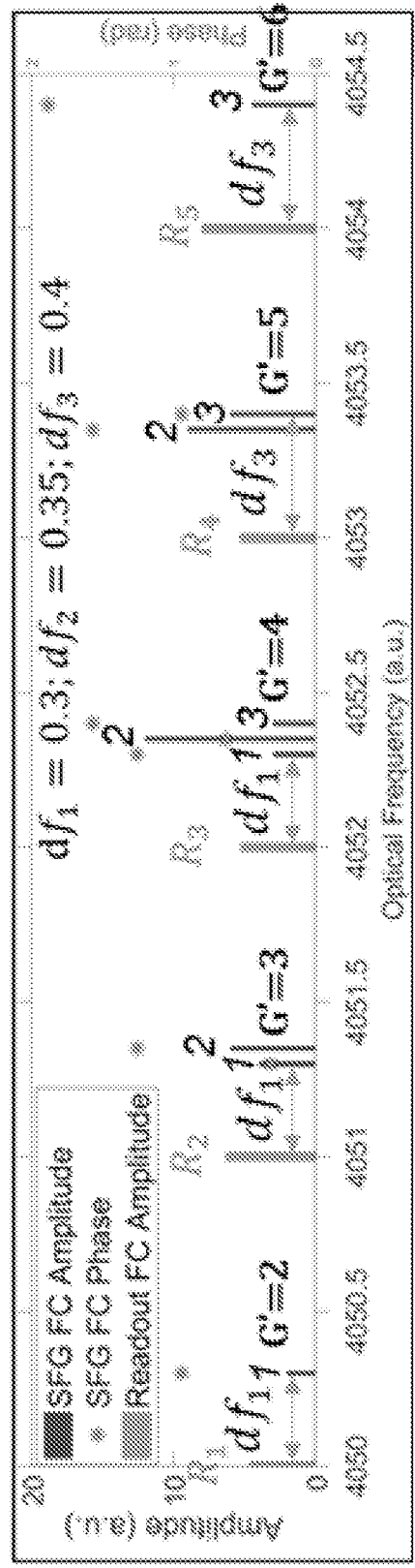

As shown in FIG. 9B, the resultant SFG comb teeth cluster into different frequency groups[4], which can be indexed by the group index $G=n+m$ (or effective group index $G'=n'+m'$), and the groups are evenly spaced by $f_{r,L}=1$. The group $G'$ is generated by the SFG between the ... $(n'-1)^{th}$, $n'^{th}$, $(n'+1)^{th}$ ... target teeth and the ... $(m'+1)^{th}$, $m'^{th}$, $(m'-1)^{th}$ ... local teeth. Note that the center group, with $G'=4$, contains information about all the target teeth, in spite of the fact that different target teeth are modulated by different local teeth (see also FIG. 1). Such a group that contains the information for all target teeth is called a "complete (SFG) group" in the following context. It is readily seen that the number of complete groups formed is determined by the number of local teeth relative to target teeth.

More patterns can be observed within SFG groups. Firstly, SFG teeth in a single group are separated by δ. Secondly, mixing with different local teeth, a given target tooth will generate multiple SFG teeth, which are all at the same relative frequency position in their respective SFG groups. To illustrate the second pattern, each SFG tooth in FIG. 9B is labeled by its corresponding target tooth ("1", "2", or "3"). The pattern is made clearer still if readout teeth are introduced as frequency references (see next subsection). These patterns make it possible to do one-to-one mapping between the MIR and RF domains.

2.3 Readout FC

To read out the spectral information of the target FC contained in the SFG FC of the first example, another comb, referred to as the readout FC, is employed to beat with the SFG FC on a square-law photodetector. The readout FC is effectively a spectral extension of the local FC and therefore inherits its $f_{rep}$ and $f_{ceo}$. As shown in FIG. 9B, readout comb teeth can be regarded as "boundary markers" for SFG groups, since they share the same constant distance $f_{r,L}$ between each unit. For a certain SFG group, we name its closest (second closest) readout tooth as its "primary (secondary) readout tooth". For a certain SFG tooth within a SFG group, we name the frequency difference between the tooth and its primary (secondary) readout tooth as its "primary (secondary) readout frequency", and the sum of its primary and secondary readout frequencies is $f_{r,L}$. As shown in the illustration, the SFG teeth generated by the same target tooth always have the same primary readout frequency, even though they are distributed in different SFG groups and correspond to different primary readout teeth. Also, SFG teeth generated by different target teeth have different primary readout frequencies, denoted by $df_{n'}$ in the illustration. These two patterns are very important and provide the foundations for the one-to-one mapping.

As with the local and target FCs, we use "$R_q$" to denote the complex amplitude of the $q^{th}$ comb tooth of the readout FC.

$$e_R(t) = \sum_q R_q \exp(-i2\pi v_q t), v_q = qf_{r,R} + f_{ceo,R}$$

Also, we can define the effective tooth index for readout comb teeth:

$$v_{q'} = q'f_{r,R} + f_{ceo,R} + v_{start,R}, v_{start,R} = (R_{first}-1)f_{r,R}$$

Note that $f_{ceo,R} = f_{ceo,L}$ and $f_{r,R} = f_{r,L}$.

2.4 RF FC, One-to-One Mapping, and Absorption Spectrum

Based on the SFG and readout comb teeth in the optical domain, one can calculate the resultant RF spectrum detected by a single square-law detector. The bandwidth of the detector is assumed to be "1" ($f_{r,L}$), which means that the highest RF frequency the detector can detect is the repetition rate of the local FC, $f_{r,L}$. This is a common condition for many works in dual-comb spectroscopy. To calculate the RF signal (photocurrent) at a given RF frequency, one must sum the contributions from all the comb tooth pairs that can generate heterodyne beating at this frequency.

$$I_{f_0} = \sum_{f^{rf}=f_0} A_1 A_2^*, f^{rf} = v_1 - v_2 = f_0$$

Figure 9C:
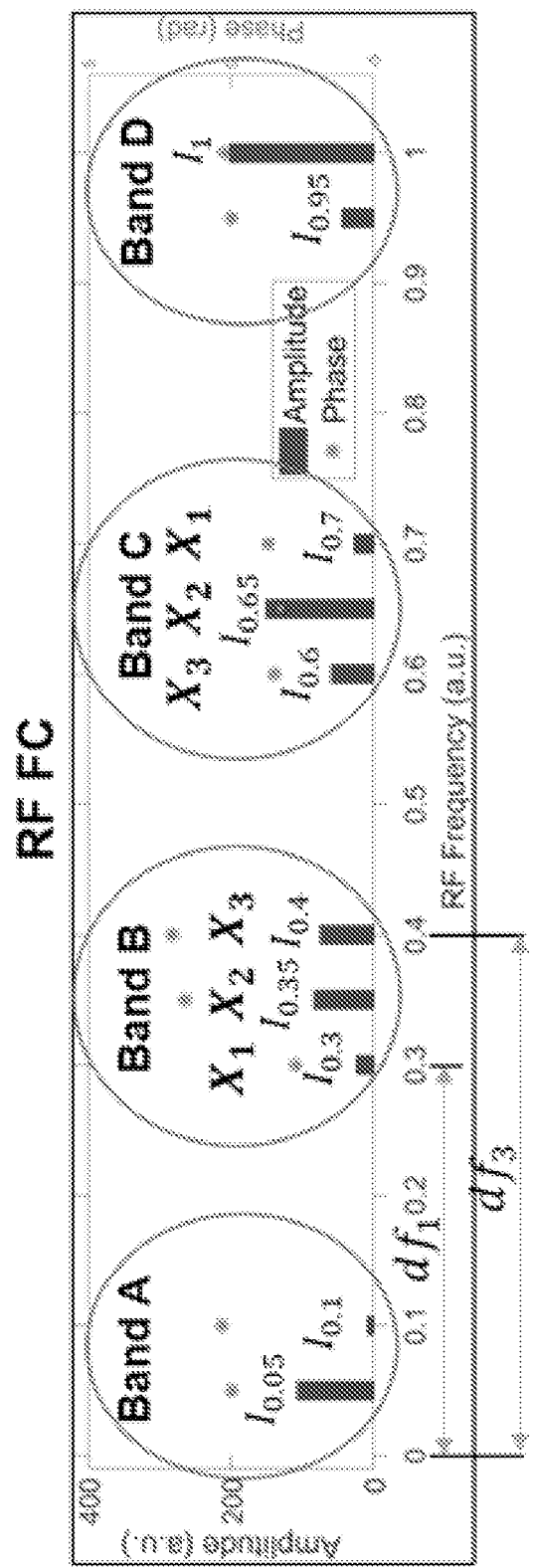

$A_1$ and $A_2$ denote the complex amplitude of the two involved comb teeth, which can be from the SFG or readout FC. The RF frequency of the beating signal, $f_{rf}$, is equal to the difference between the optical frequencies of the two involved comb teeth. Following these equations, for the case of this illustration, the RF signal at different frequencies can be calculated Band A $\begin{cases} I_{0.05} = (L_1 L_2^* + L_2 L_3^*)(X_1^* X_2 + X_2^* X_3) \\ I_{0.1} = (L_1 L_3^*) X_1^* X_3 \end{cases}$ Band B $\begin{cases} I_{0.3} = (L_1 R_1^* + L_2 R_2^* + L_3 R_3^*) X_1 \\ I_{0.35} = (L_1 R_2^* + L_2 R_3^* + L_3 R_4^*) X_2 \\ I_{0.4} = (L_1 R_3^* + L_2 R_4^* + L_3 R_5^*) X_3 \end{cases}$ Band C $\begin{cases} I_{0.6} = (R_4 S_1^* + R_5 S_2^* + R_6 S_3^*) X_3^* \\ I_{0.65} = (R_3 S_1^* + R_4 S_2^* + R_5 S_3^*) X_2^* \\ I_{0.7} = (R_2 S_1^* + R_3 S_2^* + R_4 S_3^*) X_1^* \end{cases}$ Band D $\begin{cases} I_{0.95} = L_3 L_1^* (X_1 X_2^* + X_2 X_3^*) \\ I_1 = (L_2 L_1^* + L_3 L_2^*)(X_1^* X_1 + X_2^* X_2 + X_3^* X_3) + \left(\sum_{a=1}^{4} R_q^* R_{q+1}\right) \end{cases}$ Note that, for simplicity, here we use subscript effective tooth indices "1,2,3", "1,2,3" and "1,2,3,4,5,6" (m', n', q') to index different comb teeth of the target FC, local FC and readout FC, respectively. The resulting teeth are also illustrated in FIG. 9C and are referred to as the "RF FC".

As shown in the illustration, RF FC comb teeth can be classified into four bands[5]. Band A consists of the intragroup beat notes, which are generated by two SFG teeth from the same SFG group. Band D is also composed of beat notes generated by two SFG teeth, but the two teeth are from two different adjacent SFG groups. Note that the frequency component with $f^{rf}=f_{r,L}=1$ is a special component in band D which also includes the contribution from beatings between two readout teeth. Band A and band D result from only the SFG FC (excluding $f_{rf}=1$) and correspond to the envelope of the SFG pulses (cross-correlation signal between target and local FC) in the time domain, which doesn't contain much useful information for our purpose. In contrast, band B, consisting of beat notes between SFG teeth and their primary readout teeth, is a one-to-one mapping of the original target FC. As demonstrated in the equations, the complex amplitude of a certain band B RF tooth is related to and directly proportional to that of only one target tooth, although it is generally modulated by more than one local tooth and readout tooth. Like band B, band C is also a one-to-one mapping of the original target FC, resulting from beating between SFG teeth and their secondary readout teeth. Band B and C contain the exact same information regarding the target FC, which are mirror images of each other, reflected about $f_{r,L}/2$ in the RF domain.

Based on the one-to-one mapping, the absorption spectrum in the MIR region interrogated by the target FC, including both amplitude and phase, can be obtained by comparing the RF band B (C) measured with the sample in the path and the corresponding result measured without the sample in the path (reference).

2.5 Universality

In the first example, we use a MIR synchronously pumped degenerate OPO (centered at 4.18 μm) and Er-doped fiber laser (centered at 1.55 μm) as the target FC and local FC, respectively. The readout FC is a band-pass filtered portion of a supercontinuum pumped by the local FC, which is generated in a photonic crystal fiber (PCF). It should be noted that the scheme of cross-comb spectroscopy (CCS) doesn't have any limitation on the laser techniques used for the frequency comb generation. However, the current implementation benefits from the intrinsic phase locking of the mid-IR comb to the Yb: fiber laser pump. Also, as a special case of CCS, the local FC or readout FC can be replaced by a "frequency comb" with only one tooth, i.e., a CW (continuous wave) laser. This is explained in depth in the following section.

Moreover, in this derivation, we demonstrate the frequency-up-conversion one-to-one comb tooth mapping by SFG. In fact, it is also possible to realize one-to-one mapping by difference frequency generation (DFG), the derivation of which is very similar. This may be useful in the application of frequency-comb-based spectroscopy in the ultraviolet spectral range or for even shorter wavelengths.

2.6 Bandwidth Requirements for Local FC and Readout FC

Figure 10A:
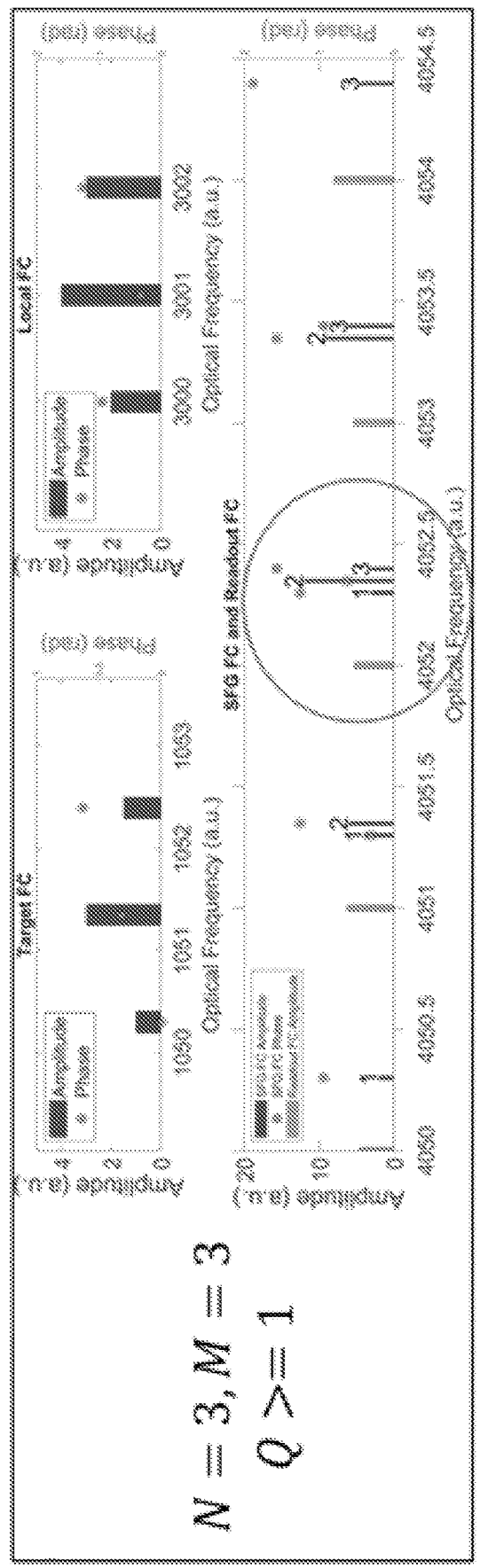
FIGS. 10A-10C. Bandwidth requirements for local FC and readout FC. M, N and Q denote the number of comb teeth for the target, local, and readout FCs, respectively.
Figure 10B:
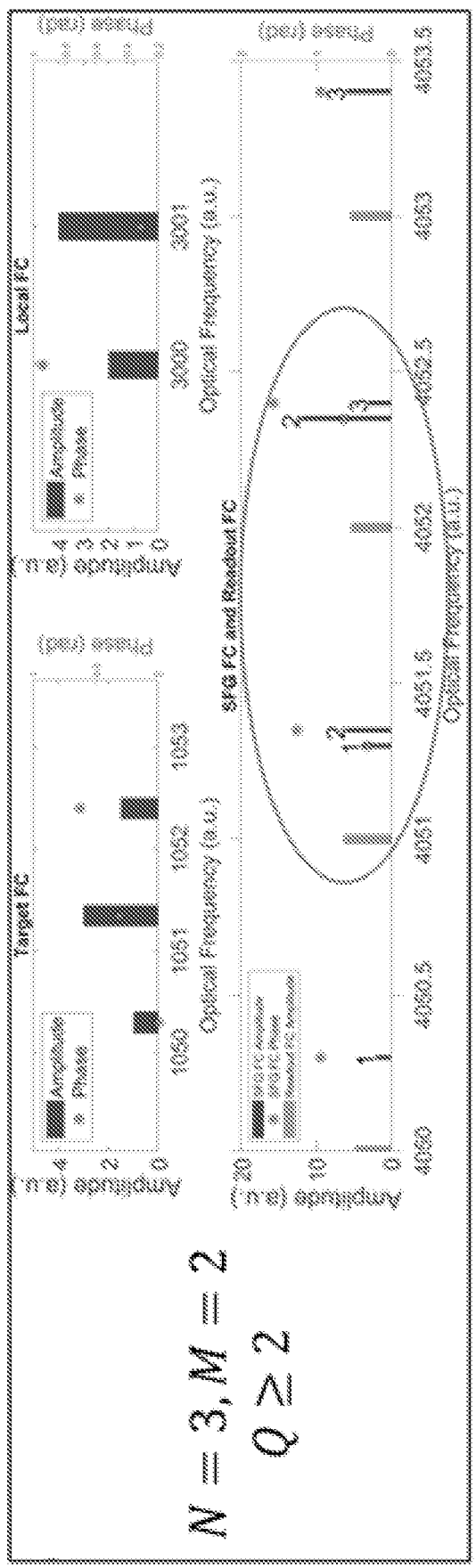
Figure 10C:
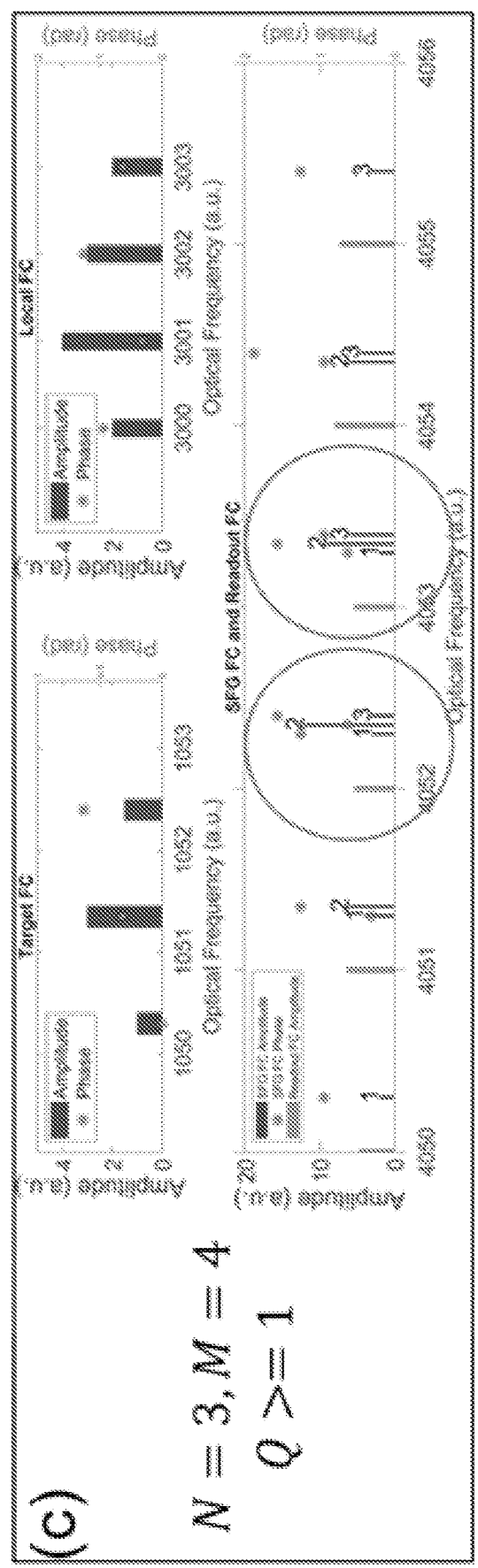

To realize one-to-one mapping for all teeth of the target FC, local FC and readout FC, one must satisfy some requirements which will be discussed in detail in this subsection. To provide a concise discussion, we continue to use the simple illustration above, keeping the number of target teeth to be three but varying the number of local teeth to be 2, 3, or 4. The results are shown in FIG. 10. N, M, and Q denotes the number of teeth of the target, local and readout FCs, respectively.

As shown in the panel (a), when M=N, there is only one complete group (circled in red) formed in the SFG FC, which alone contains the information from all target teeth. Thus, to read all target information out, one readout tooth is required at minimum (R>=1), where the equality holds if and only if the readout tooth is the primary (or secondary) readout tooth of that complete group.

If we have one less local tooth (M=2, panel (b)), there is no complete group formed in the SFG FC, and at least two readout teeth are needed to read all three target teeth out (Q>=2). Similarly, to make the equality hold, the readout teeth need to be the primary (or secondary) readout teeth for those two center SFG groups, which are circled in red.

When there is one more local tooth relative to the number of target teeth (M=4, panel (c)), there will be two complete groups (circled in red) formed in the SFG FC. As in the case of L=3, one readout tooth is enough to read out all the target information (Q>=1). However, because of the availability of more complete groups, the requirement of the location of the single readout tooth to make the equality hold is more relaxed compared to the case of M=3. Here, it can be the primary (or secondary) readout tooth of either complete group.

This discussion can be generalized to any large number of teeth, although the various cases are demonstrated only in small numbers here for simplicity. In short, to realize the one-to-one mapping of all target teeth, the minimum required aggregate bandwidth of the local and readout FCs needs to be equal to or greater than that of the target FC, i.e., $M+Q \geq (N+1)$. Note that there are two trade-offs behind this equation:

a. The trade-off between the local tooth number and readout tooth location. If there are more local teeth, the location (frequency) of the readout teeth can be more flexible since there are more complete groups formed. Conversely, the requirement of the readout tooth location will be stricter if there are fewer local teeth. In practice, it is generally much more difficult to accurately control the frequency of the readout teeth with the precision of the repetition rate than to obtain more local/readout teeth. Therefore, the general practical solution could be to make the aggregate bandwidth of local and readout FC moderately larger than that of the target FC and to roughly control the frequency of the readout comb (e.g., with the precision of 0.1 nm). This is what we do in the experiment.

b. The trade-off between the number of teeth of the local FC and readout FC. As the equation suggests, fewer readout teeth are needed if there are more local teeth, and vice versa. It should be noted that, although in theory only the sum of the bandwidth of local FC and readout FC is regulated to realize the one-to-one mapping of the target teeth, a relatively broad local FC (short local pulse) will be more beneficial in practice, as it can provides a better time gating (Supplementary Information Section 1.2 and 3.5) and a higher upconversion efficiency.

2.7 Bandwidth Requirements for Repetition Rates and Carrier-Envelope Offset Frequency (CEO) Frequencies In the last section, the bandwidth requirements on optical side were discussed. In this subsection, we discuss instead the requirements on RF side, specifically, $f_{r,L}$, $f_{r,T}$, δ, $f_{ceo,L}$ and $f_{ceo,T}$. Without loss of generality, we continue the assumption that $f_{ceo,L}=0$; thus, $f_{ceo,T}$ is effectively the relative $f_{ceo}$ between the target FC and local FC.

Figure 11A:
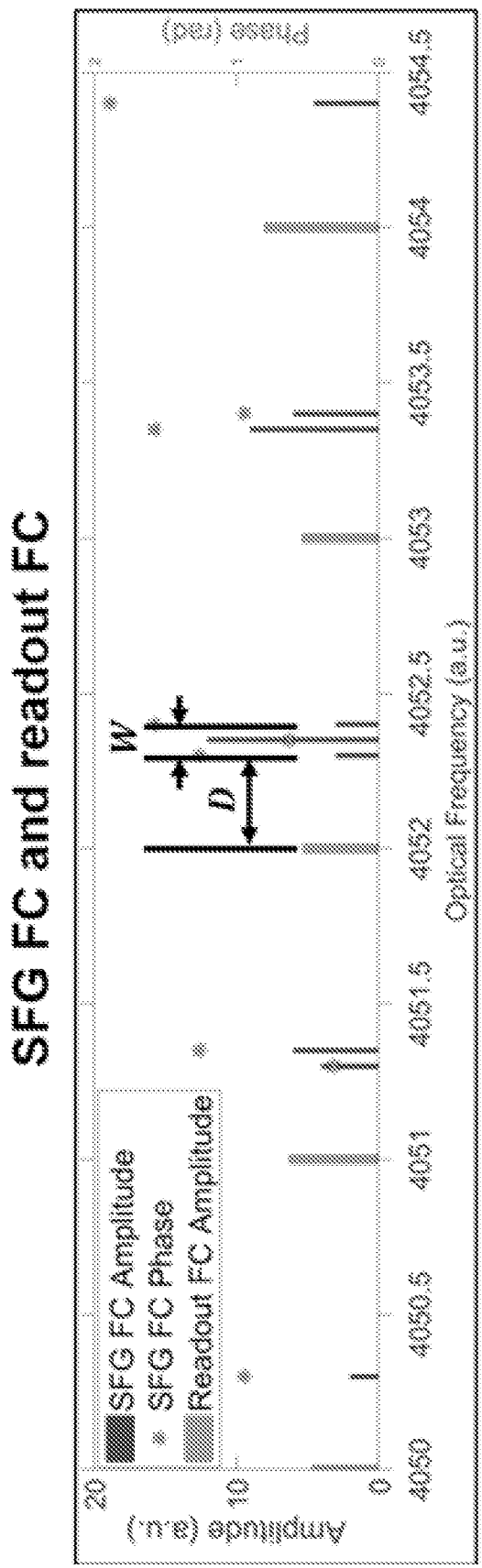
FIGS. 11A-11B. Bandwidth requirements for RF frequencies. The SFG FC and readout FC in FIG. 11A are from FIG. 9.
Figure 11B:
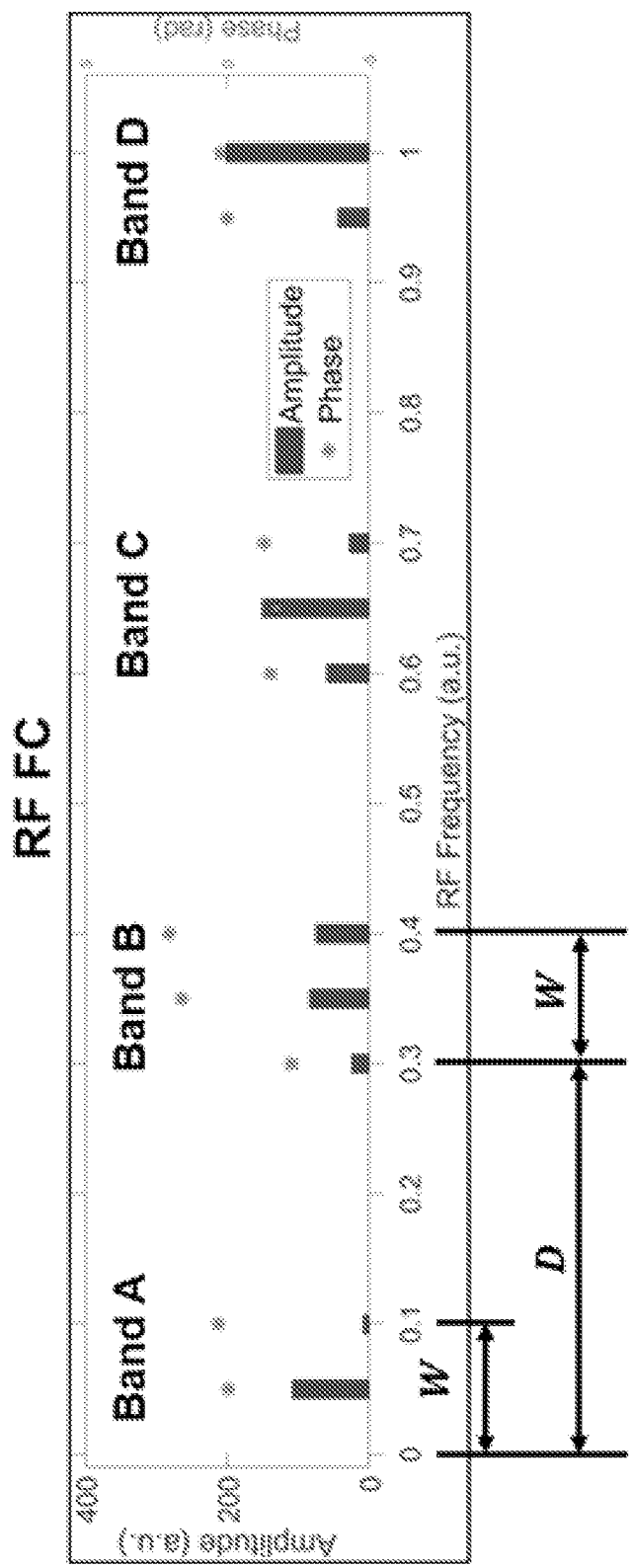

To quantify the requirements, here we define two important parameters (see the illustration in FIG. 11):

a. The spectral (frequency) distance from the first tooth of an SFG group to its primary readout tooth, denoted by D. Note that the "first tooth of an SFG group" refers to the SFG tooth that corresponds to the first target tooth (the tooth with minimum frequency in the target FC).

$$D = \text{mod}((m_{first}f_{r,T} + f_{ceo,T}), f_{r,L})$$

mod(A,B) denotes the remainder after division of dividend A by divisor B, and $(n_{first}f_{r,T} + f_{ceo,T})$ is the optical frequency of the first tooth of the target FC.

b. The spectral width of one complete group, denoted by W.

$$W = (n_{last} - n_{first})\delta = BW_T \times \frac{\delta}{f_{r,T}}$$

$BW_T$ denotes the optical bandwidth of target FC.

Additionally, to realize a one-to-one mapping, two kinds of spectral overlap need to be avoided:

a. Avoiding overlap between band A(D) and band B(C), which requires:

D>W b. Avoiding overlap between band B and band C, which requires:

$$D + W < \frac{f_{r,L}}{2}$$

Similar to dual-comb spectroscopy (DCS), $$\frac{\delta}{f_{r,T}}$$

needs to be small enough to provide enough bandwidth in the RF domain, i.e., to satisfy the requirement b. In addition, $f_{ceo,T}$ also need to be determined carefully to satisfy requirement a, which is different with DCS.

Note that the above bandwidth requirements are effective when a single detector is used for heterodyne photodetection. For the case that an ideal balanced detector is used, the requirements are simplified to only one equation:

$$W < \frac{f_{r,L}}{2}$$

This is because the band A and band D are eliminated by the balanced detector since they are common-mode signal from the SFG FC. In other words, the balanced detector can double the bandwidth for RF band B (C) assuming unchanged $$\frac{\delta}{f_{r,T}},$$

which makes the RF bandwidth requirement effectively same as the general dual-comb.

3. Comparison Between Different Techniques

DCS, C.W. upconversion spectroscopy, electric-optic sampling (EOS), and cross-comb spectroscopy (CCS) (FIG. 12) can be compared using simple mathematical descriptions. CW upconversion uses a very narrow-band local "FC" with only one "comb tooth", and the EOS uses a very broadband local FC (very short local pulse) which also functions as the readout FC. Using a description in both the time domain and the frequency domain, we can show that the CCS in a general configuration can utilize the optical bandwidth in a more efficient way, compared to EOS. In all of those techniques, if the full electric field profile of the readout FC (local FC) is available, generally acquired by field-resolved measurements (e.g. FROG), the electric field of the target FC can also be reconstructed based on measured correlation signal. This extra information could be helpful in some ways; however, it is not necessary for the goal of general absorption spectroscopy.

To begin with, let us review the cross-correlation theorem:

$$C(\tau) = f(t) \otimes g(t) = \int_{-\infty}^{+\infty} f^*(t)g(t+\tau)dt \Rightarrow \mathcal{F}\{C(\tau)\} = F^*(\omega)G(\omega);$$

Or equally:

$$C(\tau) = f(t) \otimes g(t) = \int_{-\infty}^{+\infty} f^*(t)g^*(t+\tau)dt \Rightarrow \mathcal{F}\{C(\tau)\} = F(\omega)G^*(\omega)$$

Where $F(\omega)$ and $G(\omega)$ denote the Fourier transform of $f(t)$ and $g(t)$, respectively.

3.1 DCS

Figure 12C:
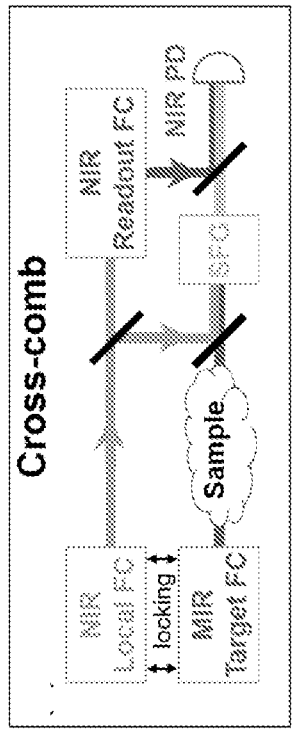
FIGS. 12A-12E. Simplified schematics of different techniques, showing dual comb spectroscopy, symmetric (FIG. 12A), dual comb spectroscopy, asymmetric (FIG. 12B), Cross Comb (FIG. 12C), CW upconversion (FIG. 12D) and dual comb electro-optic sampling (FIG. 12E). Note that generally balanced detectors are used, which are simplified to be single detectors in the schematics. Also, there may be additional equipment before the detector, which is also omitted here; for example, an ellipsometry setup for electro-optic sampling in FIG. 12E.
Figure 12D:
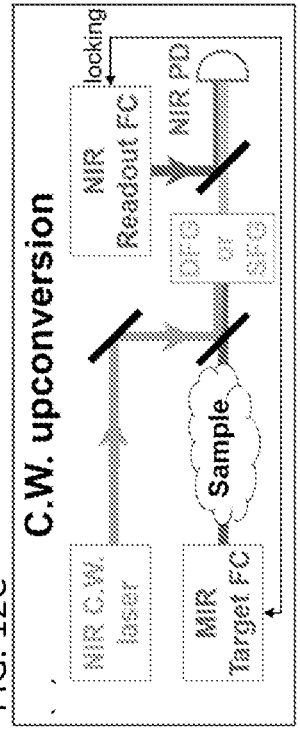
Figure 12E:
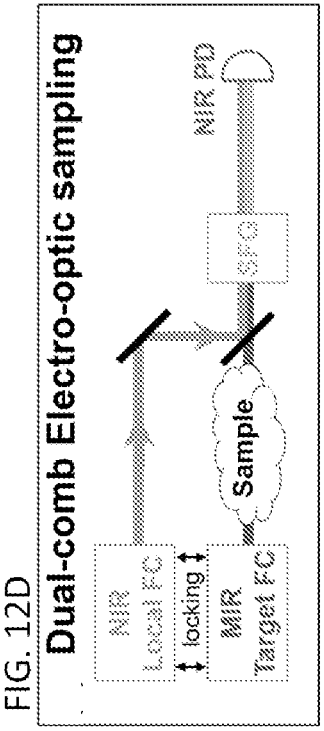
Figure 12A:
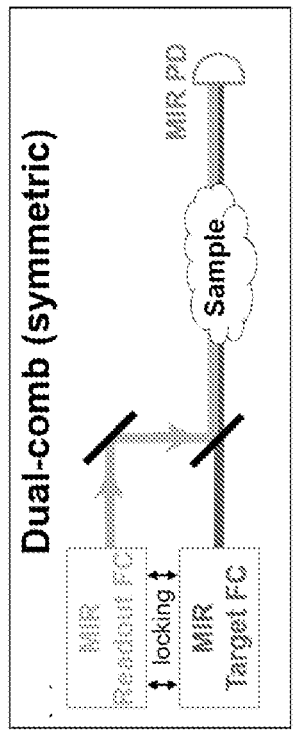

Firstly, for DCS with a symmetric (collinear) configuration (FIG. 12(a))[6], $$c(\tau) = \sum_{-\infty}^{+\infty} e_T(t)e_R^*(t-\tau)dt$$

$$C(\omega) = \mathcal{F}\{c(\tau)\} = E_T(\omega)E_R^*(\omega)$$

where $e_T(t)$ and $e_R(t)$ denote the electric field of the target FC (pulse) and readout FC without passing the sample (passing the reference cell), while $E_T(\omega)$ and $E_L(\omega)$ denote their Fourier transform, respectively. $c(\tau)$ denotes the cross-correlation signal measured by the detector in the time domain, and $C(\omega)$ is its Fourier transform in the frequency domain.

Let assume the sample's spectral response is $S(\omega)$, including both spectral intensity $|S(\omega)|$ and spectral phase Ang $(S(\omega))$. If we use $e(t)$ and $e'(t)$ to denote the electric field of a pulse before and after passing the sample, we have:

$$\mathcal{F}\{e'(t)\} = S(\omega)\mathcal{F}\{e(t)\} = S(\omega)E(\omega)$$

Therefore, for the cross-correlation signal $c'(\tau)$, measured when the target pulse and readout pulse pass the sample:

$$c'(\tau) = \int_{-\infty}^{+\infty} e_T'(t)e_R'^*(t-\tau)dt$$

$$C'(\omega) = \mathcal{F}\{c'(\tau)\} = E_T(\omega)S(\omega)E_R^*(\omega)S^*(\omega) = E_T(\omega)E_R^*(\omega)|S(\omega)|^2$$

By comparing those two measurements (with and without sample), we have:

$$D(\omega) = \frac{C'(\omega)}{C(\omega)} = |S(\omega)|^2$$

$D(\omega)$ denotes the comparison between those two measurements. It shows that this measurement can only provide spectral intensity of the sample's response, which lacks the phase information.

In fact, a symmetric DCS measurement is essentially a traditional FTIR (Michelson interferometer), which gives information only about spectral intensity but not spectral phase. Therefore, one cannot get any temporal information on the target pulses which are disturbed by the sample. In other words, the correlation signal c(τ) is independent of the spectral phase of e'$_T$(t), which is cancelled as the readout pulse also passes the sample.

Figure 12B:
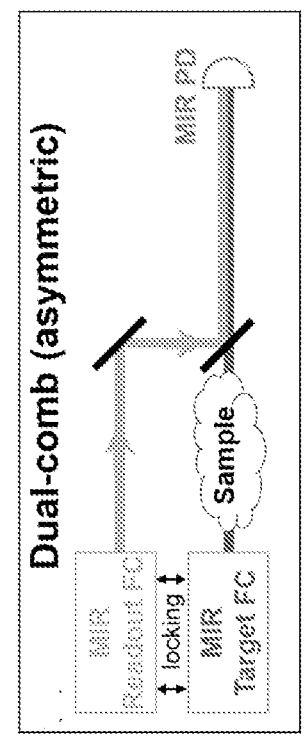

Secondly, for DCS with an asymmetric (dispersive) configuration (FIG. 12(b)), $$c(\tau) = \int_{-\infty}^{+\infty} e_T(t)e_R^*(t-\tau)dt$$

$$C(\omega) = \mathcal{F}\{c(\tau)\} = E_T(\omega)E_R^*(\omega)$$

$$c'(\tau) = \int_{-\infty}^{+\infty} e'_T(t)e_R^*(t-\tau)dt$$

$$C'(\omega) - \mathcal{F}\{c'(\tau)\} = E_T(\omega)S(\omega)E_R^*(\omega)$$

$$D(\omega) = \frac{C'(\omega)}{C(\omega)} = S(\omega)$$

Note that in this configuration, the readout pulse does not pass the sample before being combined with the target pulse. In this case, the measured D(ω) is dependent on the phase of S(ω); thus, one can get phase information of the sample response.

However, one still cannot recover the full electric field of the target pulse, $e_T(t)$ (or $e'_T(t)$) only by measurement of C(ω) (or C'(ω)), in which $E_T(\omega)$ (or $E'_T(\omega)$) is modulated by $E^*_R(\omega)$. This is because $E^*_R(\omega)$ is generally unknown unless some other field-resolved measurements (e.g., FROG) are applied for it. Nonetheless, general absorption spectroscopy doesn't require the full knowledge of $e_T(t)$, since what we need to measure is S(ω) rather than $E_T(\omega)$, assuming $e_R(t)$ does not change for measurements with and without the sample.

Figure 13:
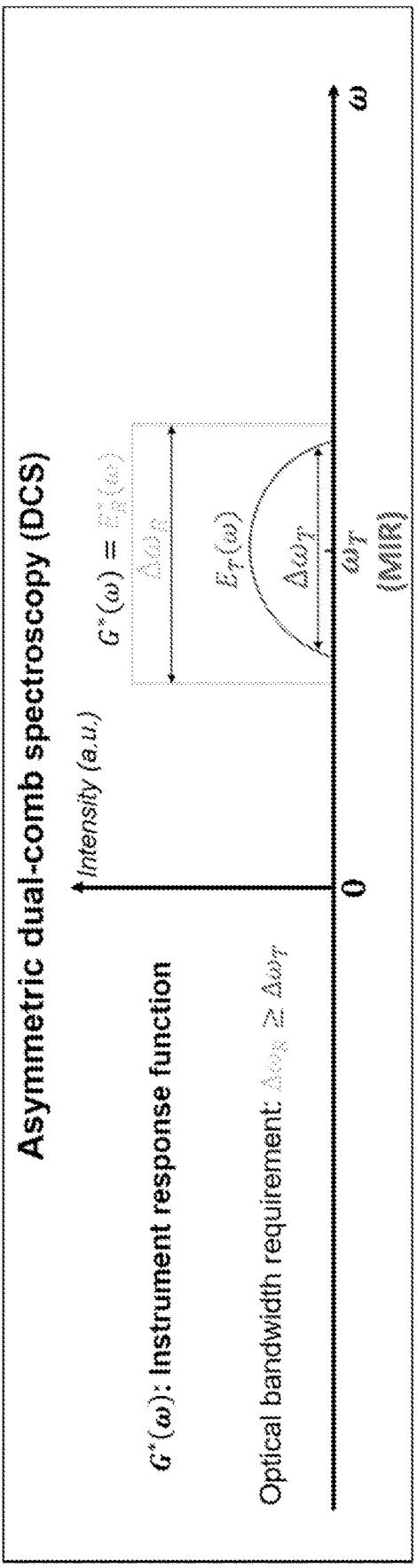
FIG. 13. Instrument response function of asymmetric DCS. $\omega_T$: Spectral center of the target FC. $\Delta\Omega_T$ ($\Delta\omega_R$): optical bandwidth of target FC (readout FC). Note that the intensity profile of the readout FC ($E_R(\omega)$) is simplified to a rectangular function for clarity.

FIG. 13 illustrates spectral intensities of $E_T(\omega)$ and $E^*_R(\omega)$ as well as the optical bandwidth requirement for readout FC. G*(ω) denotes the response function of the instrument, which is simply equal to $E^*_R(\omega)$ in this case. Note that this illustration, as well as the following illustrations for other techniques, depicts only the spectral envelopes and thus does not account for individual comb lines. The full description of CCS which factors in comb lines is presented in Section 2.

3.2 CCS

CCS has the additional step of frequency conversion (FIG. 12(c)).

Step 1: Nonlinear Upconversion $$e_{SFG}(t,\tau)=e_T(t)e_L(t-\tau)$$

where $e_L(t)$ denotes the electric field of the local FC (pulse). Note that the phase-matching effect is not considered here for simplicity.

Step 2: Linear Readout (Same as Asymmetric DCS)

$$c(\tau) = \int_{-\infty}^{+\infty} e_{SFG}(t,\tau)e_R^*(t-\tau)dt = \int_{-\infty}^{+\infty} e_T(t)e_L(t-\tau)e_R^*(t-\tau)dt$$

If we let $g(t)=e^*_L(t)e_R(t)$, we can rewrite the above equation as:

$$c(\tau) = \int_{-\infty}^{+\infty} e_T(t)g^*(t-\tau)dt$$

$$C(\omega) = \mathcal{F}\{c(\tau)\} = E_T(\omega)G^*(\omega)$$

Above is the result for the measurement without sample, and for the measurement with sample we have:

$$c'(\tau) = \int_{-\infty}^{+\infty} e'_T(t)g^*(t-\tau)dt$$

$$C'(\omega) - \mathcal{F}\{c'(\tau)\} = E_T(\omega)S(\omega)G^*(\omega)$$

$$D(\omega) = \frac{C'(\omega)}{C(\omega)} = S(\omega)$$

Like asymmetric DCS, one can get phase information of the sample response, but $e_T(t)$ cannot be fully recovered since $E_T(\omega)$ is modulated by G*(ω) in C(ω). However, this does not impede the measurement of the absorption spectrum S(ω).

Figure 14:
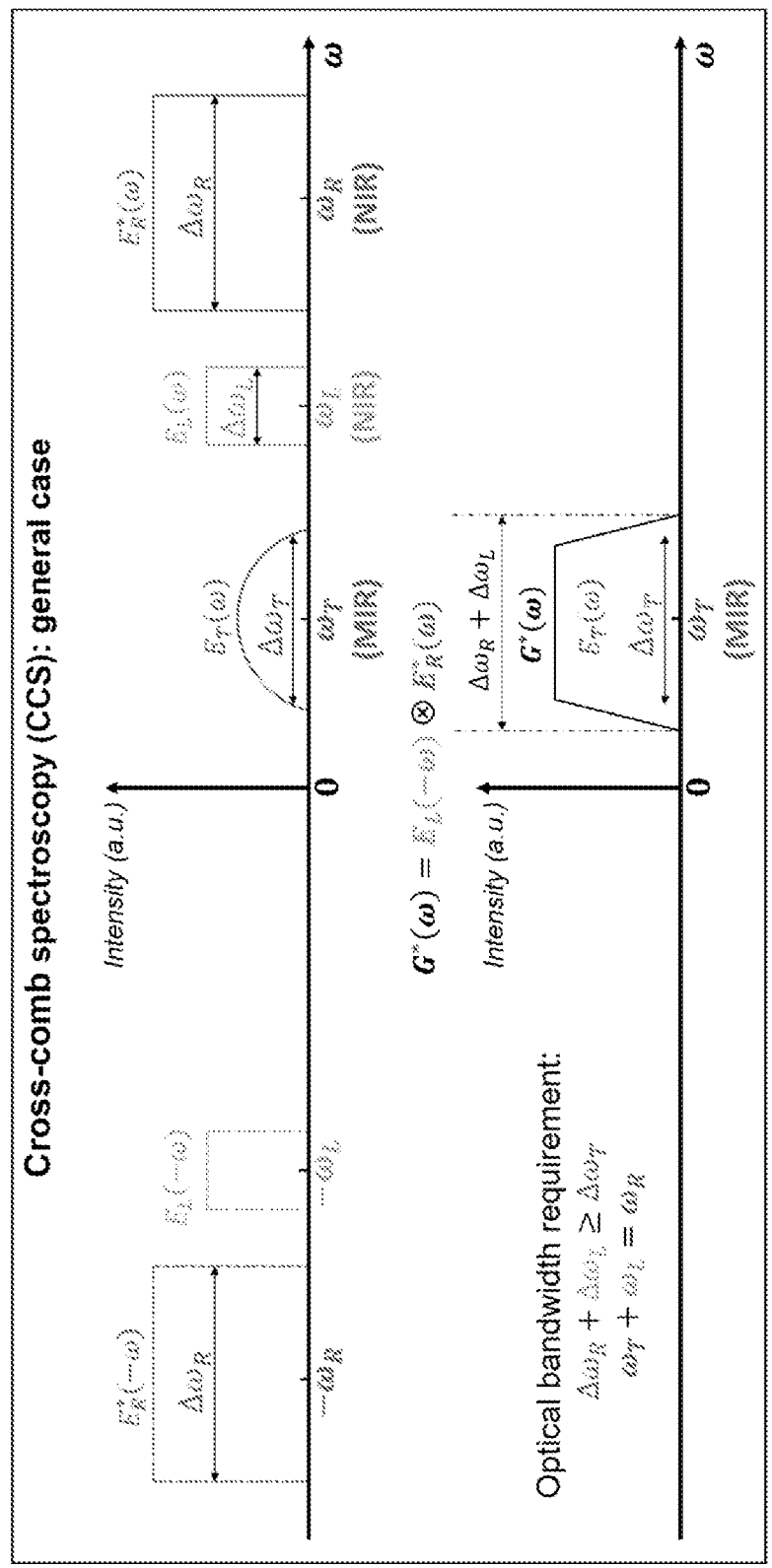
FIG. 14. Instrument response function of general CCS. $\omega_T$, $\omega_L$, and $\omega_R$: spectral center of the target FC, local FC, and readout FC. $\Delta\omega_T$, $\Delta\omega_L$, and $\Delta\omega_R$: optical bandwidth of target FC, local FC, and readout FC. Note that the intensity profiles of the local FC and readout FC are simplified to rectangular functions for clarity (see also FIGS. 15 and 16). The bandwidth requirement agrees with the result of our derivation in Section 2 in which comb teeth are included.

In this case, the response function of the instrument is G*(ω), based on that $g(t)=e^*_L(t) e_R(t)$, we have:

$$G^*(\omega)=E_L(-\omega)\otimes E^*_R(\omega)$$

which is illustrated in FIG. 14.

3.3 CW Upconversion and EOS

Figure 15:
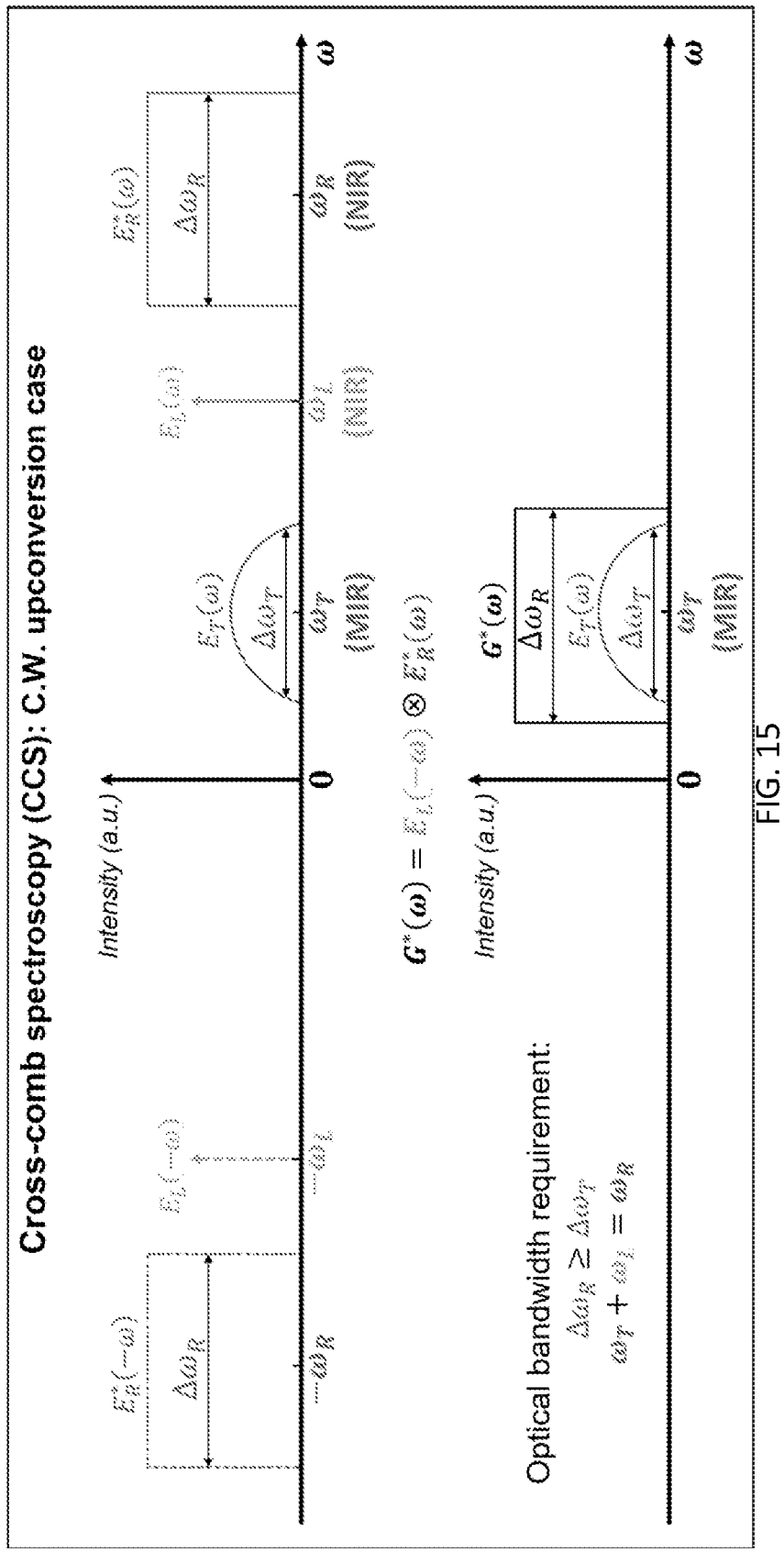
FIG. 15. Instrument response function of CCS (C.W. upconversion case).

Both CW upconversion and EOS can be shown to be special cases of the above CCS description. To describe C.W. upconversion (FIG. 12D), nothing needs to be modified in the CCS equations, except that $e_L(t-\tau)$ denotes a continuous sinusoidal wave instead of a pulse. Also, it should be noted that, using an SFG or DFG process for nonlinear upconversion does not make a fundamental difference here; the equations are equivalent up to a complex conjugation. The illustration is shown in FIG. 15.

EOS (FIG. 12E) requires a more careful discussion. Let us start with equations of CCS.

Step 1: Nonlinear Upconversion $$e_{SFG}(t,\tau)=e_T(t)e_L(t-\tau)$$

In the case of ideal EOS, $e_L(t)$ is much shorter than $e_T(t)$. In other words, in the temporal span of $e_L(t)$, $e_T(t)$ varies very little and can be approximated to be constant. Thus, we have:

$$e_{SFG}(t,\tau)=e_T(t)e_L(t-\tau)\approx e_T(\tau)e_L(t-\tau)$$

Another way to interpret this is that $e_L(t)$ is approximated to be a Dirac delta function (δ(t−τ)) that samples $e_T(t)$ in the time domain.

With this approximation, we can continue to derive the next readout step. Note that in EOS the role of readout pulse is played by the local pulse itself.

Step 2: Linear Readout $$c(\tau) = \int_{-\infty}^{+\infty} e_T(t)e_L(t-\tau)e_R^*(t-\tau)dt$$

$$\cong \int_{-\infty}^{+\infty} e_T(\tau)e_L(t-\tau)e'_L(t-\tau)dt$$

$$= e_T(\tau) \int_{-\infty}^{+\infty} e_L(t-\tau)e_L^*(t-\tau)dt$$

$$= Ke_T(\tau)$$

$$C(\omega) = \mathcal{F}\{c(\tau)\} = KE_T(\omega)$$
$$C'(\omega) = \mathcal{F}\{c'(\tau)\} = KE_T(\omega)S(\omega)$$

$$D(\omega) = \frac{C'(\omega)}{C(\omega)} = S(\omega)$$

where K denotes the constant that equals to the integration $\int_{-\infty}^{+\infty} e_L(t-\tau)e^*_L(t-\tau)dt$, the core of which is independent of the parameter delay $\tau$. As shown in the equation, under this approximation, the correlation signal $c(\tau)$ is equal to the electric field of target pulse $e_T(\tau)$ up to a constant. Thus, under the approximation of the ideal local pulse (infinitely short pulse width), one can obtain the full electric field of the target pulse $e_T(t)$ in addition to the absorption spectrum $S(\omega)$.

Figure 16:
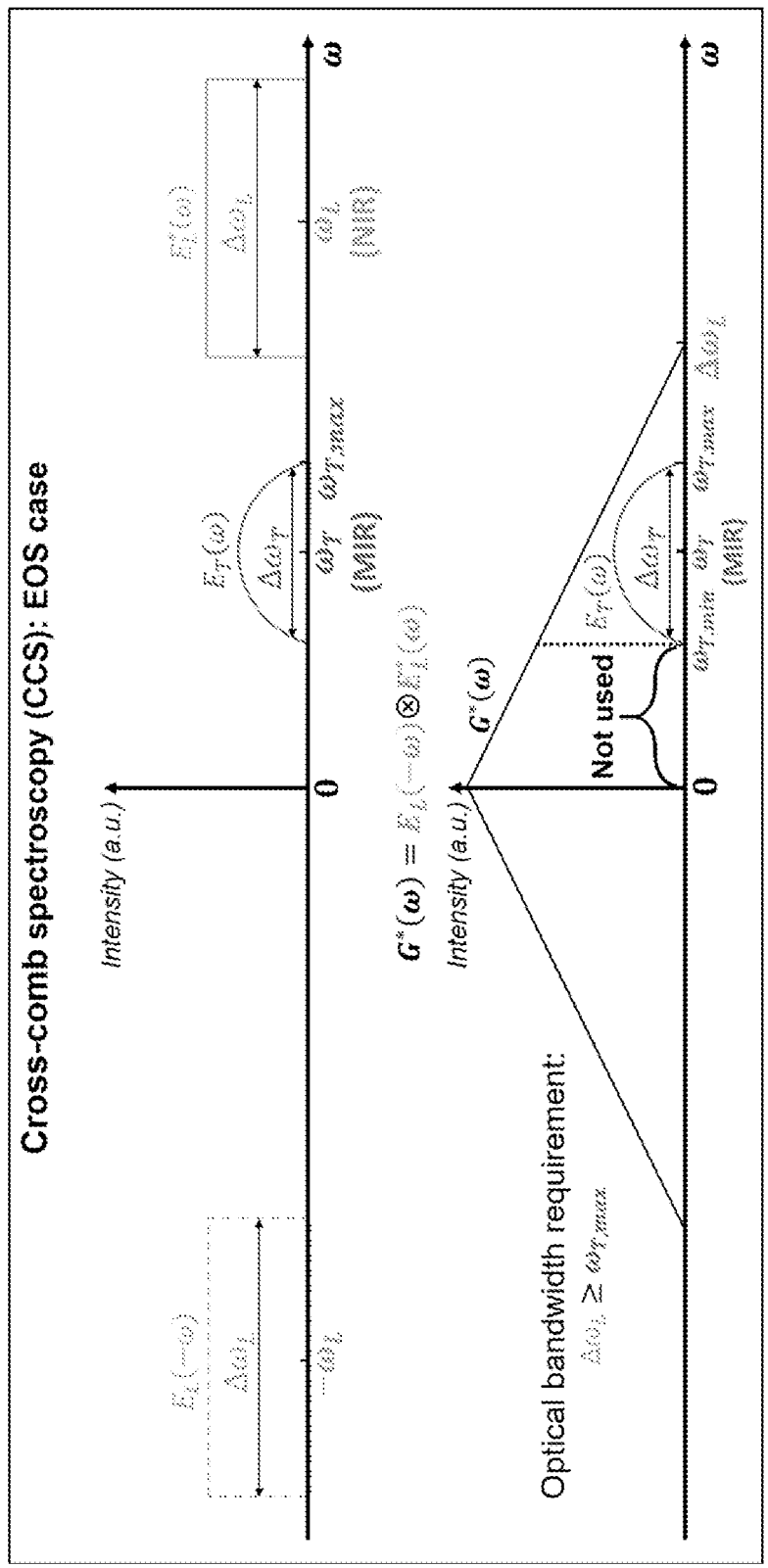
FIG. 16. Instrument response function of CCS (EOS case). $\omega_{T,max}$ ($\omega_{T,min}$), the maximum (minimum) frequency of the target spectrum.

In practice, the finite pulse duration of the sampling pulse always imposes a frequency-dependent instrument response[7,8], which is illustrated in FIG. 16. In this case, the instrument response function $G^*(\omega)$ is the "autoconvolution" of the local spectrum.

$$G^*(\omega) = E_L(-\omega) \otimes E^*_L(\omega)$$

In contrast to DCS and CCS, EOS needs the bandwidth of the local FC ($\Delta\omega_L$) to be equal or larger than the maximum frequency of the target FC ($\omega_{T,max}$) to detect the full spectrum of the target FC. This explains why EOS requires a much broader optical bandwidth compared to DCS and CCS. However, the $G^*(\omega)$ band below the minimum frequency of the target FC ($\omega_{T,min}$), is not effectively utilized, resulting from the fact that the same continuous FC is used as both the readout and local FC.

3.4 CW Upconversion and EOS Described by Comb-Teeth Mapping

In the previous subsection, we have described CW upconversion spectroscopy and dual-comb EOS using the language of CCS without including comb teeth. In this section, we do the same thing factoring in comb teeth, following the derivation in Section 2.5. Note that FIG. 5 is a good illustration for this subsection.

Based on what we derived for RF band B in Section 2.5, we can write the general formula for $j_{th}$ target tooth mapped in RF band B:

$$I_j = \left(\sum_{m=1}^{M} L_m R^*_{m+j}\right) X_j$$

where M denotes the total number of local teeth. Note that all the subscripts denote effective tooth index.

For the case of C.W. upconversion, there is only one "local tooth", so the formula is simplified to be $$I_i = L_1 R^*_{m+1} X_i$$

Everything can be described well by the language of CCS.
For the case of ideal EOS, let us review the approximation that we made in the time domain, which is:
"In the span of $e_L(t)$ or $e_R(t)$ (very short local/readout pulse), $e_T(t)$ (target pulse) varies slowly, and thus can be approximated as constant."

Correspondingly, in the frequency domain, we can have such an equivalent approximation:
"In the span of $E_T(\omega)$ (very narrowband, relatively), $E_L(\omega)$ or $E_R(\omega)$ (very broadband, relatively) varies slowly and can be approximated as constant."

With this approximation, we have:

$$R_m \cong R_{m+1} \cong R_{m+2} \cong R_{m+3} \cdots \cong R_{m+N}$$

where N denote the total number of target teeth. Thus, we have:

$$\text{for any } j, \sum_{m=1}^{M} L_m R^*_{m+j} \cong K$$

where K denotes a constant.

$$I_j = \left(\sum_{m=1}^{M} L_m R^*_{m+j}\right) X_j \cong KX_j, \text{ for any } j$$

This result is equivalent to the equation $C(\omega) = \mathcal{F}\{c(\tau)\} = KE_T(\omega)$, which we derived in the last subsection in the time domain. Both results show that, in the limit of ideal EOS, the measured correlation signal (RF heterodyne beating) is equal to the electric field of the target pulse up to a constant.

The case of nonideal EOS is well demonstrated in reference [5].

3.5 Background Comparison Between DCS and CCS
In asymmetric DCS, we have the correlation signal:

$$c(\tau) = \int_{-\infty}^{+\infty} e_T(t)e_R^*(t-\tau)dt$$

Note that only the cross term is kept in this equation, as the effective correlation signal. The background that is omitted in the equation is:

$$B = |e_T(t)|^2 + |e^*_R(t-\tau)|^2 = |e_T(t)|^2 + |e^*_R(t)|^2$$

This background is equal to the sum of the full power of the target pulse and local pulse, which is independent of the delay, $\tau$. At large delay $\tau$, when the weak tail (optical free induction decay) of the target pulse is being sampled by the local pulse, the effective correlation signal can be much smaller than the constant background. In other words, the extra noise incurred by the background from the strong target pulse can envelop the weak useful signal at the tail. Even in the absence of technical noise, the strong background can saturate the detector, thus fundamentally limiting the dynamic range and SNR of the measurement[3].

In CCS, in which a short local pulse is used (not necessarily as short as in EOS case), the correlation signal is:

$$c(\tau) = \int_{-\infty}^{+\infty} e_{SFG}(t,\tau)e_R^*(t-\tau)dt = \int_{-\infty}^{+\infty} e_T(t)e_L(t-\tau)e_R^*(t-\tau)dt$$

The omitted background terms are:

$$B(\tau)=|e_{SFG}(t,\tau)|^2+|e^*_R(t-\tau)|^2=|e_T(t)e_L(t-\tau)|^2+|e^*_R(t)|^2$$

In stark contrast to DCS, the background in CCS is dependent on delay $\tau$, as the target pulse is "temporally gated" by a short local pulse. At the weak tail of the target pulse where the effective correlation signal is weak, the background is also very weak, as it is free from the strong power of the center (peak) part of the target pulse. This allows a much stronger target pulse to be used, which promises a higher SNR at the weak tail, compared to the linear DCS.

It is readily seen that the time gating effect is better as the local pulse is shorter. Also, a shorter local pulse benefits the upconversion efficiency. This is why we use a relatively short local pulse (broadband local FC) in our experiment, although only the total bandwidth of local FC and readout FC is regulated in theory to map the target FC.

REFERENCES FOR SUPPLEMENTARY INFORMATION

The following references are incorporated by reference herein
1. Sorokin, E. et al. Efficient half-harmonic generation of three-optical-cycle mid-IR frequency comb around 4 μm using OP-GaP. *Opt. Express* 26, 9963-9971 (2018).
2. Marandi, A., Leindecker, N. C., Pervak, V., Byer, R. L. & Vodopyanov, K. L. Coherence properties of a broadband femtosecond mid-IR optical parametric oscillator operating at degeneracy. *Opt. Express* 20, 7255-7262 (2012).
3. Pupeza, I. et al. Field-resolved infrared spectroscopy of biological systems. *Nature* 577, 52-59 (2020).
4. Yokoyama, S., Yokoyama, T., Hagihara, Y., Araki, T. & Yasui, T. A distance meter using a terahertz intermode beat in an optical frequency comb. *Opt. Express* 17, 17324-17337 (2009).
5. Stead, R. A., Mills, A. K. & Jones, D. J. Method for high resolution and wideband spectroscopy in the terahertz and far-infrared region. *J. Opt. Soc. Am. B* 29, 2861-2868 (2012).
6. Coddington, I., Newbury, N. & Swann, W. Dual-comb spectroscopy. *Optica* 3, 414-426 (2016).
7. Riek, C. et al. Direct sampling of electric-field vacuum fluctuations. *Science* 350, 420-423 (2015).
8. Kowligy, A. S. et al. Infrared electric field sampled frequency comb spectroscopy. *Science Advances* 5, eaaw8794 (2019).
9. https://www.osapublishing.org/abstract.cfm?uri=CLEO_SI-2021-SM3A.4
10. https://www.osapublishing.org/abstract.cfm?uri=AIS-2021-JTu4D.5https://arxiv.org/abs/2107.08333
1. Sorokin, E. et al. Efficient half-harmonic generation of three-optical-cycle mid-IR frequency comb around 4 μm using OP-GaP. *Opt. Express* 26, 9963-9971 (2018).
2. Marandi, A., Leindecker, N. C., Pervak, V., Byer, R. L. & Vodopyanov, K. L. Coherence properties of a broadband femtosecond mid-IR optical parametric oscillator operating at degeneracy. *Opt. Express* 20, 7255-7262 (2012).
3. Pupeza, I. et al. Field-resolved infrared spectroscopy of biological systems. *Nature* 577, 52-59 (2020).
4. Yokoyama, S., Yokoyama, T., Hagihara, Y., Araki, T. & Yasui, T. A distance meter using a terahertz intermode beat in an optical frequency comb. *Opt. Express* 17, 17324-17337 (2009).
5. Stead, R. A., Mills, A. K. & Jones, D. J. Method for high resolution and wideband spectroscopy in the terahertz and far-infrared region. *J. Opt. Soc. Am. B* 29, 2861-2868 (2012).
6. Coddington, I., Newbury, N. & Swann, W. Dual-comb spectroscopy. *Optica* 3, 414-426 (2016).
7. Riek, C. et al. Direct sampling of electric-field vacuum fluctuations. *Science* 350, 420-423 (2015).
8. Kowligy, A. S. et al. Infrared electric field sampled frequency comb spectroscopy. *Science Advances* 5, eaaw8794 (2019).
9. Mid-Infrared Cross-Comb Spectroscopy using Sum-Frequency Sampling by Mingchen Liu, Robert M. Gray, Arkadev Roy, and Alireza Marandi https://www.osapublishing.org/abstract.cfm?uri=CLEO_SI-2021-SM3A.4
10. Cross-Comb Spectroscopy using Sum-Frequency Sampling in the Mid-IR by Mingchen Liu, Robert M. Gray, Arkadev Roy, and Alireza Marandi. https://www.osapublishing.org/abstract.cfm?uri=CLEO_SI-2021-SM3A.4
11. Further information on one or more embodiments of the present invention can be found in Mid-Infrared Cross-Comb Spectroscopy by Mingchen Liu, Robert M. Gray, Arkadev Roy, Charles R. Markus, Alireza Marandi as found in https://arxiv.org/abs/2107.08333

Second Example: CCS Using Difference Frequency Generation

Figures 17A, 17B:
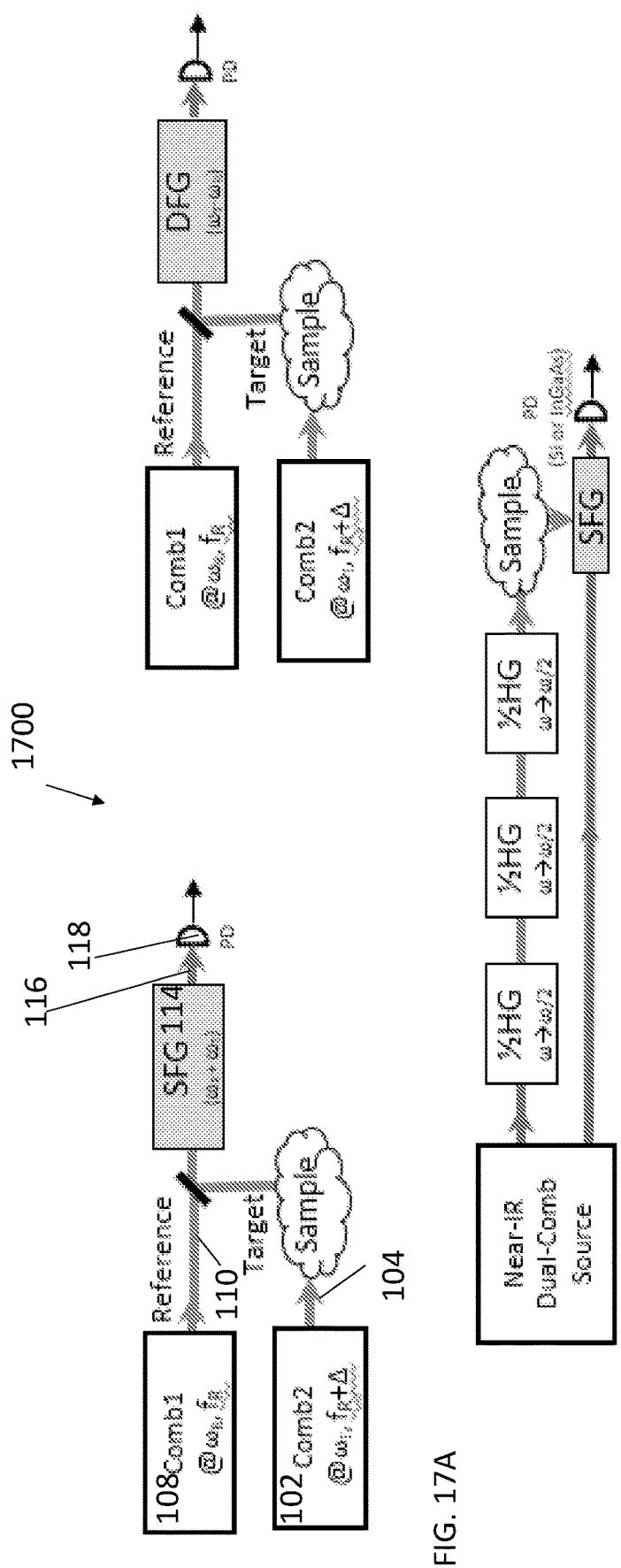
FIGS. 17A-17B. Comparison of cross-comb spectroscopy using sum frequency generation and difference frequency generation (FIG. 17A) and using a near IR dual comb source (FIG. 17B).

FIG. 17B illustrates the use of difference frequency generation (DFG) to do frequency down-conversion. DFG is useful for measuring short-wavelengths combs (for instance in the UV range) using near-IR combs and detectors.

Third Example: Additional Simulations

Figure 18A:
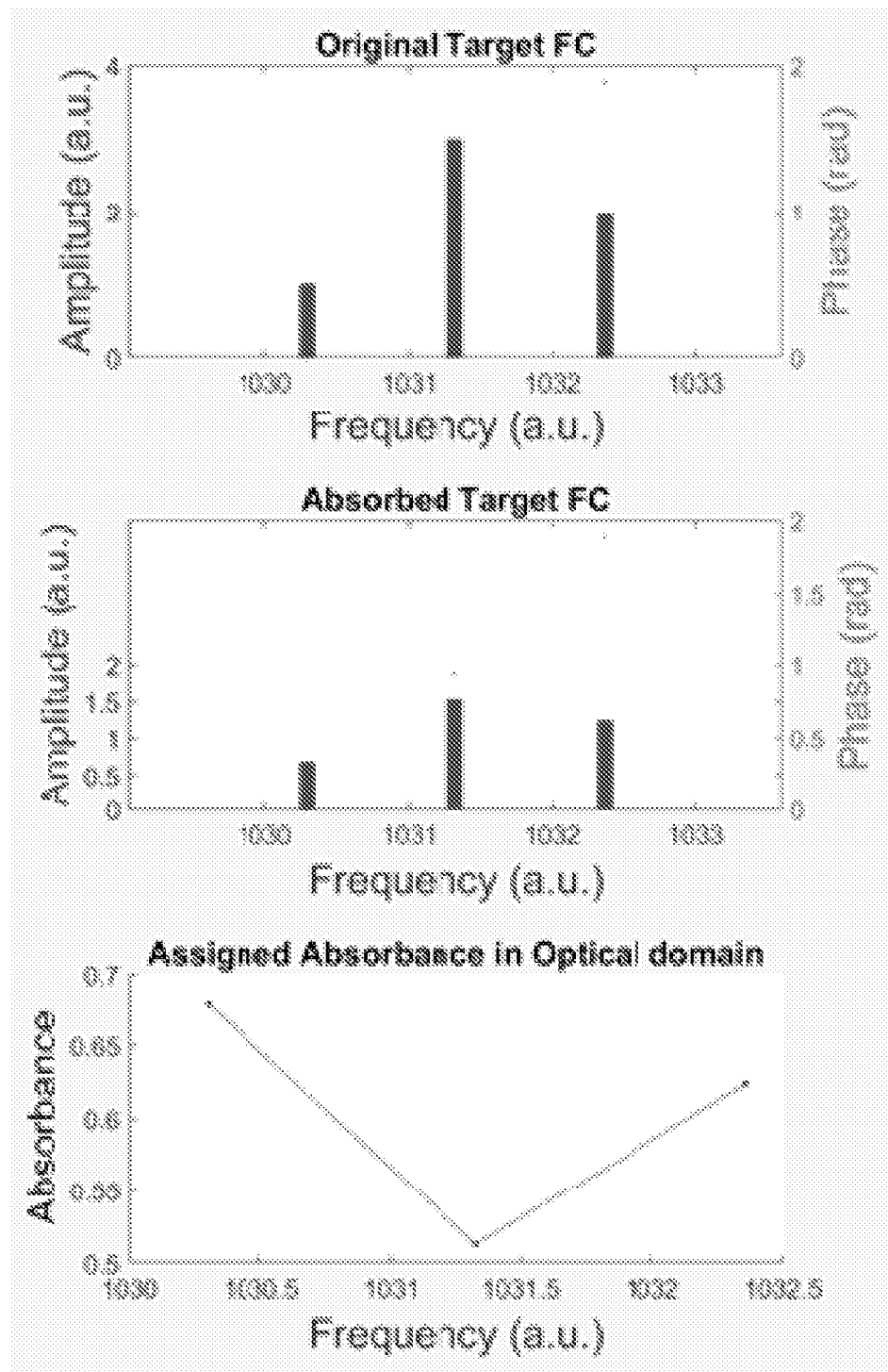
FIGS. 18A-18E. Simulation of Absorption spectrum measurement. Left lower subplot in FIG. 18A shows a set of frequency-dependent absorbance value that is pre-assigned to target FC.
Figure 18B:
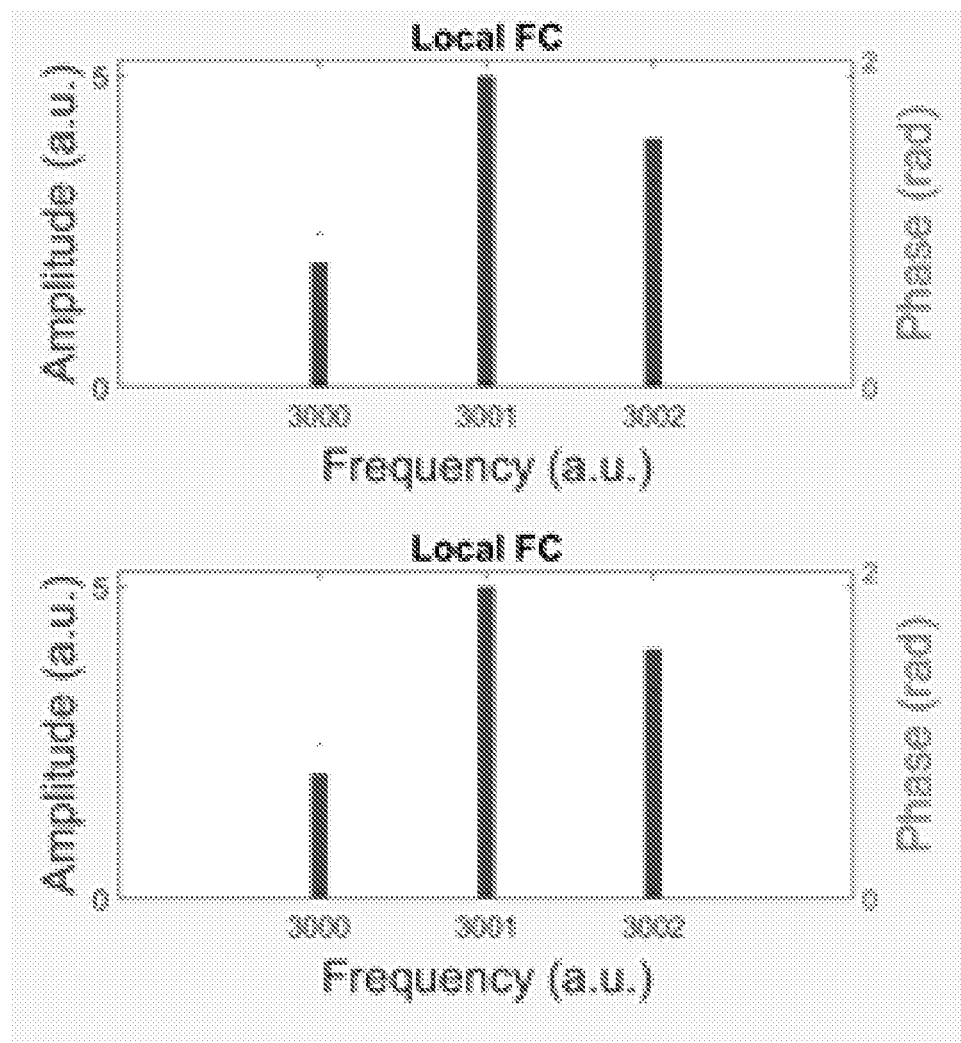
Figure 18C:
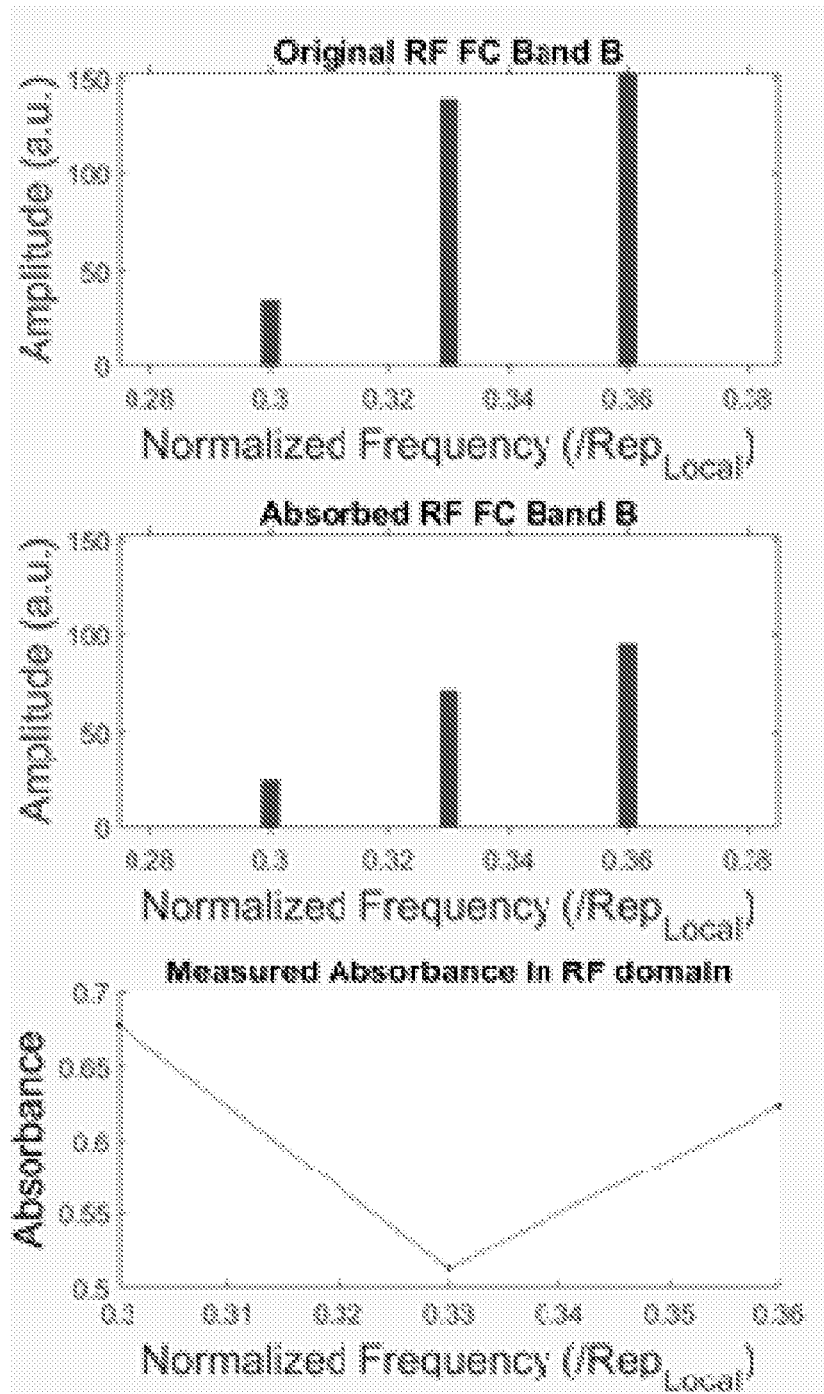
Figures 18D, 18E:
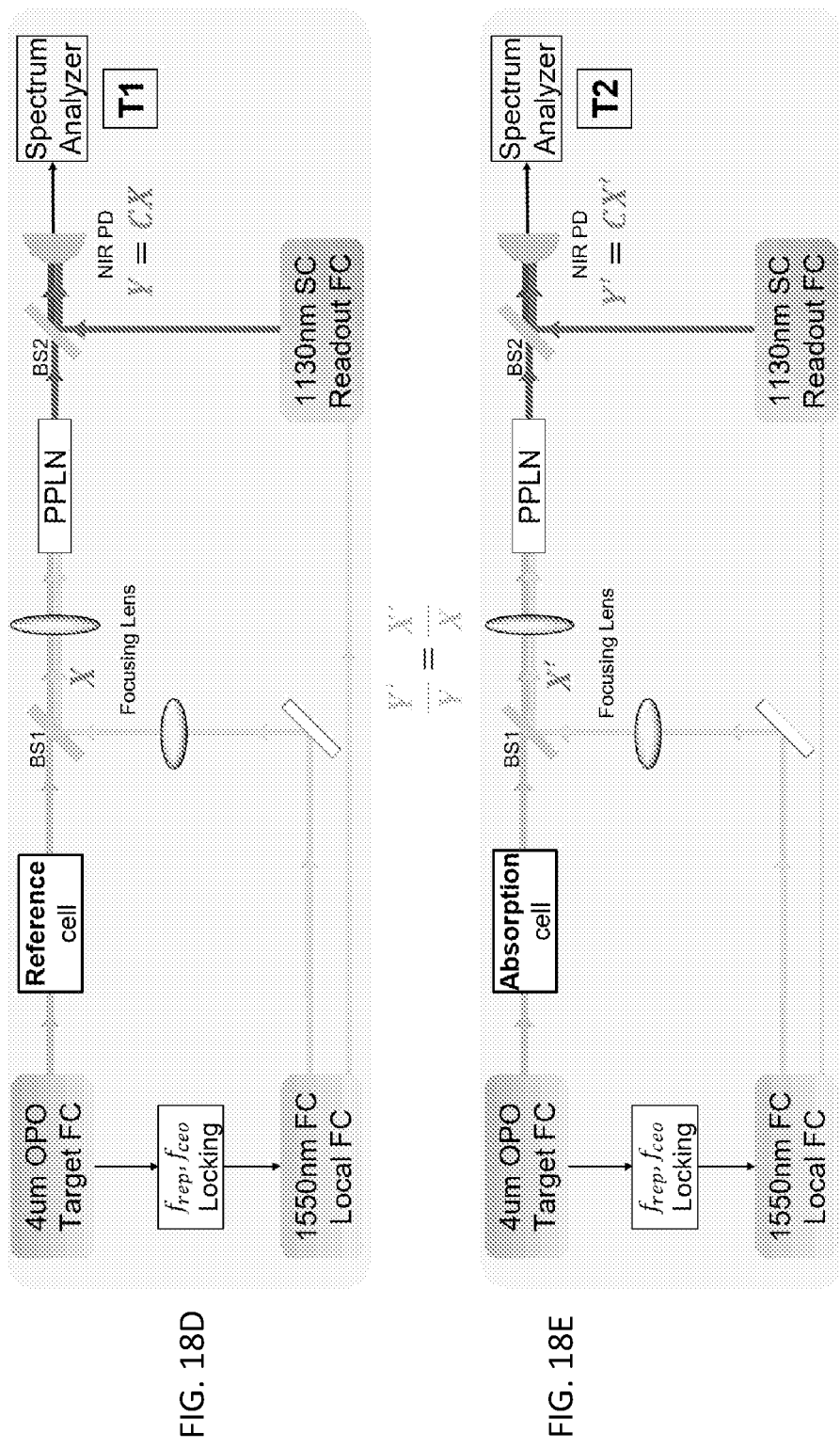
Figure 19A:
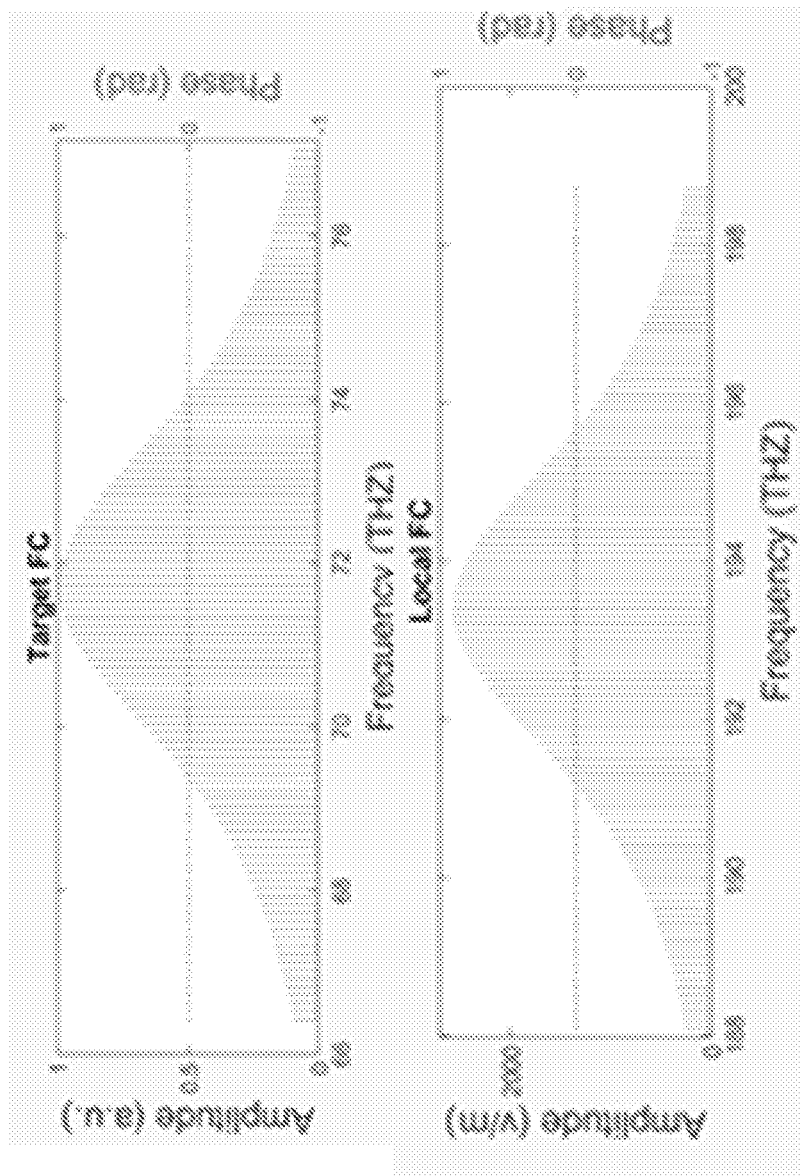
FIG. 19A-19C Illustration for target FC, local FC (FIG. 19A), SFG FC readout FC (FIG. 19B.) and RF FC (FIG. 19C), when 107 target teeth and 107 local teeth are included.
Figure 19B:
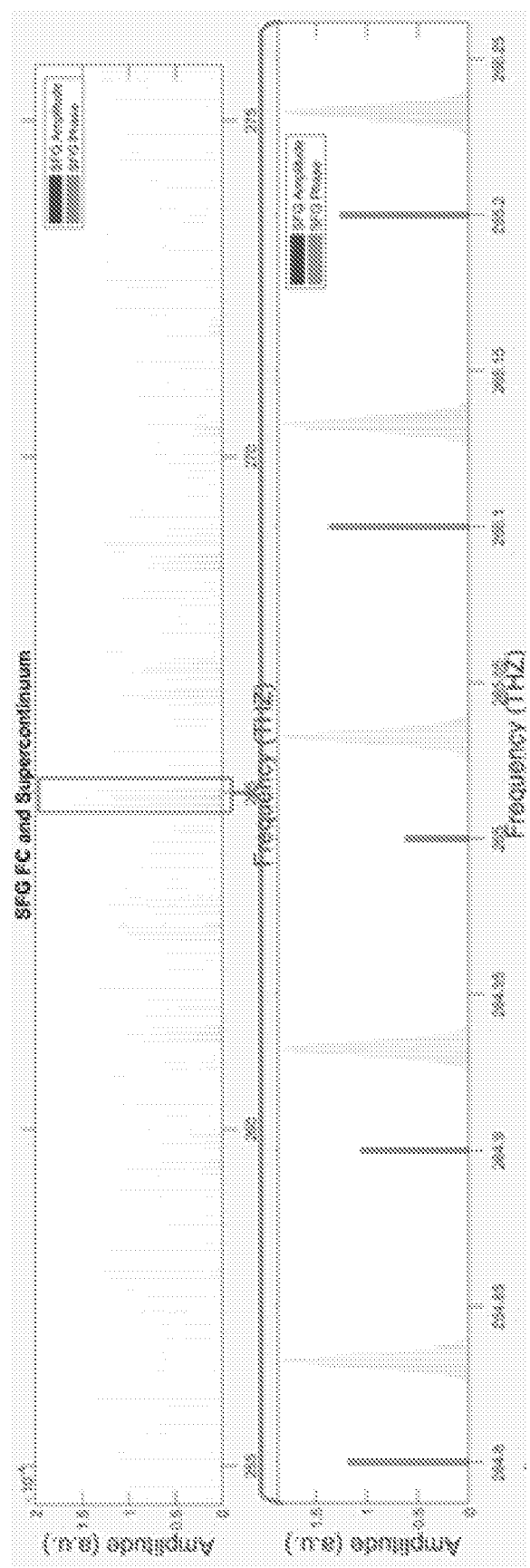
Figure 19C:
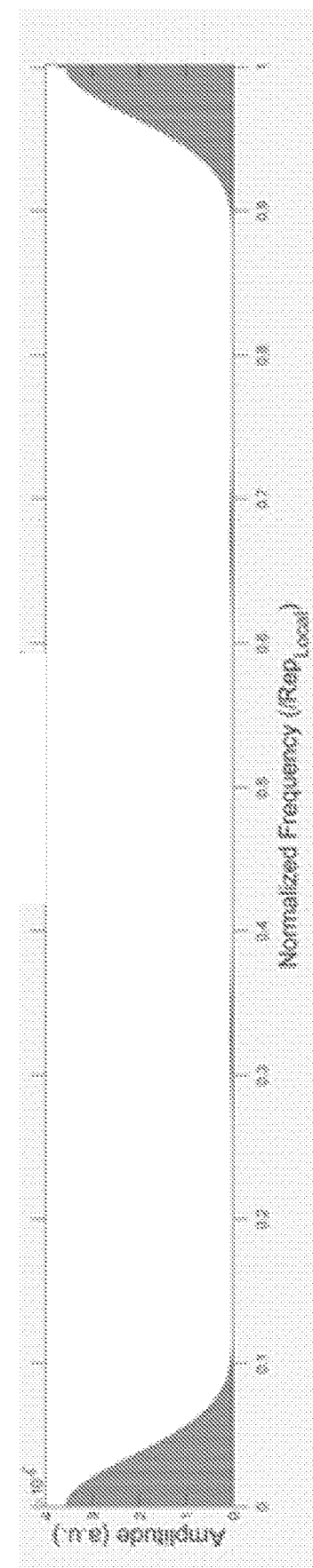
Figure 20A:
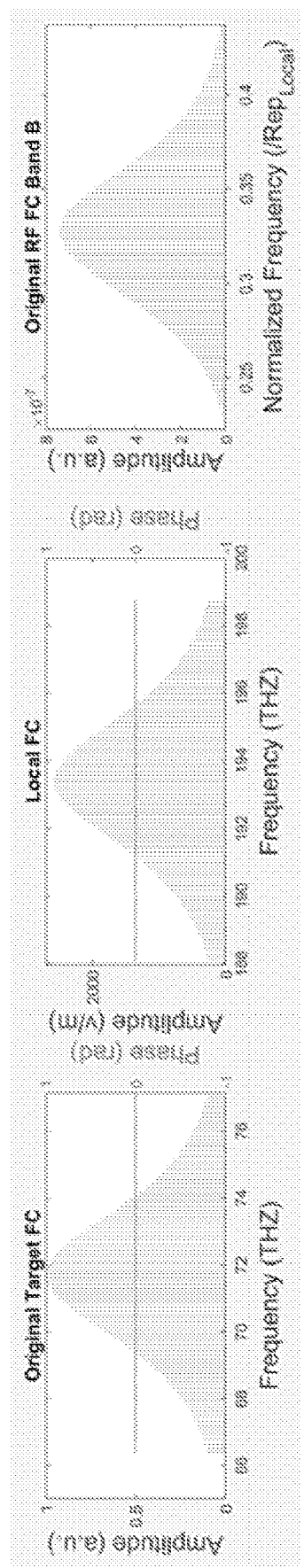
FIGS. 20A-20C. Simulation of Absorption spectrum measurement (FIGS. 20B and 20C) for target FC in FIG. 20A, when 107 target teeth and 107 local teeth are included.
Figure 20B:
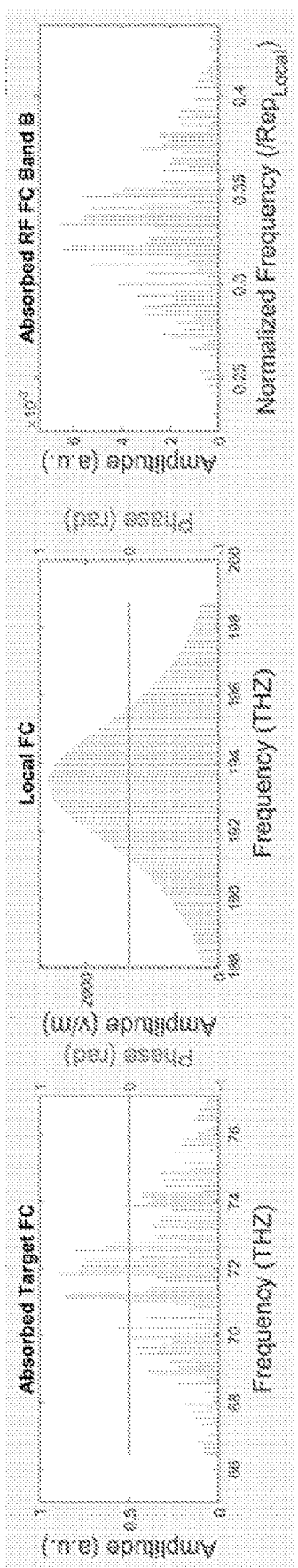
Figure 20C:
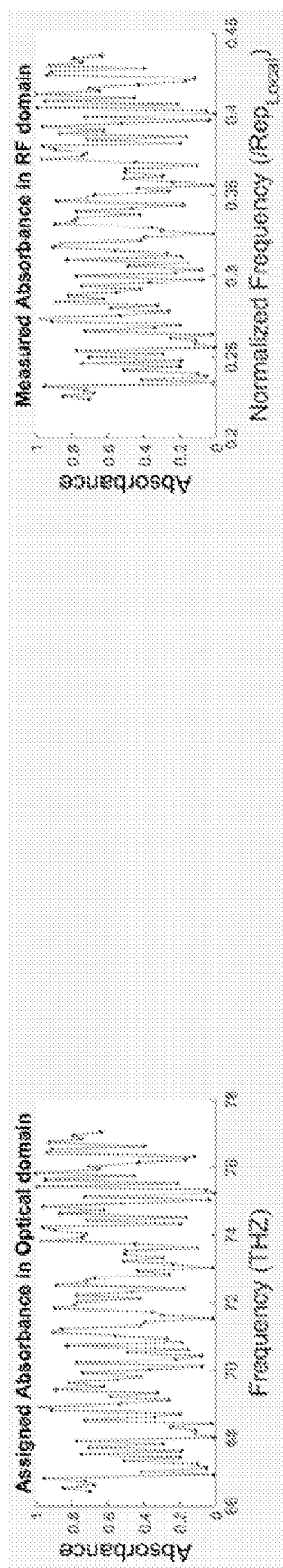

FIGS. 18-20 are simulations of cross-comb spectroscopy. FIG. 18A is a simulation of the absorption using the setup in FIGS. 18B and 18C, showing absorption spectrum measurements. can be achieved by comparing two Bands B (or C) of RF FCs, which are measured with the target FC going through the reference cell (FIG. 18B) and the absorption cell (FIG. 18C), respectively. Note that band B (or C) needs to be properly filtered out in the RF domain.

Provided that one-to-one mapping requirements can be satisfied, there is no limitation on the number of teeth of target FC that can be used. FIG. 19 and FIG. 20 are simulations demonstrating amplitude and absorption using a significantly increased number of teeth. Frequencies of target FC and local FC are given real values, and simple phase-matching effects with slowly varying amplitude and undepleted pump approximations [13] are incorporated into the simulation of the SFG process. We set $f_{rt}$=250 MHZ× 400=100 GHZ and $\delta$=500 KHZ*400=200 MHZ to include ~100 teeth. We do not set $f_{rt}$=250 MHZ to include ~40000 teeth to avoid processing delays (in this example, one step of simulation processing using 40000 teeth simultaneously exceeds the RAM limitations of our computer). However, with appropriate computing power, there are no theoretical or practical limitations that prevent performing the method with high numbers of teeth (e.g., 40000). As demonstrated

27 herein, with practicable parameters and processing power, more than 106 comb teeth can be measured at the same time.

Fourth Example: Coherence of the Read Out Oscillator

In the example of FIGS. 18B and 18C, the supercontinuum is assumed to be coherent from T1 to T2 so as to be compatible with proper operation of the time reference scheme.

Figure 21:
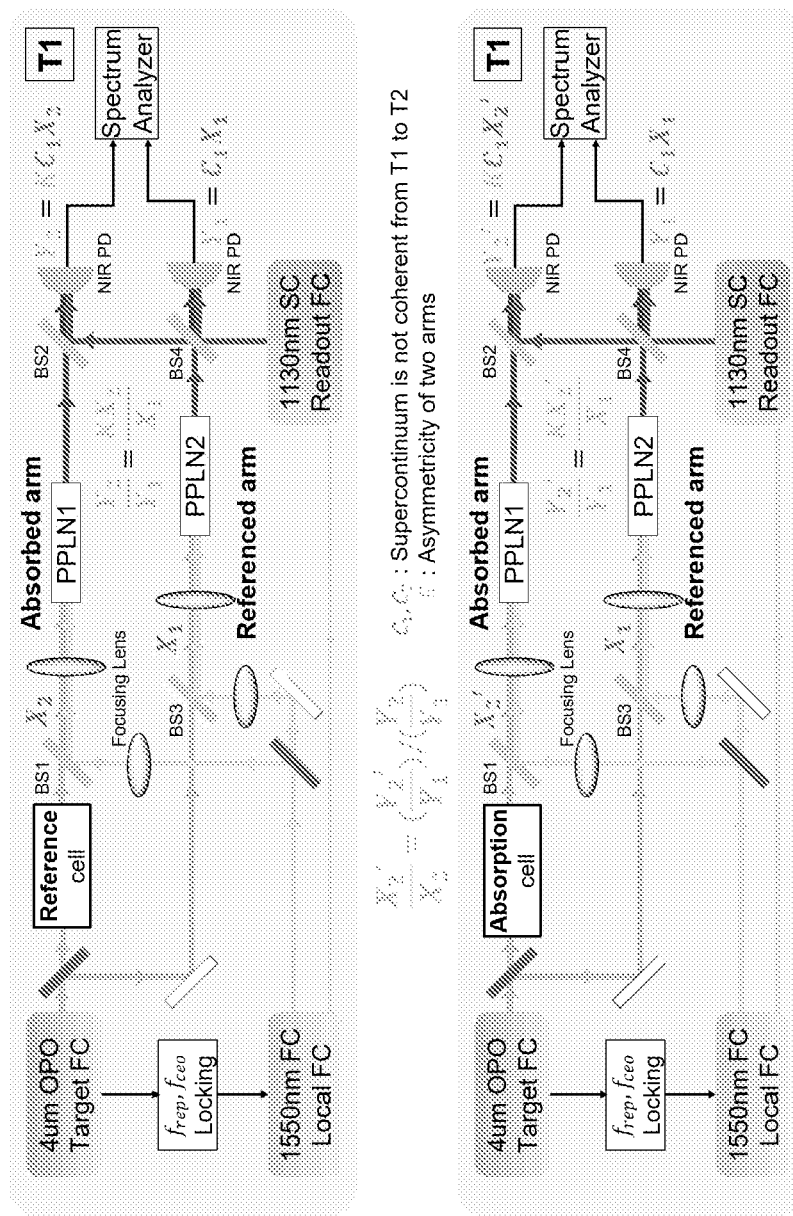
FIG. 21. Experiment set-up design with arm reference and time reference, when supercontinuum coherence time is shorter than data acquisition time.

FIG. 21 shows a variation of the setup that can be used when the readout FC (supercontinuum) is not coherent between reference (sample out) and absorption (sample in) measurements, showing a reference arm is used if the measurement time is longer than the coherence time of the supercontinuum. Asymmetry of the local FC, resulting from the fact that the local FC could not be split into two exactly identical halves, is resolved using a time reference; the incoherence of supercontinuum is solved using the arm reference.

CCS configurations can be selected according to the data acquisition time and supercontinuum coherence time. However, the results of the first example demonstrate that lack of coherence between reference (no sample) and absorption (sample in) measurements does not pose a problem for measurements. Therefore, the configuration shown in FIG. 2 can also be used when there is no coherence between the readout FC during the reference measurement and during the sample measurement.

Fifth Example: Process Steps and Device/System Embodiments

Figure 22:
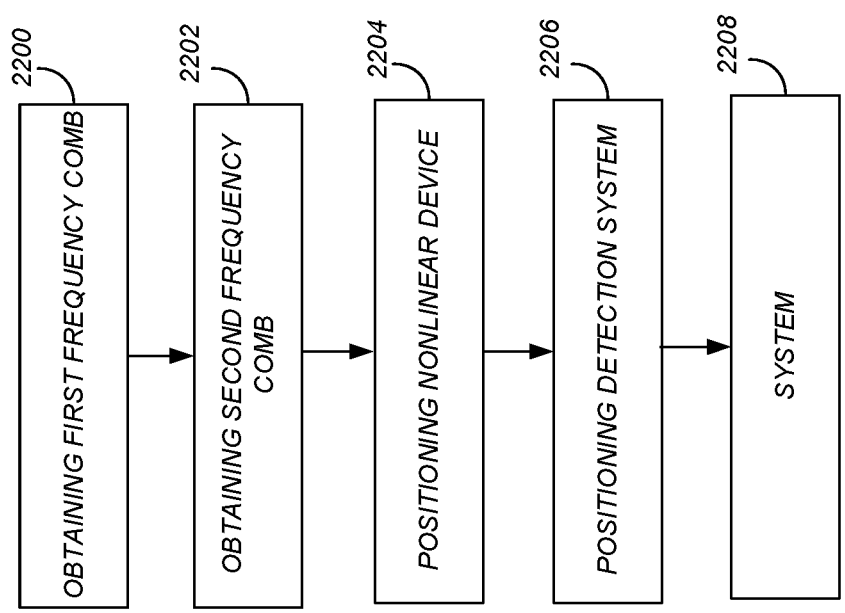
FIG. 22. Flowchart illustrating a method of making a system for performing spectroscopy.

FIG. 22 illustrates a method of making a system for performing spectroscopy.

Block 2200 represents obtaining a first frequency comb source outputting first electromagnetic radiation comprising a first frequency comb centered at a first wavelength and having a first repetition rate.

Block 2202 represents obtaining a second frequency comb source outputting a second electromagnetic radiation comprising a second frequency comb centered at a second wavelength and having a second repetition rate.

Block 2204 represents positioning a nonlinear device to receive the first frequency comb and the second frequency comb, wherein the nonlinear device interacts the first frequency comb and the second frequency comb through sum frequency generation or difference frequency generation so as to generate an output electromagnetic radiation.

Block 2206 represents positioning a detection system outputting a signal in response to detecting an interference of the output electromagnetic radiation with a third electromagnetic radiation, the signal comprising information used for determining a spectrum of at least the first frequency comb or the second frequency comb.

Block 2208 represents the end result, a system for performing spectroscopy. The system can be embodied in many ways including, but not limited to, the following.

1. A system 100 comprising a first frequency comb source 102 outputting first electromagnetic radiation 104 comprising a first frequency comb 106 centered at a first wavelength (corresponding to center frequency $v_T$) and having a first repetition rate $f_{r,T}$; a second frequency comb source 108 outputting a second electromagnetic radiation 110 comprising a second frequency comb 112 centered at a second wavelength (corresponding to center frequency $v_T$) and having a second repetition rate $f_{r,L}$; a nonlinear device 114 positioned to receive the first frequency comb and the second frequency comb, wherein the nonlinear device interacts the first frequency comb and the second frequency comb through sum frequency generation or difference frequency generation so as to generate an output electromagnetic radiation 116; and a detection system 118 (e.g., comprising photodetector PD) outputting a signal 120 in response to detecting an interference 122 of the output electromagnetic radiation with a third electromagnetic radiation 124, the signal comprising information used for determining a spectrum 126 of at least the first frequency comb or the second frequency comb.

2. The system of example 1, further comprising a sample 128 positioned so that the first frequency comb received in the nonlinear device has interacted with the sample prior to being received by the nonlinear device and the frequency spectrum is useful for determining a physical or chemical property of the sample.

3. The system of example 2, wherein the sample comprises a gas, liquid, or solid and the property of the sample comprises an absorption, refractive index, composition, or vibrational mode of the sample.

4. The system of example 1, further comprising:
a control circuit varying a property of at least one of the first frequency comb or the second frequency comb, between at least two values; and
a computer measuring the frequency spectrum by comparing the signal obtained for each of the two values, so as to obtain the frequency spectrum useful for determining or measuring the property with increased accuracy.

5. The system of example 4, wherein the property comprises a phase, repetition frequency, carrier-envelope-offset frequency, or amplitude of the first frequency comb or the second frequency comb.

6. The system of any of the examples 1-5, wherein the third electromagnetic radiation comprises a readout bandwidth overlapping in frequency with an output bandwidth of the output electromagnetic radiation so as to form the interference that can be detected by the detection system comprising a photodetector, and the third electromagnetic radiation comprises one or a combination of the following:
(a) a portion of one of the first or the second electromagnetic radiation,
(b) a portion of spectrally broadened electromagnetic radiation from one of the first electromagnetic radiation or the second electromagnetic radiation,
(c) a third frequency comb having a repetition frequency the same as one of the first frequency comb or the second frequency comb; or
(d) a continuous-wave electromagnetic radiation outputted from a continuous wave laser.

7. The system of any of the examples 1-6, wherein the nonlinear device comprises a nonlinear crystal (e.g., PPLN with quasi phase matching) or nonlinear medium comprising a second order nonlinear susceptibility for the sum frequency generation or the difference frequency generation.

8. The system of any of the examples 1-6, wherein the nonlinear device comprises a semiconductor chip or photonic integrated circuit comprising a sum frequency mixer or a difference frequency mixer.

9. The system of any of the examples 1-8, wherein the first frequency comb source and the second frequency comb source each comprise a mode-locked laser, an optical parametric oscillator or generator or amplifier, or a laser pumping one or more nonlinear crystals so as to generate the first frequency comb or the second frequency comb using an optical parametric process.

10. The system of any of the examples 1-9, wherein the first frequency comb comprises mid infrared wavelengths (e.g., wavelength λ such that 2 micrometers≤λ≤20 micrometers) and the second frequency comb comprises near infrared wavelengths (e.g., wavelength λ such that 750 nanometers≤λ≤2000 nanometers)

11. The system of any of the examples 1-9, wherein at least one of the first frequency comb or the second frequency comb comprise ultraviolet wavelengths.

12. The system of any of the examples 1-11, wherein the interference comprises a heterodyne signal and the detection system comprises a heterodyne detection system.

13. The system of example 12, wherein the heterodyne signal comprises radio frequency beat notes resulting from beating between the third electromagnetic radiation and the output electromagnetic radiation.

14. The system of any of the examples 12-13, further comprising a computer:

for each of one or more output frequencies in the output electromagnetic radiation, denoting the closest (second closest) of the readout teeth in the third electromagnetic radiation comprising a readout frequency comb; and calculating a primary (secondary) readout frequency difference between one of the output frequencies and its primary (secondary) readout tooth;

assigning each of the one or output frequencies, and thereby each of the readout frequencies, with one of the first teeth;

for each RF beat note, finding the readout frequency difference comprising the RF beat note and mapping the RF beat note to the one of the first teeth associated with the readout frequency difference.

20. The system of any of the examples 12-14, wherein:

the first frequency comb comprises a first center frequency $v_T$ and a plurality n of first teeth each having first frequencies $v_n$ and the first repetition rate $f_{r,T}$;

the second frequency comb comprises a second center frequency $v_L$ and a plurality m of second teeth comprising frequencies $v_m$ and the first repetition rate $f_{r,L}$;

the first frequency comb and the second frequency comb are detuned with a detuning $\delta=|f_{r,T}-f_{r,L}|$;

for the sum frequency generation, the output electromagnetic radiation comprises output teeth having a plurality of O=m+n output frequencies each at a different combination of sum frequencies $v_m+v_n$ with a center frequency $v_o=v_T+v_L$;

for the difference frequency generation, the output frequencies comprise a plurality of O=m+n output frequencies each at a different combination of difference frequencies $|v_m-v_n|$ and an output center frequency $v_o=|v_L-v_T|$;

the third electromagnetic radiation comprises a readout comb comprising readout teeth;

the output teeth cluster into different evenly spaced frequency groups, indexed by the group index G'=n'+m', wherein:

the group G' is generated by a nonlinear interaction between the ... $(n-1)^{th}$, $n^{th}$, $(n+1)^{th}$ first teeth and the $(m+1)^{th}$, $m^{th}$, $(n-1)^{th}$ second teeth, respectively.

the output teeth in each group G' are separated by the detuning δ; and a the signal comprises radio frequency (RF) beat notes distributed in different radio frequency bands.

21. The system of example 20, wherein the computer:

for each of one or more different ones of the output teeth, denotes the closest (second closest) of the readout teeth as a primary (secondary) readout tooth;

calculates the readout frequency differences between each of the output teeth and its primary (secondary) readout tooth;

assigns each of the one or output frequencies, and thereby each of the readout frequencies, with one of the first teeth;

for each RF beat note, finds the readout frequency difference comprising the RF beat note and maps the RF beat note to the one of the first teeth associated with the readout frequency difference.

22. The system of example 20 or 21, wherein

N, M, and Q denotes the number of first teeth, second teeth, and readout teeth, respectively, and M+Q≥(N+1).

23. The system of any of the examples 20-22, wherein an aggregate bandwidth of the second frequency comb and the readout frequency comb is larger than that of the first frequency comb.

24. The system of any of the examples 20-23, wherein:

$$D = \mathrm{mod}((n_{first}f_{r,T}+f_{ceo,T}), f_{r,L}), \text{where:}$$

D is the spectral (frequency) distance from the first tooth of the group G' to its primary readout tooth;

mod(A,B) denotes the remainder after division of dividend A by divisor B, $(n_{first}f_{r,T}+f_{ceo,T})$ is the optical frequency of the first tooth of the first frequency comb;

$$W = (n_{last} - n_{first})\delta = BW_T \times \frac{\delta}{f_{r,T}}$$

where W is the bandwidth of a group G';

$BW_T$ denotes the optical bandwidth of first frequency comb;

D>W; and $$D + W < \frac{f_{r,L}}{2}$$

If the detection system includes only a single detector, then the last two equations in this example need to be satisfied.

25. The system of any of the examples 20-24, wherein the detection system comprises a pair of balanced detectors and $$W < \frac{f_{r,L}}{2}$$

26. A system for performing spectroscopy, comprising:

means for outputting (and statutory equivalents thereof) first electromagnetic radiation comprising a first frequency comb centered at a first wavelength and having a first repetition rate;

means for outputting (and statutory equivalents thereof) a second electromagnetic radiation comprising a second frequency comb centered at a second wavelength and having a second repetition rate;

a nonlinear device positioned to receive the first frequency comb and the second frequency comb, wherein the nonlinear device interacts the first frequency comb and the second frequency comb through sum frequency generation or difference frequency generation so as to generate an output electromagnetic radiation; and means for detecting (and statutory equivalents thereof) an interference of the output electromagnetic radiation with a third electromagnetic radiation, and outputting a signal in response thereto comprising information used for determining a spectrum of at least the first frequency comb or the second frequency comb.

27. The system of example 26 further including any of the examples 2-25.

Method of Performing Spectroscopy

Figure 23:
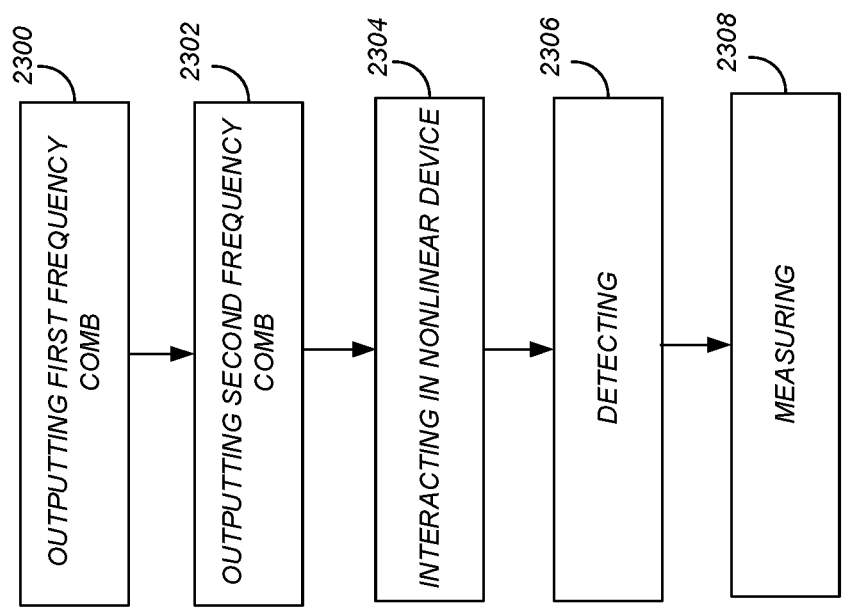
FIG. 23. Flowchart illustrating a method of performing spectroscopy.

FIG. 23 illustrates a method of performing spectroscopy.

Block 2300 represents outputting first electromagnetic radiation comprising a first frequency comb centered at a first wavelength and having a first repetition rate.

Block 2302 represents outputting second electromagnetic radiation comprising a second frequency comb centered at a second wavelength and having a second repetition rate;

Block 2304 represents interacting the first frequency comb and the second frequency comb in a nonlinear device through sum frequency generation or difference frequency generation so as to generate an output electromagnetic radiation; and Block 2306 represents detecting an interference of the output electromagnetic radiation with a third electromagnetic radiation so as to generate a signal comprising information used for determining a spectrum of at least the first frequency comb or the second frequency comb.

Block 2308 represents optionally measuring/determining the spectrum (e.g., frequency spectrum).

The method can be embodied in many ways, including, but not limited to, the following.

26. The method further comprising comparing a sample signal with a reference signal so as to measure the spectrum useful for determining a property of the sample, wherein:

the signal comprises the sample signal when the first frequency comb received in the nonlinear device has interacted with a sample prior to being received the nonlinear device; and the signal comprises a reference signal when the first frequency comb received in the nonlinear device has not interacted with the sample prior to being received in the nonlinear device.

27. The method of any of the examples wherein the detecting comprises heterodyne detection and the signal comprises a heterodyne signal comprising radio frequency (RF) beat notes resulting from beating between the third electromagnetic radiation and the output electromagnetic radiation.

28. The method of example 27, further comprising determining the spectrum of one of the first frequency comb or the second frequency comb by mapping or associating each of one or more teeth in the first or the second frequency comb with one or more of the RF beat notes.

29. The method of example 28, wherein the mapping or associating comprises the computer identifying a relationship between the RF beat notes in the signal, a calculated output frequency spectrum of the output electromagnetic radiation, and the first teeth of the first frequency comb.

30. The method of example 29, wherein the relationship comprises each of the first teeth mapping onto a plurality of frequencies of the output electromagnetic radiation and the plurality of frequencies of the output electromagnetic radiation mapping onto a single one of the RF beat notes.

31. The method of any of the examples 28-30, wherein the mapping or associating comprises:

calculating an output frequency spectrum of the output electromagnetic radiation, comprising a sum of, or difference between, each of one or more of the first teeth and each of one or more second teeth in the second frequency comb;

calculating one or more calculated beat frequencies between the output frequency spectrum and the third electromagnetic radiation;

associating each of one or more of the first teeth with one of the calculated beat frequencies; and finding each of the calculated beat notes corresponding to each of the one or more RF beat notes in the signal so as to map each of the RF beat notes with one of the first teeth.

32. The method of any of the examples 28-31, further comprising the steps of any of the examples 20-25.

33. The method of any of the examples performed using the system of any of the examples 1-27.

Sixth Example: Hardware Environment

Figure 24:
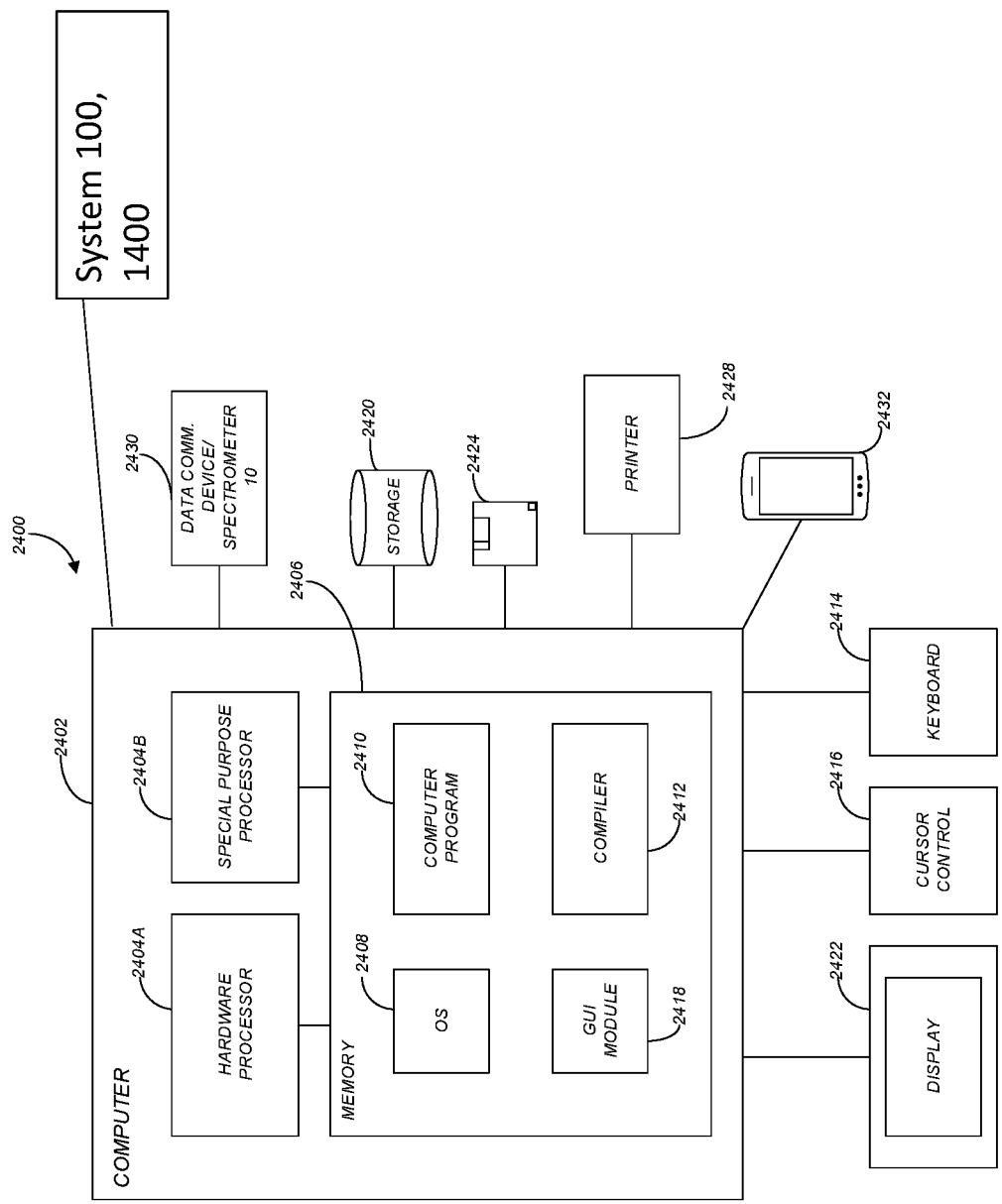
FIG. 24. Hardware environment for performing computer operations described herein.

FIG. 24 is an exemplary hardware and software environment 2400 (referred to as a computer-implemented system and/or computer-implemented method) used to implement one or more embodiments of the invention. The hardware and software environment includes a computer 2402 and may include peripherals. Computer 2402 may be a user/client computer, server computer, or may be a database computer. The computer 2402 comprises a hardware processor 2404A and/or a special purpose hardware processor 2404B (hereinafter alternatively collectively referred to as processor 2404) and a memory 2406, such as random access memory (RAM). The computer 2402 may be coupled to, and/or integrated with, other devices, including input/output (I/O) devices such as a keyboard 2414, a cursor control device 2416 (e.g., a mouse, a pointing device, pen and tablet, touch screen, multi-touch device, etc.) and a printer 2428. In one or more embodiments, computer 2402 may be coupled to, or may comprise, a portable or media viewing/listening device 2432 (e.g., an MP3 player, IPOD, NOOK, portable digital video player, cellular device, personal digital assistant, etc.). In yet another embodiment, the computer 2402 may comprise a multi-touch device, mobile phone, gaming system, internet enabled television, television set top box, or other internet enabled device executing on various platforms and operating systems.

In one embodiment, the computer 2402 operates by the hardware processor 2404A performing instructions defined by the computer program 2410 (e.g., application) under control of an operating system 2408. The computer program 2410 and/or the operating system 2408 may be stored in the memory 2406 and may interface with the user and/or other devices to accept input and commands and, based on such input and commands and the instructions defined by the computer program 2410 and operating system 2408, to provide output and results.

Output/results may be presented on the display 2422 or provided to another device for presentation or further processing or action. In one embodiment, the display 2422 comprises a liquid crystal display (LCD) having a plurality of separately addressable liquid crystals. Alternatively, the display 2422 may comprise a light emitting diode (LED) display having clusters of red, green and blue diodes driven together to form full-color pixels. Each liquid crystal or pixel of the display 2422 changes to an opaque or translucent state to form a part of the image on the display in response to the data or information generated by the processor 2404 from the application of the instructions of the computer program 2410 and/or operating system 2408 to the input and commands. The image may be provided through a graphical user interface (GUI) module 2418. Although the GUI module 2418 is depicted as a separate module, the instructions performing the GUI functions can be resident or distributed in the operating system 2408, the computer program 2410, or implemented with special purpose memory and processors.

In one or more embodiments, the display 2422 is integrated with/into the computer 2402 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 2402 according to the computer program 2410 instructions may be implemented in a special purpose processor 2404B. In this embodiment, some or all of the computer program 2410 instructions may be implemented via firmware instructions stored in a read only memory (ROM), a programmable read only memory (PROM) or flash memory within the special purpose processor 2404B or in memory 2406. The special purpose processor 2404B may also be hardwired through circuit design to perform some or all of the operations to implement the present invention. Further, the special purpose processor 2404B may be a hybrid processor, which includes dedicated circuitry for performing a subset of functions, and other circuits for performing more general functions such as responding to computer program 2410 instructions. In one embodiment, the special purpose processor 2404B is an application specific integrated circuit (ASIC) or Field Programmable Gate Array (FPGA).

The computer 2402 may also implement a compiler 2412 that allows an application or computer program 2410 written in a programming language such as C, C++, Assembly, SQL, PYTHON, PROLOG, MATLAB, RUBY, RAILS, HASKELL, or other language to be translated into processor 2404 readable code. Alternatively, the compiler 2412 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 2410 accesses and manipulates data accepted from I/O devices and stored in the memory 2406 of the computer 2402 using the relationships and logic that were generated using the compiler 2412.

The computer 2402 also optionally comprises an external communication device such as a modem, satellite link, Ethernet card, or other device for accepting input from, and providing output to, other computers 2402.

In one embodiment, instructions implementing the operating system 2408, the computer program 2410, and the compiler 2412 are tangibly embodied in a non-transitory computer-readable medium, e.g., data storage device 2420, which could include one or more fixed or removable data storage devices, such as a zip drive, floppy disc drive 2424, hard drive, CD-ROM drive, tape drive, etc. Further, the operating system 2408 and the computer program 2410 are comprised of computer program 2410 instructions which, when accessed, read and executed by the computer 2402, cause the computer 2402 to perform the steps necessary to implement and/or use the present invention or to load the program of instructions into a memory 2406, thus creating a special purpose data structure causing the computer 2402 to operate as a specially programmed computer executing the method steps described herein. Computer program 2410 and/or operating instructions may also be tangibly embodied in memory 2406 and/or data communications devices 2430, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 2402.

Figure 25:
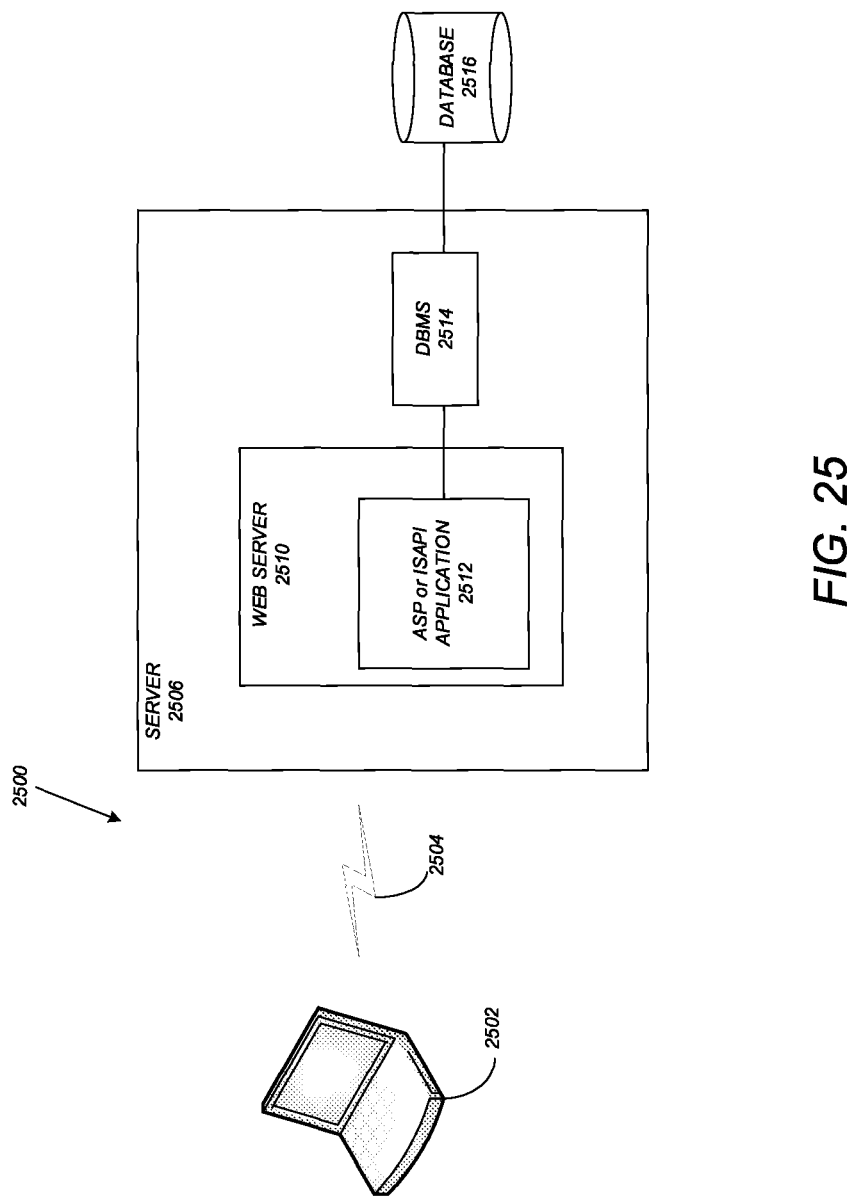
FIG. 25 Network environment.

FIG. 25 schematically illustrates a typical distributed/cloud-based computer system 2500 using a network 2504 to connect client computers 2502 to server computers 2506. A typical combination of resources may include a network 2504 comprising the Internet, LANs (local area networks), WANs (wide area networks), SNA (systems network architecture) networks, or the like, clients 2502 that are personal computers or workstations (as set forth in FIG. 24), and servers 2506 that are personal computers, workstations, minicomputers, or mainframes (as set forth in FIG. 24). However, it may be noted that different networks such as a cellular network (e.g., GSM [global system for mobile communications] or otherwise), a satellite based network, or any other type of network may be used to connect clients 2502 and servers 2506 in accordance with embodiments of the invention.

A network 2504 such as the Internet connects clients 2502 to server computers 2506. Network 2504 may utilize ethernet, coaxial cable, wireless communications, radio frequency (RF), etc. to connect and provide the communication between clients 2502 and servers 2506. Further, in a cloud-based computing system, resources (e.g., storage, processors, applications, memory, infrastructure, etc.) in clients 2502 and server computers 2506 may be shared by clients 2502, server computers 2506, and users across one or more networks. Resources may be shared by multiple users and can be dynamically reallocated per demand. In this regard, cloud computing may be referred to as a model for enabling access to a shared pool of configurable computing resources.

Clients 2502 may execute a client application or web browser and communicate with server computers 2506 executing web servers 2510. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 2502 may be downloaded from server computer 2506 to client computers 2502 and installed as a plug-in or ACTIVEX control of a web browser. Accordingly, clients 2502 may utilize ACTIVEX components/component object model (COM) or distributed COM (DCOM) components to provide a user interface on a display of client 2502. The web server 2510 is typically a program such as MICROSOFT'S INTERNET INFORMATION SERVER.

Web server 2510 may host an Active Server Page (ASP) or Internet Server Application Programming Interface (ISAPI) application 2512, which may be executing scripts. The scripts invoke objects that execute business logic (referred to as business objects). The business objects then manipulate data in database 2516 through a database management system (DBMS) 2514. Alternatively, database 2516 may be part of, or connected directly to, client 2502 instead of communicating/obtaining the information from database 2516 across network 2504. When a developer encapsulates the business functionality into objects, the system may be referred to as a component object model (COM) system. Accordingly, the scripts executing on web server 2510 (and/or application 2512) invoke COM objects that implement the business logic. Further, server 2506 may utilize MICROSOFT'S TRANSACTION SERVER (MTS) to access required data stored in database 2516 via an interface such as ADO (Active Data Objects), OLE DB (Object Linking and Embedding DataBase), or ODBC (Open Data-Base Connectivity).

Generally, these components 2500-2516 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 2502 and 2506 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 2502 and 2506. Embodiments of the invention are implemented as a software application on a client 2502 or server computer 2506. Further, as described above, the client 2502 or server computer 2506 may comprise a thin client device or a portable device that has a multi-touch-based display.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for performing spectroscopy, comprising:
a first frequency comb source outputting first electromagnetic radiation comprising a first frequency comb centered at a first wavelength and having a first repetition rate;
a second frequency comb source outputting a second electromagnetic radiation comprising a second frequency comb centered at a second wavelength and having a second repetition rate;
a nonlinear device positioned to receive the first frequency comb and the second frequency comb, wherein the nonlinear device interacts the first frequency comb and the second frequency comb through sum frequency generation or difference frequency generation so as to generate an output electromagnetic radiation; and
a detection system outputting a signal in response to detecting an interference of the output electromagnetic radiation with a third electromagnetic radiation, the signal comprising information used for determining a spectrum of at least the first frequency comb or the second frequency comb.

2. The system of claim 1, further comprising a sample positioned so that the first frequency comb received in the nonlinear device has interacted with the sample prior to being received by the nonlinear device and the spectrum comprising a frequency spectrum is useful for determining a physical or chemical property of the sample.

3. The system of claim 2, wherein the sample comprises a gas, a liquid, or solid and the property of the sample comprises an absorption, refractive index, composition, or vibrational mode of the sample.

4. The system of claim 1, further comprising:
a control circuit varying a property of at least one of the first frequency comb or the second frequency comb, between at least two values; and
a computer measuring the spectrum, comprising a frequency spectrum by comparing the signal obtained for each of the two values, so as to obtain the frequency spectrum useful for determining or measuring the property with increased accuracy.

5. The system of claim 4, wherein the property comprises a phase, repetition frequency, carrier-envelope-offset frequency, or amplitude of the first frequency comb or the second frequency comb.

6. The system of claim 1, wherein the third electromagnetic radiation comprises a readout bandwidth overlapping in frequency with an output bandwidth of the output electromagnetic radiation so as to form the interference that can be detected by the detection system comprising a photodetector, and the third electromagnetic radiation comprises one or a combination of the following:
(a) a portion of one of the first electromagnetic radiation or the second electromagnetic radiation,
(b) a portion of spectrally broadened electromagnetic radiation from one of the first electromagnetic radiation or the second electromagnetic radiation,
(c) a third frequency comb having a repetition frequency the same as one of the first frequency comb or the second frequency comb; or
(d) a continuous-wave electromagnetic radiation outputted from a continuous wave laser.

7. The system of claim 1, wherein the nonlinear device comprises a nonlinear crystal or nonlinear medium comprising a second order nonlinear susceptibility for the sum frequency generation or the difference frequency generation.

8. The system of claim 1, wherein the nonlinear device comprises a semiconductor chip or photonic integrated circuit comprising a sum frequency mixer or a difference frequency mixer.

9. The system of claim 1, wherein the first frequency comb source and the second frequency comb source each comprise a mode-locked laser, an optical parametric oscillator or generator or amplifier, or a laser pumping one or more nonlinear crystals so as to generate the first frequency comb or the second frequency comb using an optical parametric process.

10. The system of claim 1, wherein the first frequency comb comprises mid infrared wavelengths and the second frequency comb comprises near infrared wavelengths.

11. The system of claim 1, wherein at least one of the first frequency comb or the second frequency comb comprise ultraviolet wavelengths.

12. The system of claim 1, wherein the interference comprises a heterodyne signal and the detection system comprises a heterodyne detection system.

13. The system of claim 12, wherein the heterodyne signal comprises radio frequency beat notes resulting from beating between the third electromagnetic radiation and the output electromagnetic radiation.

14. A method for performing spectroscopy, comprising:
outputting first electromagnetic radiation comprising a first frequency comb centered at a first wavelength and having a first repetition rate;
outputting second electromagnetic radiation comprising a second frequency comb centered at a second wavelength and having a second repetition rate;
interacting the first frequency comb and the second frequency comb in a nonlinear device through sum frequency generation or difference frequency generation so as to generate an output electromagnetic radiation; and
detecting an interference of the output electromagnetic radiation with a third electromagnetic radiation so as to generate a signal comprising information used for determining a spectrum of at least the first frequency comb or the second frequency comb.

15. The method of claim 14, further comprising:
comparing a sample signal with a reference signal so as to measure the spectrum useful for determining a property of the sample, wherein:
the signal comprises the sample signal when the first frequency comb received in the nonlinear device has interacted with a sample prior to being received the nonlinear device; and
the signal comprises a reference signal when the first frequency comb received in the nonlinear device has not interacted with the sample prior to being received in the nonlinear device.

16. The method of claim 14, wherein the detecting comprises heterodyne detection and the signal comprises a heterodyne signal comprising radio frequency (RF) beat notes resulting from beating between the third electromagnetic radiation and the output electromagnetic radiation.

17. The method of claim 16, further comprising determining the spectrum of one of the first frequency comb or the second frequency comb by mapping or associating each of one or more teeth in the first frequency comb or the second frequency comb with one or more of the RF beat notes.

18. The method of claim 17, wherein the mapping or associating comprises using a computer identifying a relationship between the RF beat notes in the signal, a calculated output frequency spectrum of the output electromagnetic radiation, and the first teeth of the first frequency comb.

19. The method of claim 18, wherein the relationship comprises each of the first teeth mapping onto a plurality of frequencies of the output electromagnetic radiation and the plurality of frequencies of the output electromagnetic radiation mapping onto a single one of the RF beat notes.

20. The method of claim 18, wherein the mapping or associating comprises:
calculating an output frequency spectrum of the output electromagnetic radiation, comprising a sum of, or difference between, each of one or more of the first teeth and each of one or more second teeth in the second frequency comb;
calculating one or more calculated beat frequencies between the output frequency spectrum and the third electromagnetic radiation;
associating each of one or more of the first teeth with one of the calculated beat frequencies; and
finding each of the calculated beat notes corresponding to each of the one or more RF beat notes in the signal so as to map each of the RF beat notes with one of the first teeth.

* * * * *